US007533256B2

(12) United States Patent
Walter et al.

(10) Patent No.: US 7,533,256 B2
(45) Date of Patent: May 12, 2009

(54) METHOD AND APPARATUS FOR ENCRYPTION OF DATA ON STORAGE UNITS USING DEVICES INSIDE A STORAGE AREA NETWORK FABRIC

(75) Inventors: Richard A. Walter, San Jose, CA (US); L. Vincent M. Isip, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1156 days.

(21) Appl. No.: 10/285,345

(22) Filed: Oct. 31, 2002

(65) Prior Publication Data

US 2004/0085955 A1 May 6, 2004

(51) Int. Cl.
*H04L 12/28* (2006.01)
*H04L 9/00* (2006.01)
(52) U.S. Cl. .................... 713/153; 713/193; 370/389
(58) Field of Classification Search .................. 713/153
See application file for complete search history.

(56) References Cited

U.S. PATENT DOCUMENTS

| 6,775,274 | B1 * | 8/2004 | Ain et al. ..................... 370/360 |
| 2002/0083344 | A1 * | 6/2002 | Vairavan ..................... 713/201 |
| 2002/0116501 | A1 * | 8/2002 | Ho et al. ..................... 709/227 |

OTHER PUBLICATIONS

"Fibre Channel—Fabric Generic Requirements (FC-FG)" American National Standards Institute, Dec. 4, 1996.*

* cited by examiner

*Primary Examiner*—Jung Kim
(74) *Attorney, Agent, or Firm*—Wong, Cabello, Lutsch, Rutherford & Brucculeri, LLP

(57) ABSTRACT

The capability to encrypt or compress the traffic over network links, thus improving the security of the link on the performance of the links, and the capability to encrypt/decrypt data stored on the storage devices without requiring specialized hosts or storage devices. In a first embodiment, traffic to be routed over a selected link needing encryption and/or compression is routed to hardware which performs the encryption and/or compression and returned for transmission over the link. A complementary unit at the second end of the link routes the received frames to complementary hardware to perform the decryption and/or decompression. The recovered frames are then routed to the target device in a normal fashion. In a variation of this first embodiment the hardware is developed using an FPGA. This allows simple selection of the desired feature or features present in the switch. The switch can be easily configured to perform encryption, compression or both, allowing great flexibility to a system administrator. In a second embodiment frames can be encrypted by a switch and then provided to the storage device in this encrypted manner. The frames from the storage device are decrypted before provision to the requesting host. By performing the encryption and decryption in the switch, conventional hosts and storage devices can be utilized.

42 Claims, 34 Drawing Sheets

METHOD AND APPARATUS FOR ENCRYPTION OF DATA ON STORAGE UNITS USING DEVICES INSIDE A STORAGE AREA NETWORK FABRIC

CROSS REFERENCE TO RELATED APPLICATIONS

This application is related to and incorporates by reference, U.S. patent applications Ser. No. 10/209,742, entitled "Host Bus Adaptor-Based Virtualization Switch," by Subhojit Roy, Richard Walter, Cirillo Lino Costantino, Naveen Maveli, Carlos Alonso, and Mike Pong, filed Aug. 31, 2002; 10/209,694, entitled "Hardware-Based Translating Virtualization Switch," by Shahe H. Krakirian, Richard Walter, Subbarao Arumilli, Cirillo Lino Costantino, Vincent Isip, Subhojit Roy, Naveen Maveli, Daniel Chung, Steve Elstad, and Dennis Makishima, filed Aug. 31, 2002; and; 10/209,743 entitled, "Method And Apparatus For Virtualizing Storage Devices Inside A Storage Area Network Fabric," by Naveen Maveli, Richard Walter, Cirillo Lino Costantino, Subhojit Roy, Carlos Alonso, Mike Pong, Shahe H. Krakirian, Subbarao Arumilli, Vincent Isip, Daniel Chung, Steve Elstad, Dennis Makishima and Daniel Y. Chung, filed Aug. 31, 2002 such applications hereby being incorporated by reference. This application is also related to U.S. patent applications Ser. No. 10/285,686, entitled "Method and Apparatus for Encryption or Compression Devices Inside a Storage Area Network Fabric" by Richard Walter and Vincent Isip and 10/285,309, entitled "Method and Apparatus for Allowing Use of One of a Plurality of Functions in Devices Inside a Storage Area Network Fabric" by Vincent Isip and Richard Walter, both filed concurrently with this application.

BACKGROUND OF THE INVENTION

1. Field of the Invention

The present invention relates to storage area networks, and more particularly to encryption of data stored on storage units by elements contained in the storage area network.

2. Description of the Related Art

As computer network operations have expanded over the years, storage requirements have become very high. It is desirable to have a large number of users access common storage elements to minimize the cost of obtaining sufficient storage elements to hold the required data. However, this has been difficult to do because of the configuration of the particular storage devices. Originally storage devices were directly connected to the relevant host computer. Thus, it was required to provide enough storage connected to each host as would be needed by the particular applications running on that host. This would often result in a requirement of buying significantly more storage than immediately required based on potential growth plans for the particular host. However, if those plans did not go forward, significant amounts of storage connected to that particular host would go unused, therefore wasting the money utilized to purchase such attached storage. Additionally, it was very expensive, difficult and time consuming to transfer unused data storage to a computer in need of additional storage, so the money remained effectively wasted.

In an attempt to solve this problem storage area networks (SANs) were developed. In a SAN the storage devices are not locally attached to the particular hosts but are connected to a host or series of hosts through a switched fabric, where each particular host can access each particular storage device. In this manner multiple hosts could share particular storage devices so that storage space could be more readily allocated between the particular applications on the hosts.

One aspect of this switched fabric is a series of point to point links between the switches in the network. In many cases these links are secure, but in some cases portions of the links may not be completely secure. There are various efforts to provide security to the links, such as disclosed in U.S. patent application Ser. No. 10/062,125, entitled "Network Security and Applications to the Fabric Environment" by James Kleinsteiber, Richard Hammons, Dilip Gunawardena, Hung Nguyen, Shankar Balasubramanian, and Vidya Renanarayanan filed Jan. 31, 2002, which is hereby incorporated by reference. But further security efforts to further secure the links may be desirable.

Alternatively, some links may be slower than other links in the network in certain cases. It may not be feasible to upgrade the speed of those links for numerous reasons. But it would still be desirable to increase the overall performance of those slower links to improve network performance.

In certain cases, a combination of both of the above concerns can be present in a given network. It would be desirable to handle both concerns in a single switch or provide the flexibility to handle either or both concerns in a single switch.

Even if the links are sufficiently secure, in some cases it may be desirable to encrypt the data being stored in the storage devices. While this may be done using specialized systems, either hardware, software or a combination, in the relevant host or storage device, this would require purchasing those specialized systems, which could increase cost and would reduce flexibility of the network. Therefore, it would be desirable to provide the encryption ability without requiring the host or storage device to be changed.

BRIEF SUMMARY OF THE INVENTION

The preferred embodiments according to the present invention provide the capability to encrypt or compress the traffic over network links, thus improving the security of the link on the performance of the links. Additionally, preferred embodiments provide the capability to encrypt/decrypt data stored on the storage devices without requiring specialized hosts or storage devices.

In a first embodiment, traffic to be routed over a selected link needing encryption and/or compression is routed to hardware which performs the encryption and/or compression and returned for transmission over the link. A complementary unit at the second end of the link routes the received frames to complementary hardware to perform the decryption and/or decompression. The recovered frames are then routed to the target device in a normal fashion.

In a variation of this first embodiment the hardware is developed using an FPGA. This allows simple selection of the desired feature or features present in the switch. The switch can be easily configured to perform encryption, compression or both, allowing great flexibility to a system administrator.

In a second embodiment frames can be encrypted by a switch and then provided to the storage device in this encrypted manner. This is particularly useful in a virtualization environment where many different hosts and/or applications may share storage devices. The frames from the storage device are decrypted before provision to the requesting host. By performing the encryption and decryption in the switch, conventional hosts and storage devices can be utilized.

Further, these functions are generally carried out in the preferred embodiments at full wire speed, thus not inducing additional performance penalties but still providing the increased functionality.

DETAILED DESCRIPTION OF THE INVENTION

Figure 1:
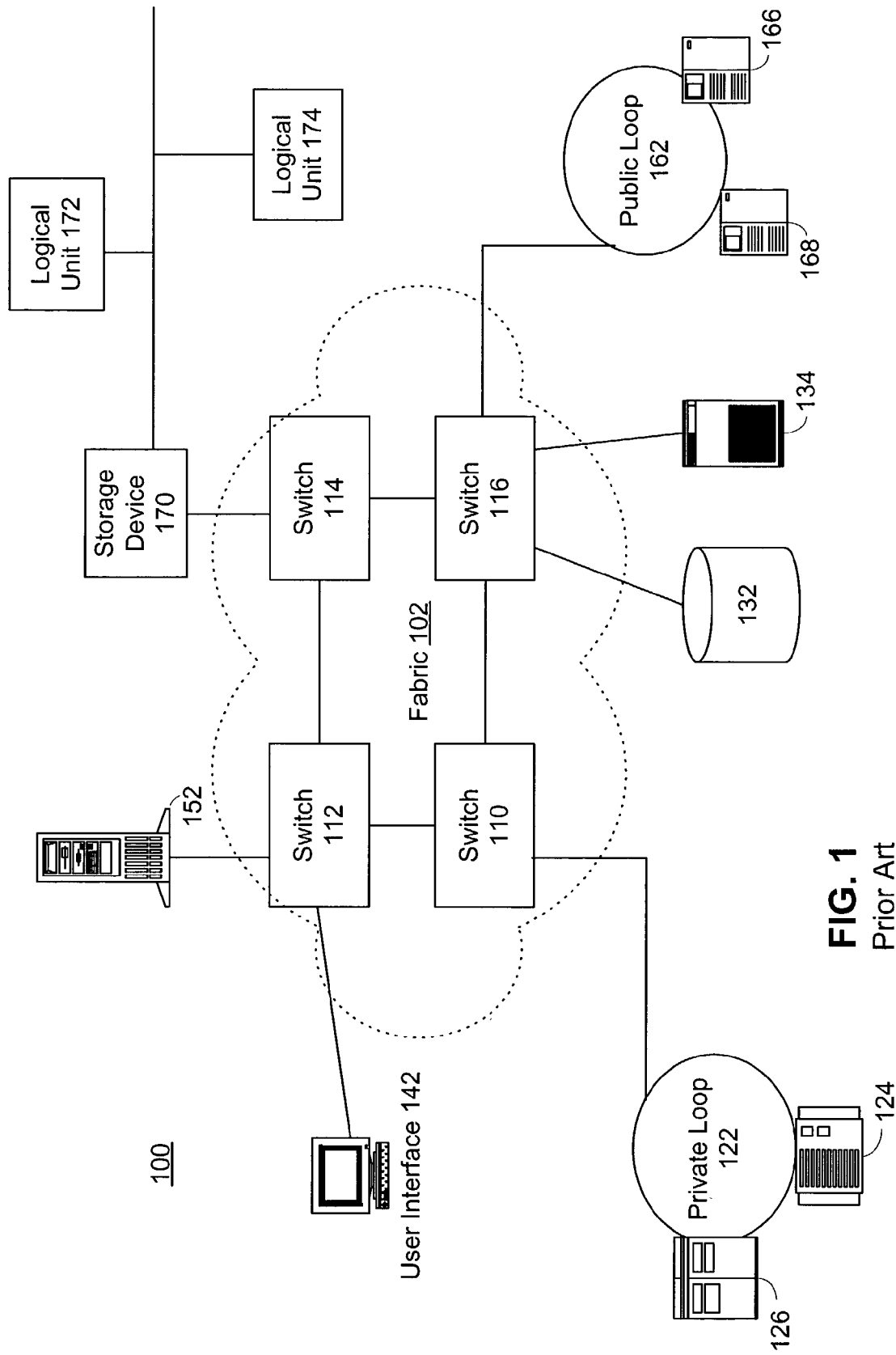
FIG. 1 is a general view storage area network (SAN)

Referring now to FIG. 1, a storage area network (SAN) 100 generally illustrating a prior art design is shown. A fabric 102 is the heart of the SAN 100. The fabric 102 is formed of a series of switches 110, 112, 114, and 116, preferably Fibre Channel switches according to the Fibre Channel specifications. The switches 110-116 are interconnected to provide a full mesh, allowing any nodes to connect to any other nodes. Various nodes and devices can be connected to the fabric 102. For example a private loop 122 according to the Fibre Channel loop protocol is connected to switch 110, with hosts 124 and 126 connected to the private loop 122. That way the hosts 124 and 126 can communicate through the switch 110 to other devices. Storage unit 132, preferably a unit containing disks, and a tape drive 134 are connected to switch 116. A user interface 142, such as a work station, is connected to switch 112, as is an additional host 152. A public loop 162 is connected to switch 116 with disk storage units 166 and 168, preferably RAID storage arrays, to provide storage capacity. A storage device 170 is shown as being connected to switch 114, with the storage device 170 having a logical unit 172 and a logical unit 174. It is understood that this is a very simplified view of a SAN 100 with representative storage devices and hosts connected to the fabric 102. It is understood that quite often significantly more devices and switches are used to develop the full SAN 100.

Figure 2:
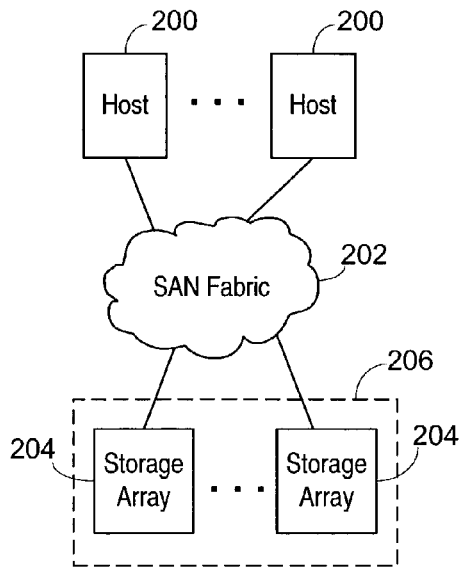
FIGS. 2, 3, 4, and 5 are prior art virtualization block diagrams.

Turning then to FIG. 2, a first prior art embodiment of virtualization is illustrated. Host computers 200 are connected to a fabric 202. Storage arrays 204 are also connected to the fabric 202. A virtualization agent 206 interoperates with the storage arrays 204 to perform the virtualization services. An example of this operation is the EMC Volume Logix operation. The drawback of this arrangement is that it generally operates on only individual storage arrays and is not optimized to span multiple arrays and further is generally vendor specific.

Figure 3:
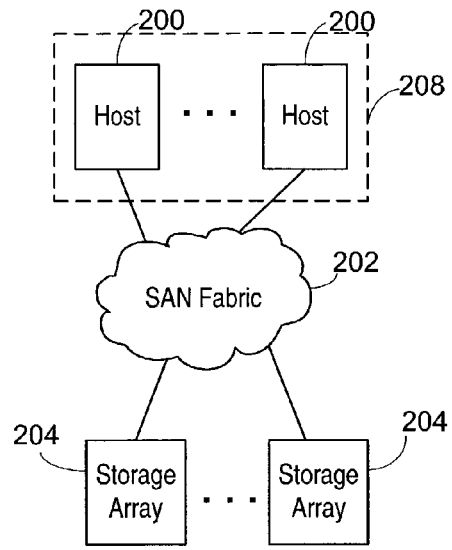

FIG. 3 illustrates host-based virtualization according to the prior art. In this embodiment the hosts 200 are connected to the fabric 202 and the storage arrays 204 are also connected to the fabric 202. In this case a virtualization operation 208 is performed by the host computers 200. An example of this is the Veritas Volume Logix manager. In this case the operation is not optimized for spanning multiple hosts and can have increased management requirements when multiple hosts are involved due to the necessary intercommunication. Further, support is required for each particular operating system present on the host.

Figure 4:
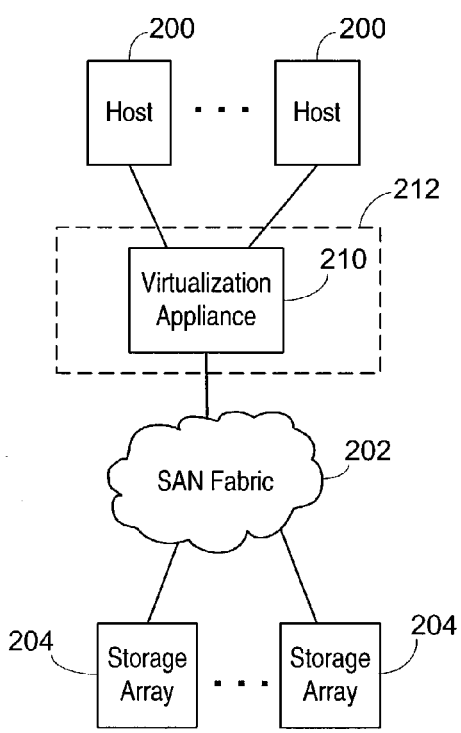

FIG. 4 illustrates the use of a virtualization appliance according to the prior art. In FIG. 4 the hosts 200 are connected to a virtualization appliance 210 which is the effective virtualization agent 212. The virtualization appliance 210 is then connected to the fabric 202, which has the storage arrays 204 connected to it. In this case all data from the hosts 200 must flow through the virtualization appliance 210 prior to reaching the fabric 202. An example of this is products using the FalconStor IPStor product on an appliance unit. Concerns with this design are scalability, performance, and ease of management should multiple appliances be necessary because of performance requirements and fabric size.

Figure 5:
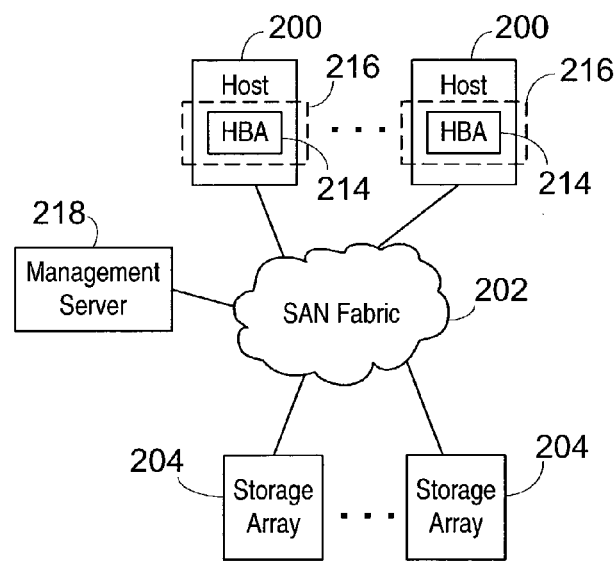

A fourth prior art approach is illustrated in FIG. 5. This is referred to as an asymmetric host/host bus adapter (HBA) solution. One example is the VersaStor system from Compaq Computer Corporation (now Hewlett Packard Company). In this case the hosts 200 include specialized HBAs 214 with a virtualization agent 216 running on the HBAs 214. The hosts 200 are connected to the fabric 202 which also receives the storage arrays 204. In addition, a management server 218 is connected to the fabric 202. The management server 218 provides management services and communicates with the HBAs 214 to provide the HBAs 214 with mapping information relating to the virtualization of the storage arrays 204. There are several problems with this design, one of which is that it requires special HBAs, which may require the removal of existing HBAs in an existing system. In addition, there is a security gap in that the HBAs and their host software must obey and follow the virtualization mapping rules provided by the management server 218. However, the presence of the management server 218 does simplify management operations and allows better scalability across multiple hosts. and/or storage devices.

Figure 6:
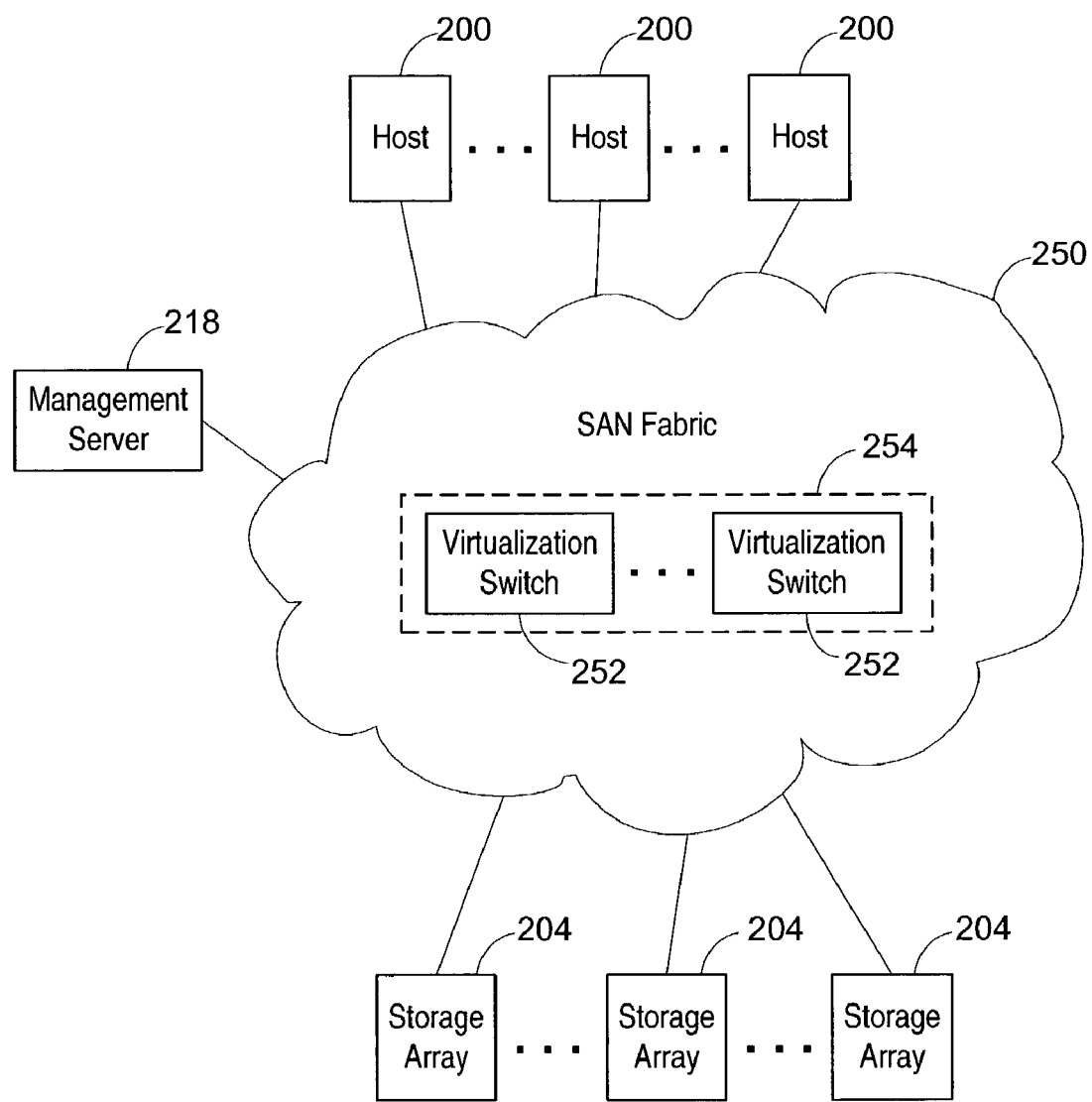
FIG. 6 is a block diagram of a SAN showing the location of virtualization switches.

Referring now to FIG. 6, a block diagram of a virtualization switch is illustrated. In FIG. 6 the hosts 200 are connected to a SAN fabric 250. Similarly, storage arrays 204 are also connected to the SAN fabric 250. However, as opposed to the SAN fabric 202 which is made with conventional Fibre Channel switches, the fabric 250 includes a series of virtualization switches 252 which act as the virtualization agents 254. A management server 218 is connected to the fabric 250 to manage and provide information to the virtualization switches 252 and to the hosts 200. This embodiment has numerous advantages over the prior art designs of FIGS. 2-5 by eliminating interoperability problems between hosts and/or storage devices and solves the security problems of the asymmetric HBA solution of FIG. 5 by allowing the hosts 200 to be conventional prior art hosts. Management has been simplified by the use of the management server 218 to communicate with the multiple virtualization switches 252. In this manner, both the hosts 200 and the storage arrays 204 can be conventional devices. As the virtualization switch 252 can provide the virtualization remapping functions at wire speed, performance is not a particular problem and this solution can much more readily handle much larger fabrics by the simple addition of additional virtualization switches 252 as needed.

Figure 6A:
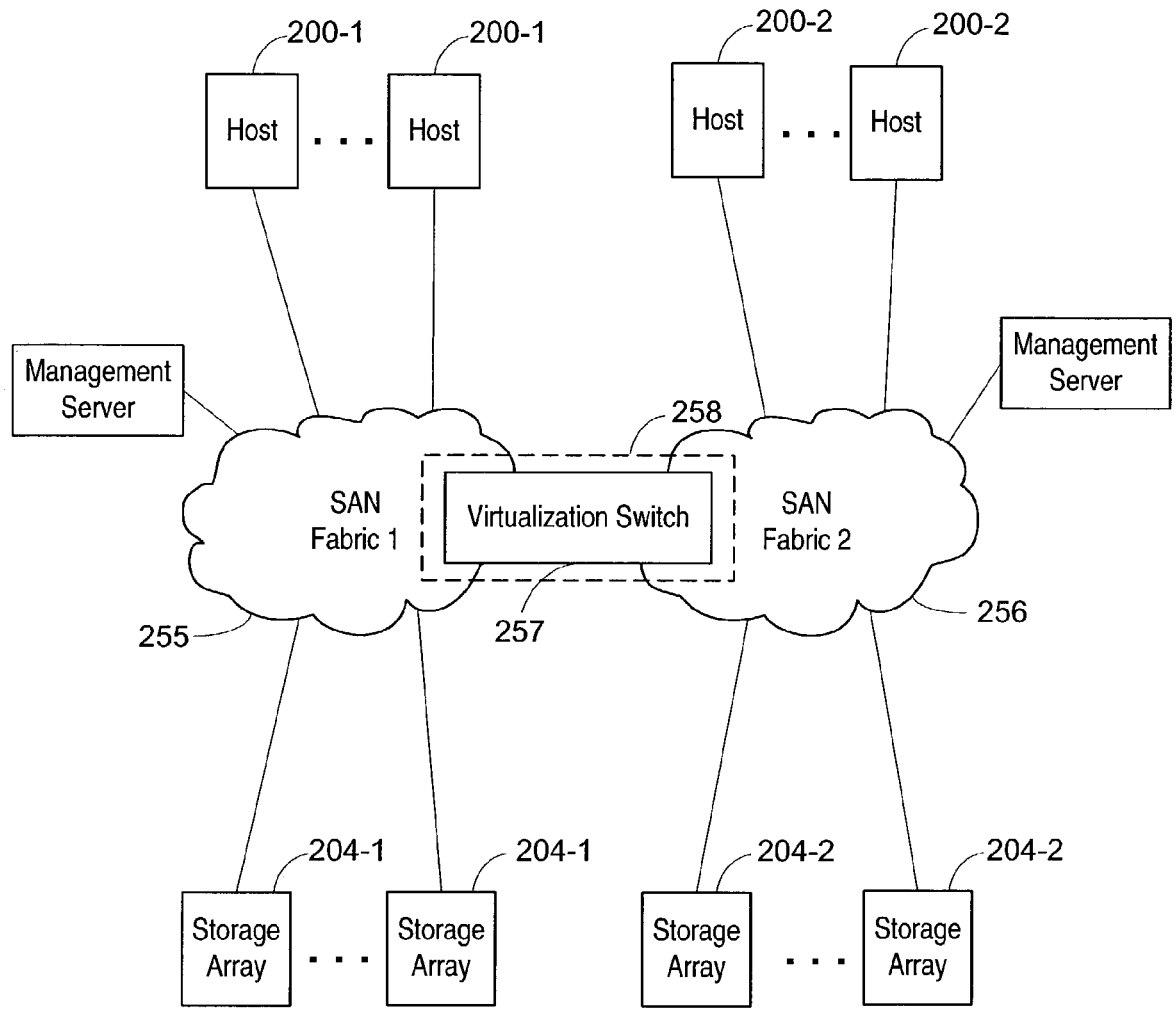
FIG. 6A is a block diagram of a dual Fabric SAN showing the location of a virtualization switch.
Figure 6B:
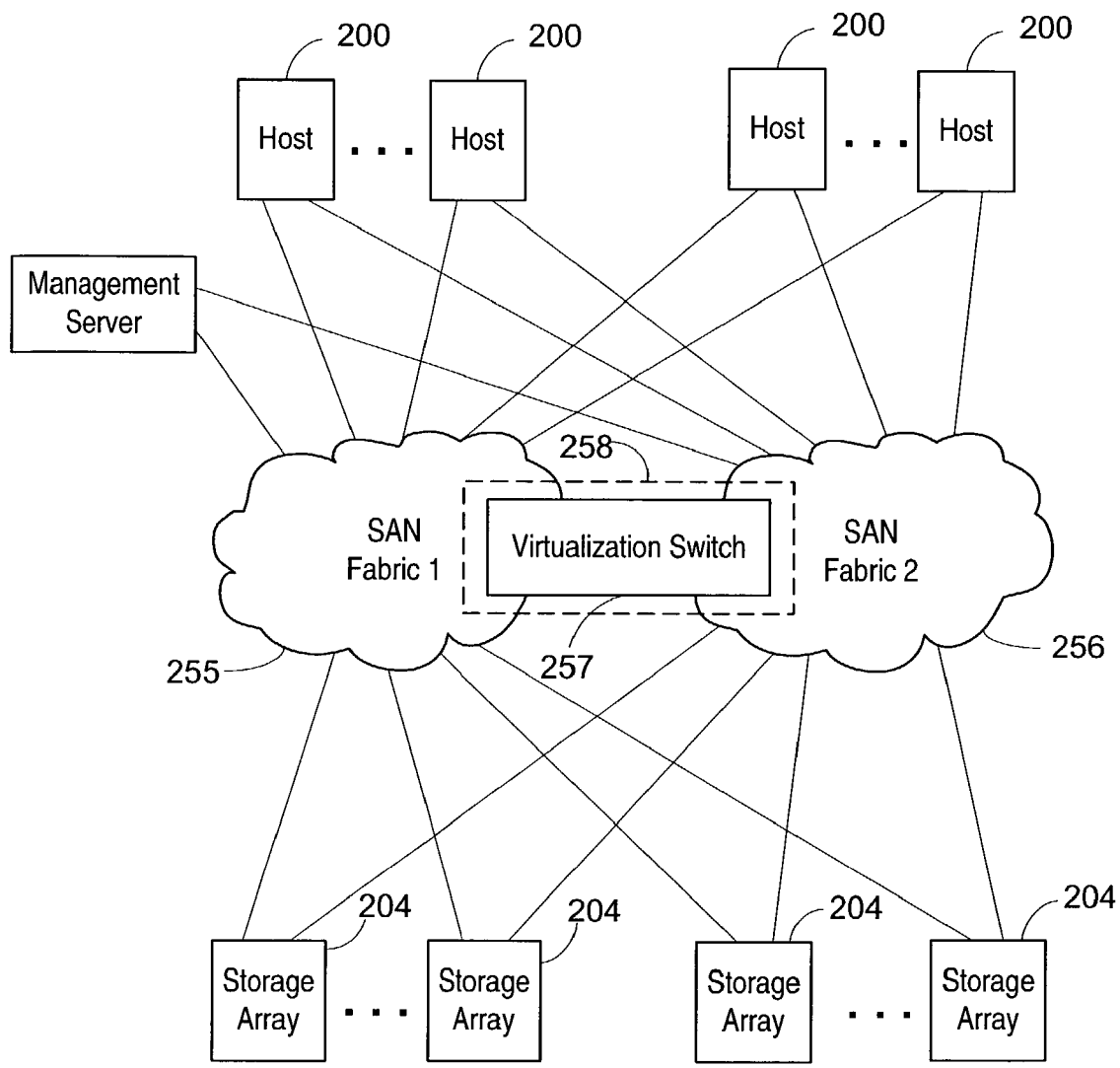
FIG. 6B is a block diagram of the dual Fabric SAN of FIG. 6A in a redundant topology.

FIG. 6A illustrates a dual fabric SAN. Hosts 200-1 connect to a first SAN fabric 255, with storage arrays 204-1 also connected to the fabric 255. Similarly hosts 200-2 connect to a second SAN fabric 256, with storage arrays 204-2 also connected to the fabric 256. A virtualization switch 257 is contained in both fabrics 255 and 256, so the virtualization switch 257 can virtualize devices across the two fabrics. FIG. 6B illustrates the dual fabric SAN of FIG. 6A in a redundant topology where each host 200 and each storage array 204 is connected to each fabric 255 and 256.

Figure 7B:
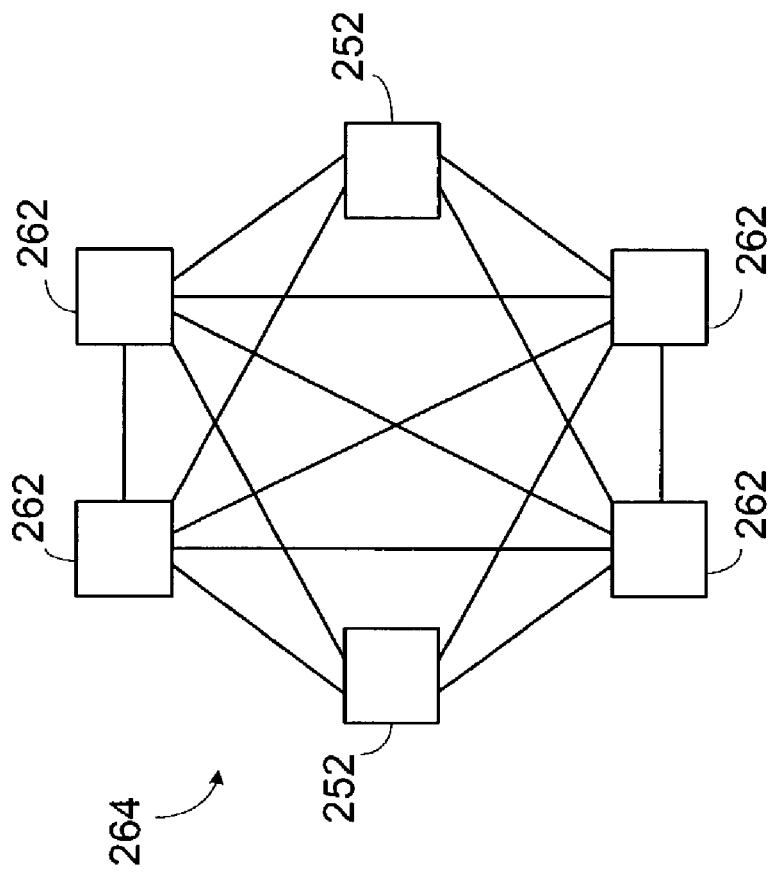
FIGS. 7b, 8b, 9b, 10b, and 11b are the SAN topologies of FIGS. 7a, 8a, 9a, 10a, 11a including virtualization switches.
Figure 7A:
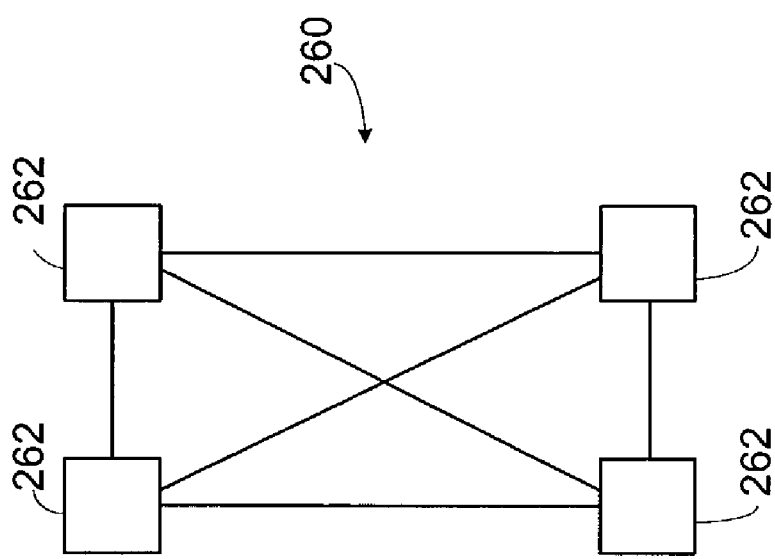
FIGS. 7a, 8a, 9a, 10a, and 11a are drawings of single fabric SAN topologies.

Referring now to FIG. 7A, a simple four switch fabric 260 according to the prior art is shown. Four switches 262 are interconnected to provide a full interconnecting fabric. Referring then to FIG. 7B, the fabric 260 is altered as shown to become a fabric 264 by the addition of two virtualization switches 252 in addition to the switches 262. As can be seen, the virtualization switches 252 are both directly connected to each of the conventional switches 262 by inter-switch links (ISLs). This allows all virtualization frames to directly traverse to the virtualization switches 252, where they are remapped or redirected and then provided to the proper switch 262 for provision to the node devices. As can be seen in FIG. 7B, no reconfiguration of the fabric 260 is required to form the fabric 264, only the addition of the two virtual switches 252 and additional links to those switches 252. This allows the virtualization switches 252 to be added while the fabric 260 is in full operation, without any downtime.

Figures 8A, 8B:
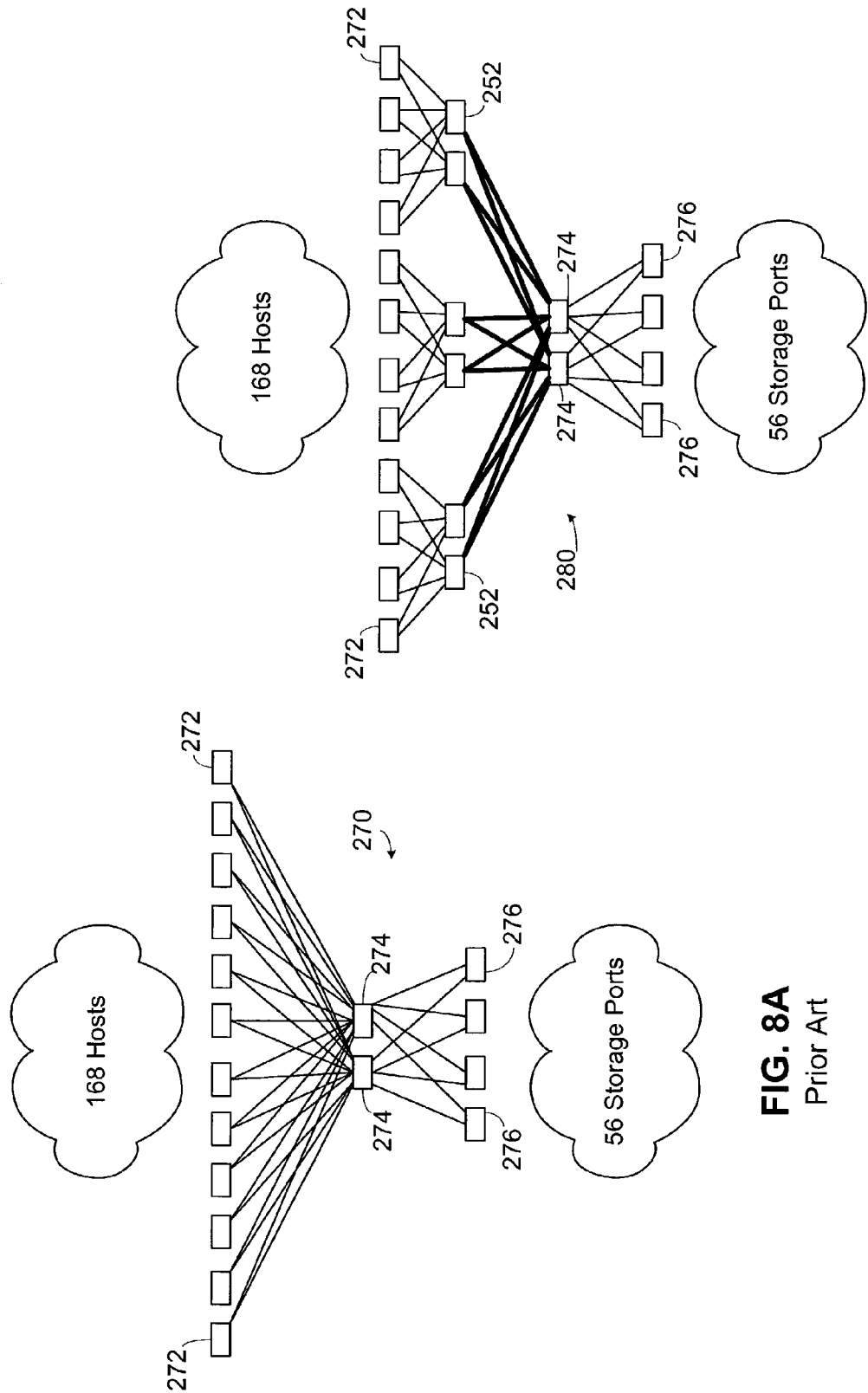

FIG. 8A illustrates a prior art core-edge fabric arrangement 270. In the illustrated embodiment of FIG. 8A, 168 hosts are connected to a plurality of edge switches 272. The edge switches 272 in turn are connected to a pair of core switches 274 which are then in turn connected to a series of edge switches 276 which provide the connection to a series of 56 storage ports. This is considered to be a typical large fabric installation. This design is converted to fabric 280 as shown in FIG. 8B by providing virtualization at the edge of the fabric. The edge switches 272 in this case are connected to a plurality of virtualization switches 252 which are then in turn connected to the core switches 274. The core switches 274 as in FIG. 8A are connected to the edge switches 276 which provide connection to the storage ports.

Figure 9B:
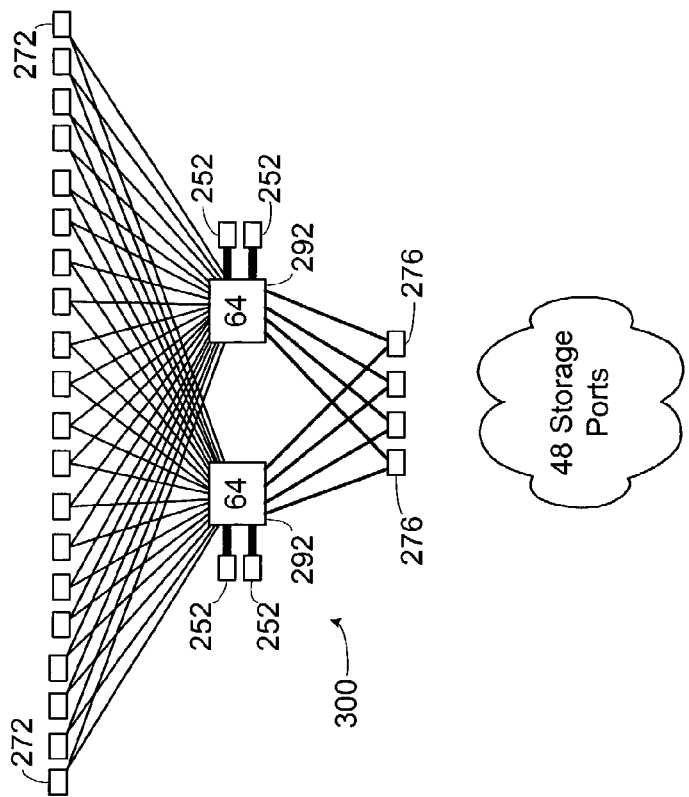
Figure 9A:
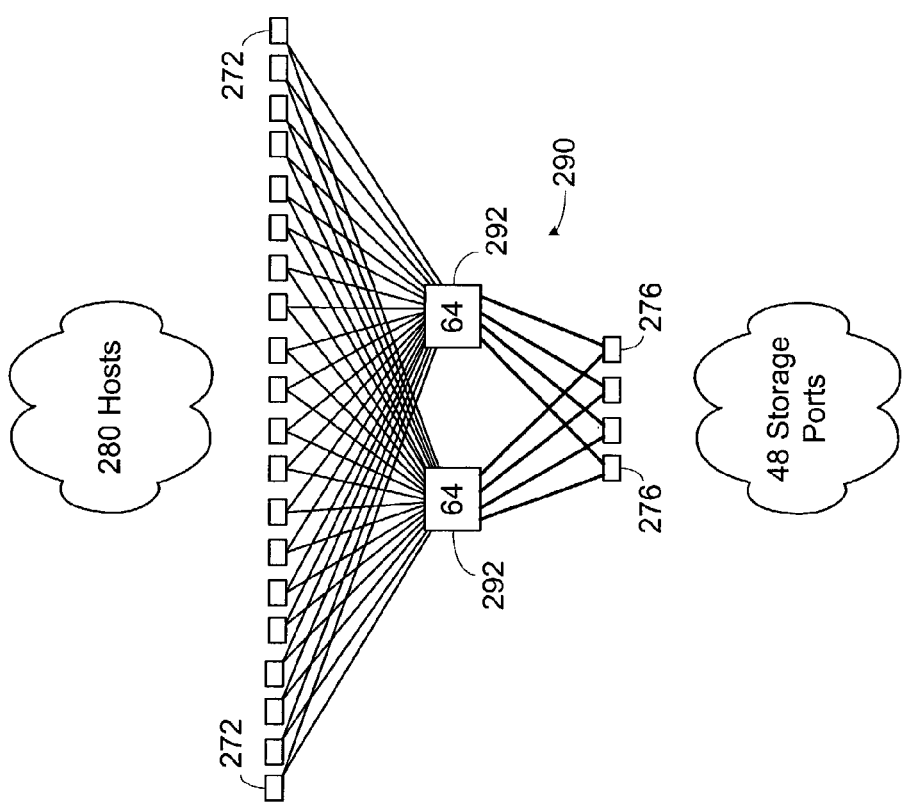

FIG. 9A illustrates an alternative core-edge embodiment of a fabric 290 for interconnection of 280 hosts and forty-eight storage ports. In this embodiment the edge switches 272 are connected to the hosts and then interconnected to a pair of 64 port director switches 292. The director switches 292 are then connected to edge switches 276 which then provide the connection to the storage ports. This design is transformed into fabric 300 by addition of the virtualization switches 252 to the director switches 292. Preferably the virtualization switches 252 are heavily trunked to the director switches 292 as illustrated by the very wide links between the switches 252 and 292. As noted in reference to FIG. 7B this requires no necessary reconnection of the existing fabric 290 to convert to the fabric 300, providing that sufficient ports are available to connect the virtualization switches 252.

Figure 10B:
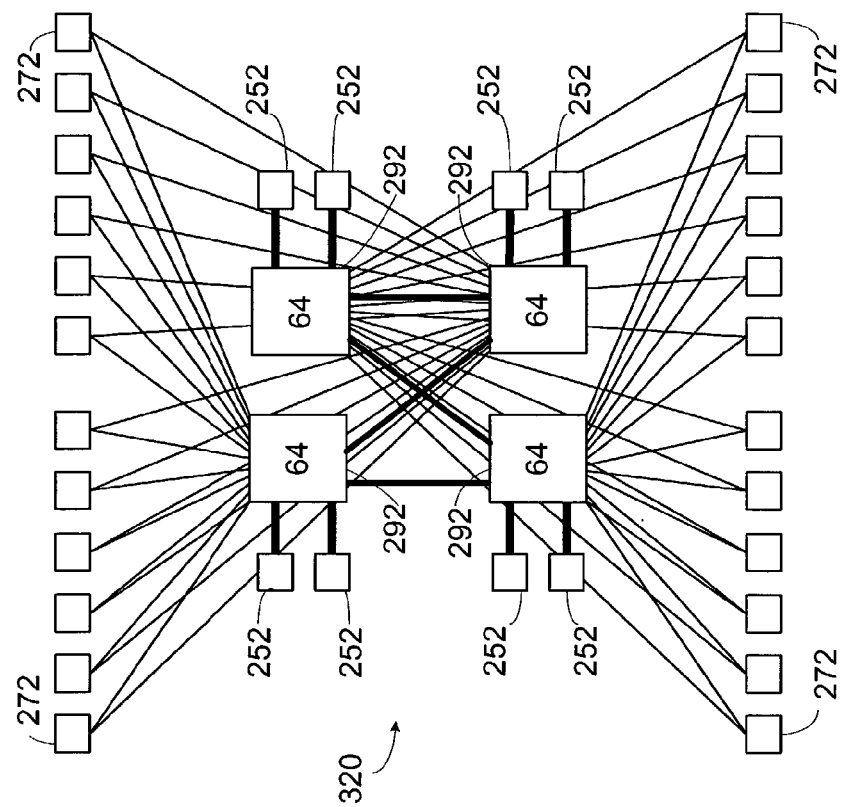
Figure 10A:
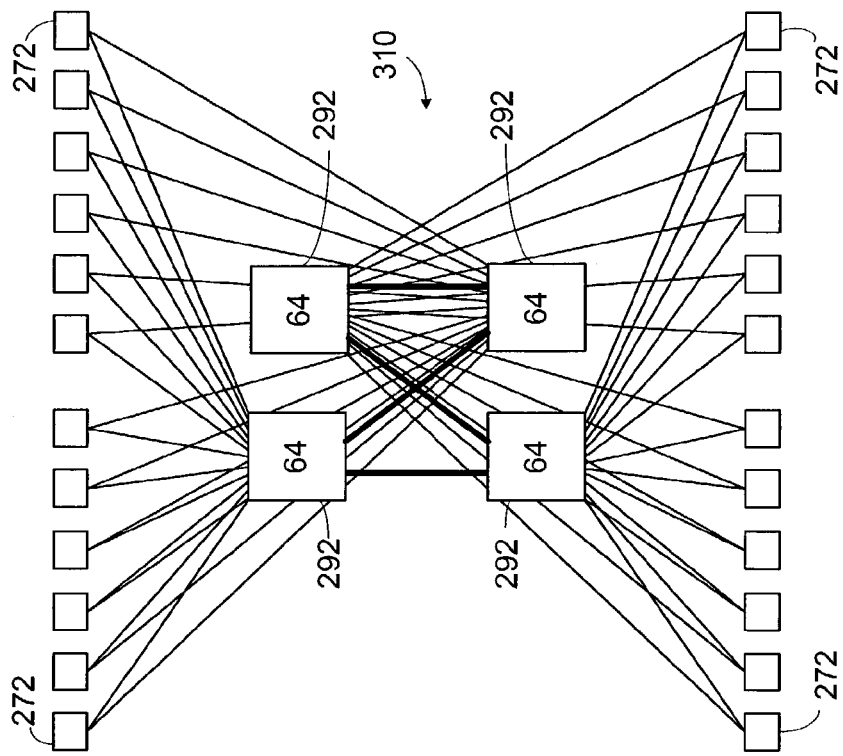

Yet an additional embodiment is shown in FIGS. 10A and 10B. In FIG. 10A a prior art fabric configuration 310 is illustrated. This is referred to as a four by twenty-four architecture because of the presence of four director switches 292 and twenty-four edge switches 272. As seen, the director switches 292 interconnect with very wide backbones or trunk links. This fabric 310 is converted to a virtualizing network fabric 320 as shown in FIG. 10B by the addition of virtualization switches 252 to the director switches 292.

Figures 11A, 11B:
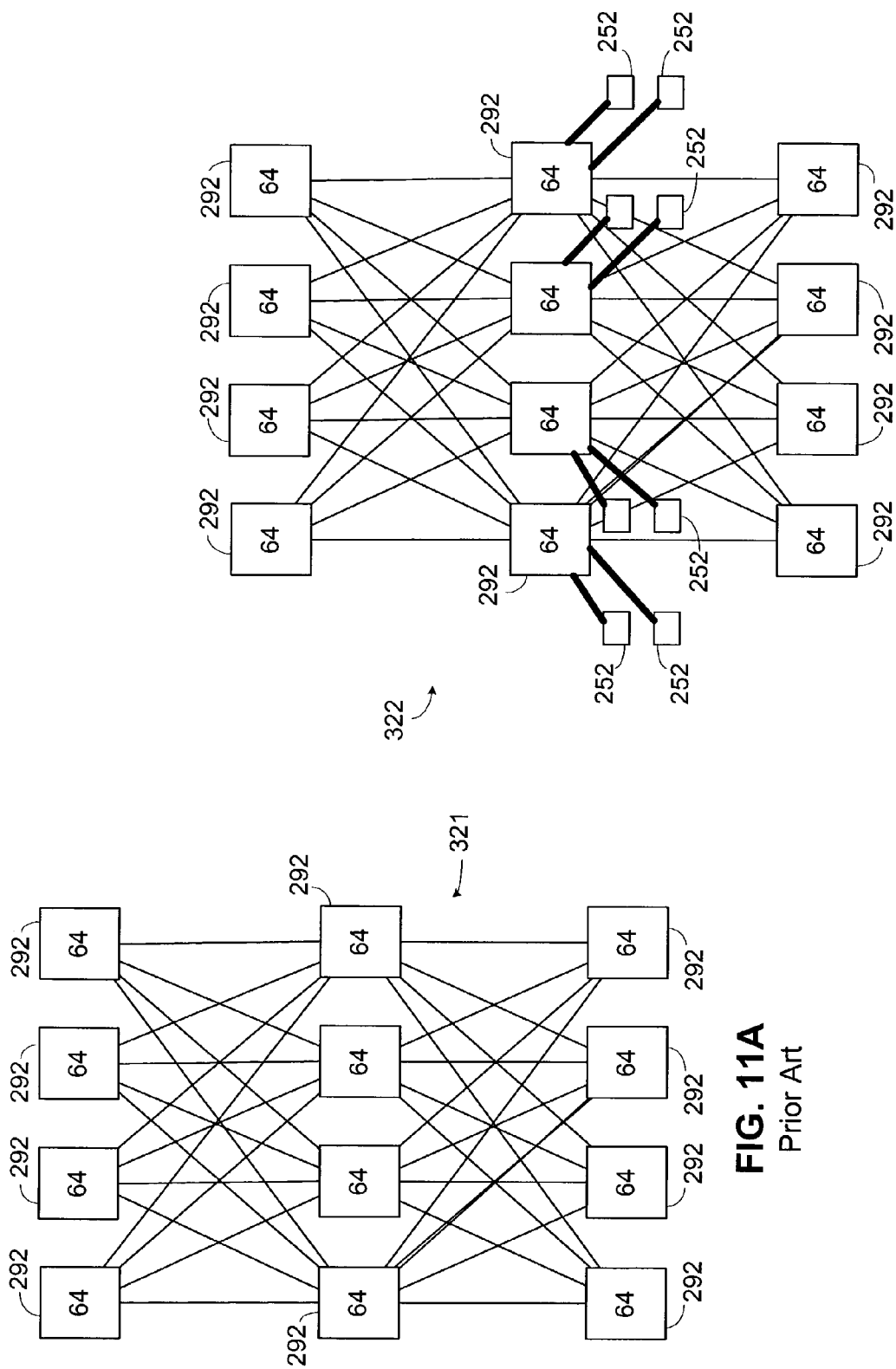

An alternative embodiment is shown in FIGS. 11A and 11B. In the fabric embodiment 321 in FIG. 11A, a first tier of director switches 292 are connected to a central tier of director switches 292 and a lower tier of director switches 292 is connected to that center tier of switches 292. This fabric 320 is converted to a virtualized fabric 322 as shown in FIG. 11B by the connection of virtualization switches 252 to the central tier of directed class switches 292 as shown.

Figure 12:
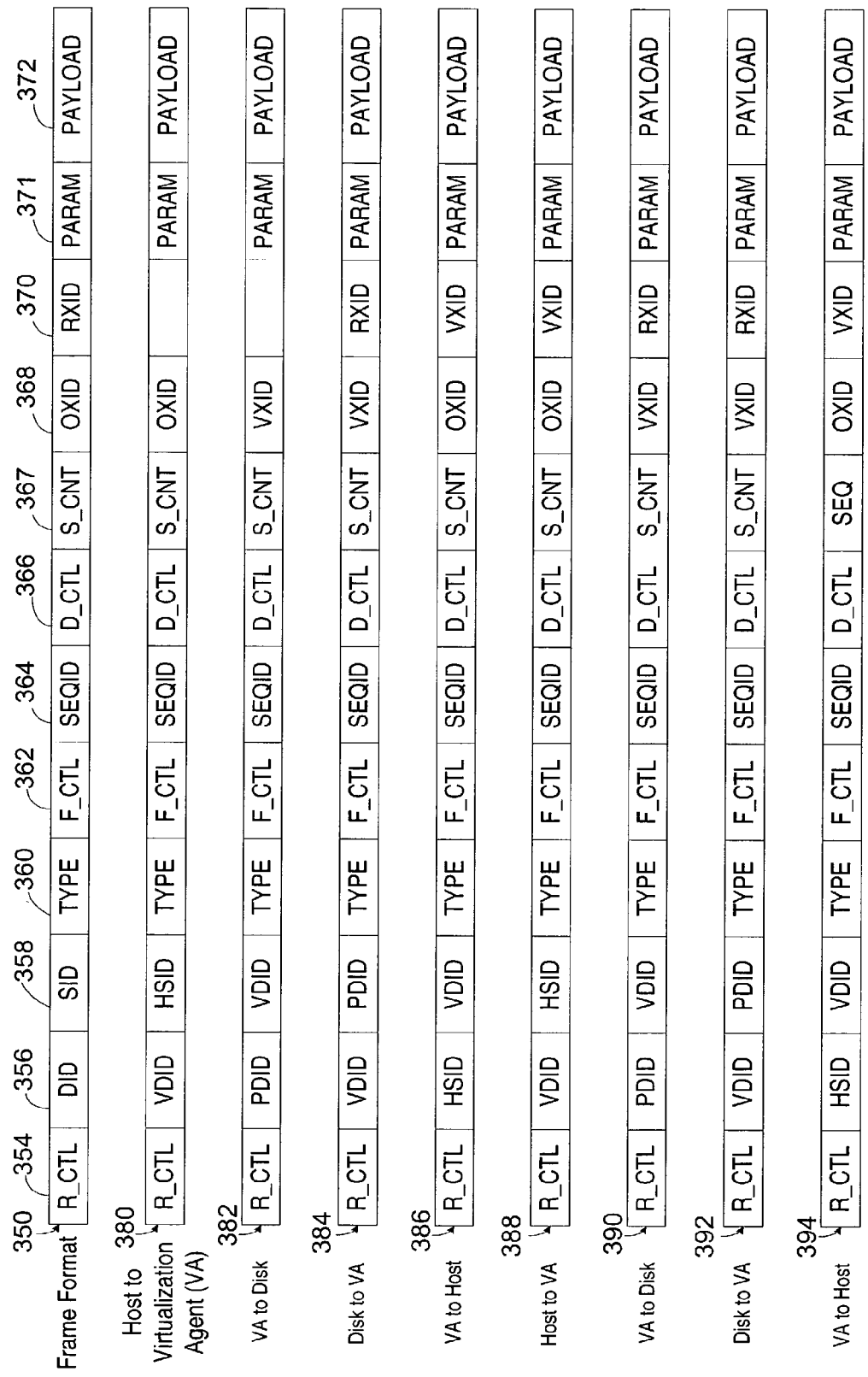
FIG. 12 is a diagram indicating the change in header information for frames in a virtualization environment.

FIG. 12 is an illustration of the translations of the header of the Fibre Channel frames by the virtualization switch. More details on the format of Fibre Channel frames is available in the FC-PH specification, ANSI X3.230—1994, which is hereby incorporated by reference. Frame 350 illustrates the frame format according to the Fibre Channel standard. The first field is the R_CTL field 354, which indicates a routing control field to effectively indicate the type of frame, such as FC-4 device or link data, basic or extended link data, solicited, unsolicited, etc. The DID field 356 contains the 24-bit destination ID of the frame, while the SID field 358 is the source identification field to indicate the source of the frame. The TYPE field 360 indicates the protocol of the frame, such as basic or extended link service, SCSI-FCP, etc. as indicated by the Fibre Channel standard. The frame control or F_CTL field 362 contains control information relating to the frame content. The sequence ID or SEQID field 364 provides a unique value used for tracking frames. The data field control D_CTL field 366 provides indications of the presence of headers for particular types of data frames. A sequence count or S_CNT field 367 indicates the sequential order of frames in a sequence. The OXID or originator exchange ID field 368 is a unique field provided by the originator or initiator of the exchange to help identify the particular exchange. Similarly, the RXID or responder exchange ID field 370 is a unique field provided by the responder or target so that the OXID 368 and RXID 370 can then be used to track a particular exchange and validated by both the initiator and the responder. A parameter field 371 provides either link control frame information or a relative offset value. Finally, the data payload 372 follows this header information.

Frame 380 is an example of an initial virtualization frame sent from the host to the virtualization agent, in this case the virtualization switch 252. As can be seen, the DID field 356 contains the value VDID which represents the ID of one of the ports of the virtualization agent. The source ID field 358 contains the value represented as HSID or host source ID. It is also noted that an OXID value is provided in field 368. This frame 380 is received by the virtualization agent and has certain header information changed based on the mapping provided in the virtualization system. Therefore, the virtualization agent provides frame 382 to the physical disk. As can be seen, the destination ID 356 has been changed to a value PDID to indicate the physical disk ID while the source ID field 358 has been changed to indicate that the frame is coming from the virtual disk ID device of VDID. Further it can be seen that the originator exchange ID field 368 has been changed to a value of VXID provided by the virtualization agent. The physical disk responds to the frame 382 by providing a frame 384 to the virtualization agent. As can be seen, the destination ID field 356 contains the VDID value of the virtualization agent, while the source ID field 358 contains the PDID value of the physical disk. The originator exchange ID field 368 remains at the VXID value provided by the virtualization agent and an RXID value has been provided by the disk. The virtualization agent receives frame 384 and changes information in the header as indicated to provide frame 386. In this case the destination ID field 356 has been changed to the HSID value originally provided in frame 380, while the source ID field 358 receives the VDID value. The originator exchange ID field 368 receives the original OXID value while the responder exchange field 370 receives the VXID value. It is noted that the VXID value is used as the originator exchange ID in frames from the virtualization agent to the physical disk and as the responder exchange ID in frames from the virtualization agent to the host. This allows simplified tracking of the particular table information by the virtualization agent. The next frame in the exchange from the host is shown as frame 388 and is similar to frame 380 except that the VXID value is provided as a responder exchange field 370 now that the host has received such value. Frame 390 is the modified frame provided by the virtualization agent to the physical disk with the physical disk ID provided as the destination ID field 356, the virtual disk ID provided as the source ID field 358, the VXID value in the originator exchange ID field 368 and the RXID value originally provided by the physical disk is provided in the responder exchange ID field 370. The physical disk response to the virtualization agent is indicated in the frame 392, which is similar to the frame 384. Similarly the virtualization agent responds and forwards this frame to the host as frame 394, which is similar to frame 388. As can be seen, there are a relatively limited number of fields which must be changed for the majority of data frames being converted or translated by the virtualization agent.

Not shown in FIG. 12 are the conversions which must occur in the payload, for example, to SCSI-FCP frames. The virtualization agent analyzes an FCP-CMND frame to extract the LUN and LBA fields, and in conjunction with the virtual to physical disk mapping, converts the LUN and LBA values as appropriate for the physical disk which is to receive the beginning of the frame sequence. If the sequence spans multiple physical drives, when an error or completion frame is returned from the physical disk when its area is exceeded, the virtualization agent remaps the FCP-CMND frame to the LUN and LBA of the next physical disk and changes the physical disk ID as necessary.

Figure 13:
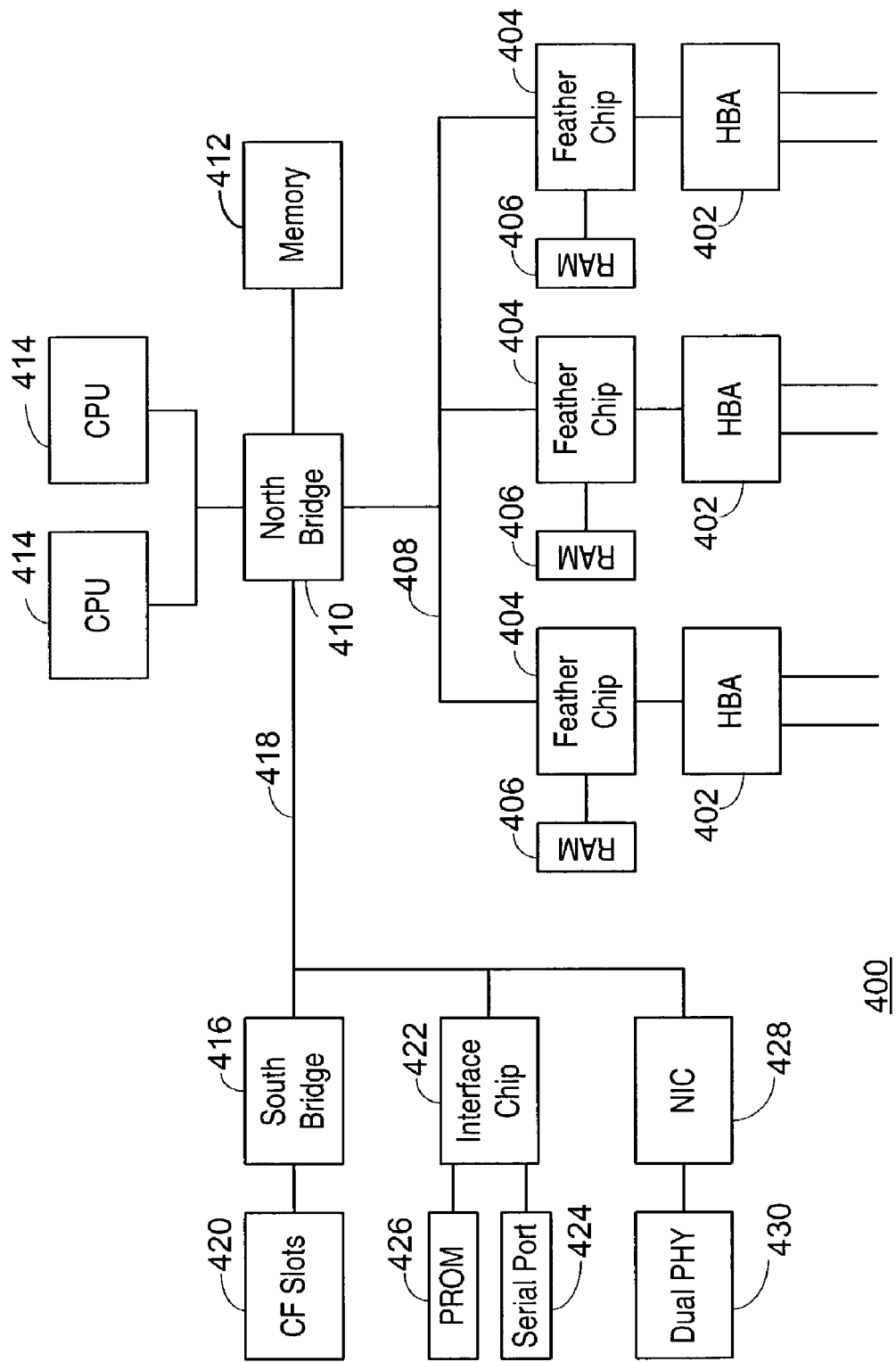
FIG. 13 is a block diagram of a first embodiment of a virtualization switch.

FIG. 13 illustrates a virtualization switch 400. A plurality of HBAs 402 are provided to connect to the fabric of the SAN. Each of the HBAs 402 is connected to an ASIC referred to the Feather chip 404. The Feather chip 404 is preferably a PCI-X to PCI-X bridge and a DRAM memory controller. Connected to each Feather Chip 404 is a bank of memory or RAM 406. This allows the HBA 402 to provide any frames that must be forwarded for further processing to the RAM 406 by performing a DMA operation to the Feather chip 404, and into the RAM 406. Because the Feather chip 404 is a bridge, this DMA operation is performed without utilizing any bandwidth on the second PCI bus. Each of the Feather chips 404 is connected by a bus 408, preferably a PCI-X bus, to a north bridge 410. Switch memory 412 is connected to the north bridge 410, as are one or two processors or CPUs 414. The CPUs 414 use the memory 412 for code storage and for data storage for CPU purposes. Additionally, the CPUs 414 can access the RAM 406 connected to each of the Feather chips 404 to perform frame retrieval and manipulation as illustrated in FIG. 12. The north bridge 410 is additionally connected to a south bridge 416 by a second PCI bus 418. CompactFlash slots 420, preferably containing CompactFlash memory which contains the operating system of the switch 400, are connected to the south bridge 416. An interface chip 422 is connected to the bus 418 to provide access to a serial port 424 for configuration and debug of the switch 400 and to a ROM 426 to provide boot capability for the switch 400. Additionally, a network interface chip 428 is connected to the bus 418. A PHY, preferably a dual PHY, 430 is connected to the network interface chip 428 to provide an Ethernet interface for management of the switch 400.

Figure 14A:
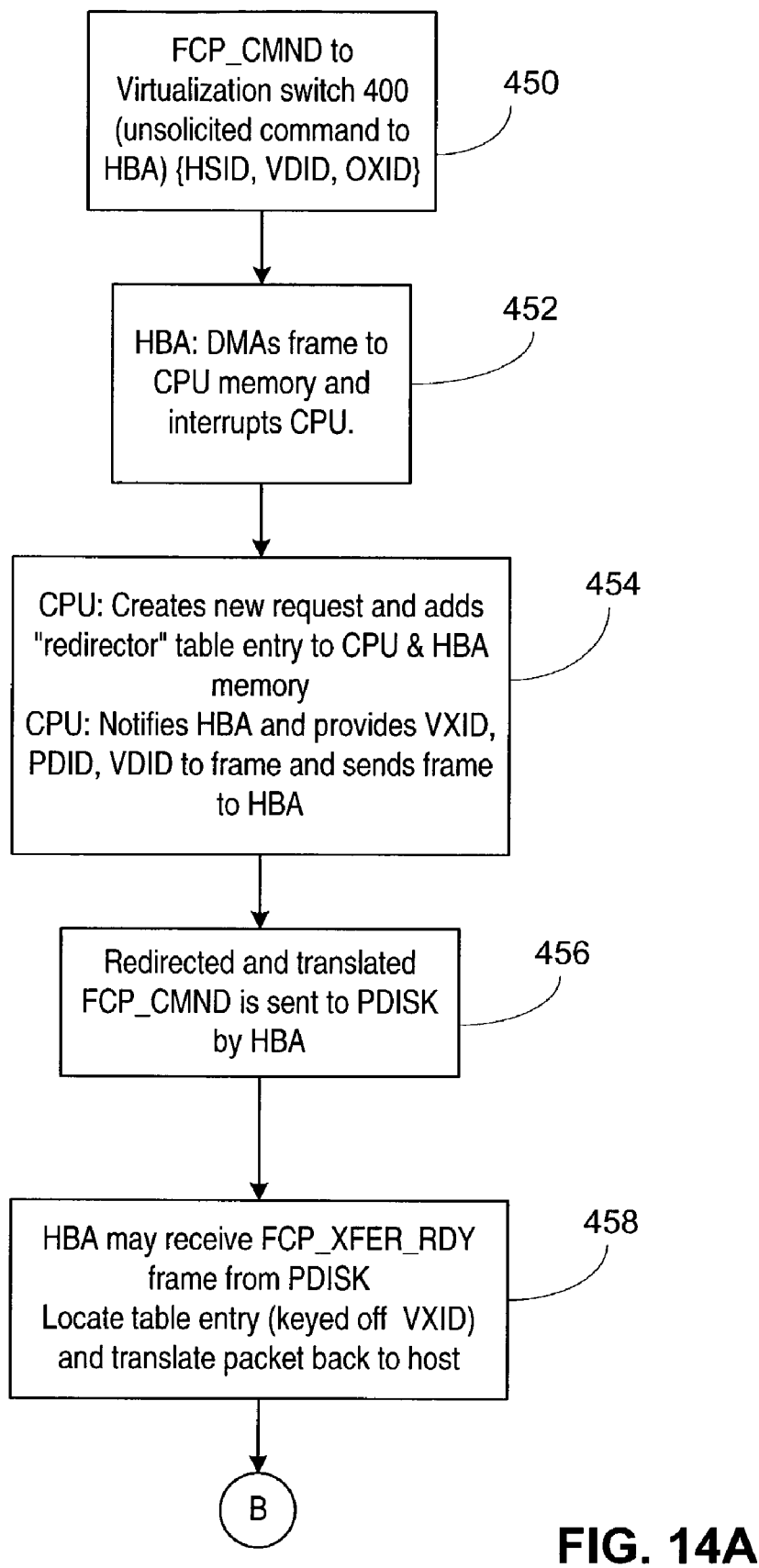
FIGS. 14a, 14b, and 14c are a flowchart illustration of the operating sequences for various commands received by the virtualization switch of FIG. 13.
Figure 14B:
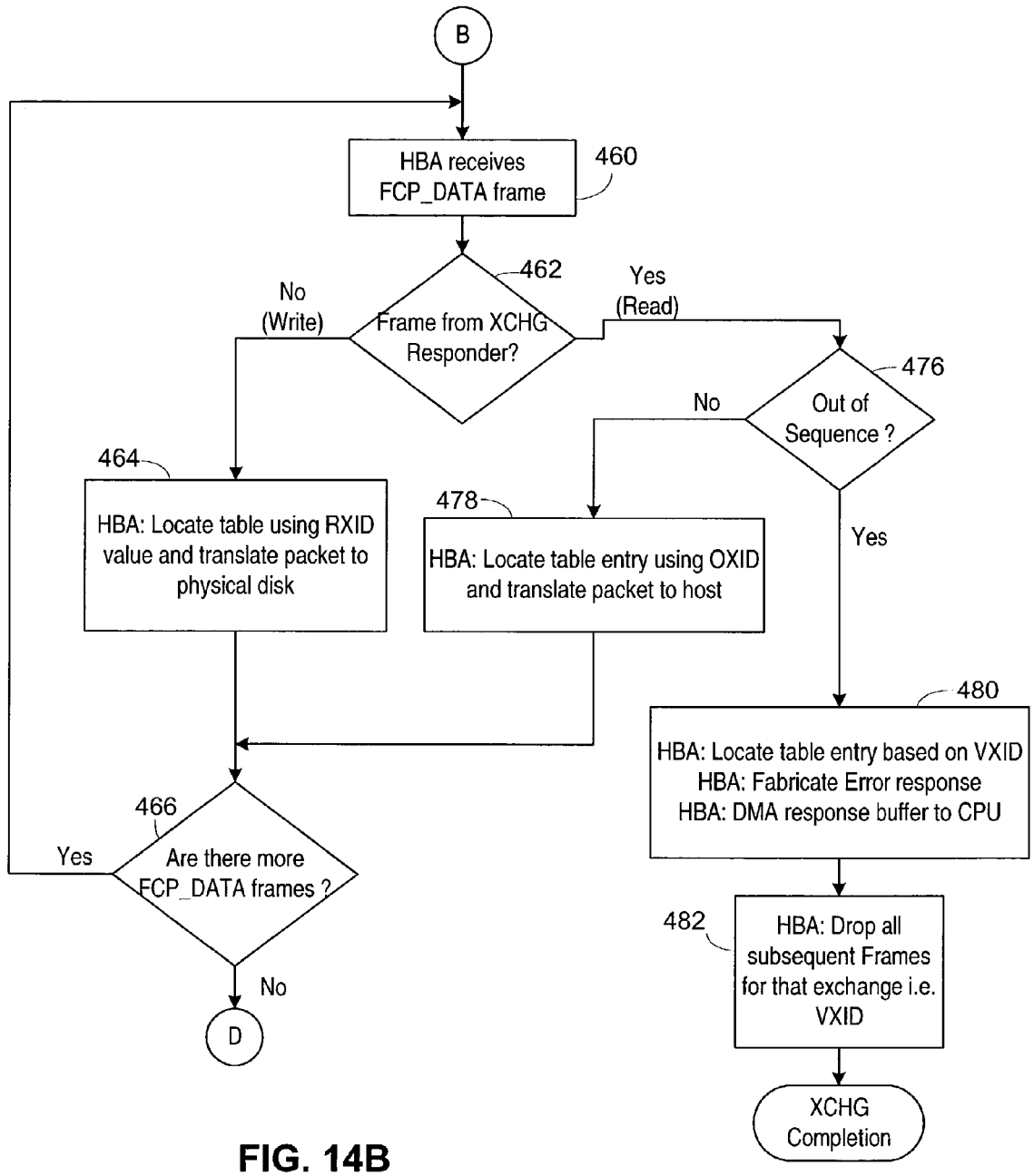
Figure 14C:
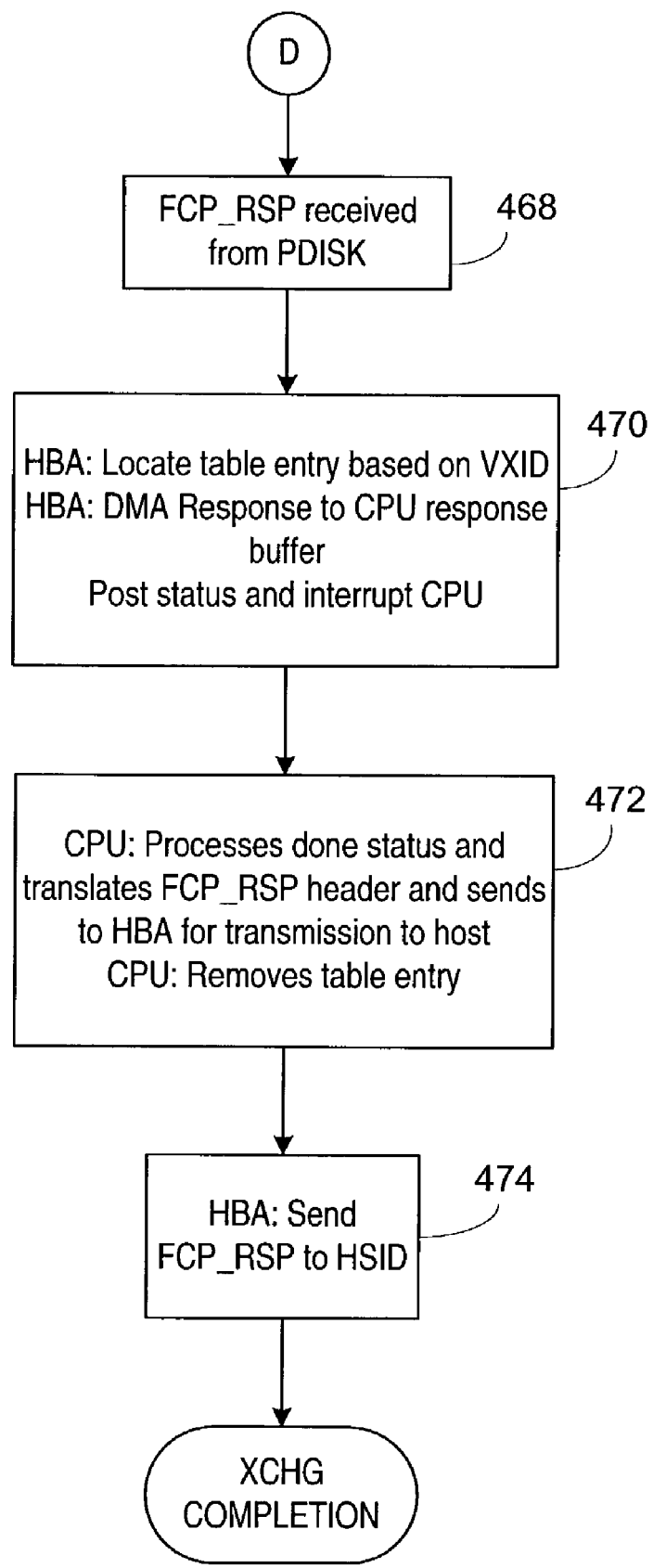

The operational flow of a frame sequence using the switch 400 of FIG. 13 is illustrated in FIGS. 14A, 14B and 14C. A sequence starts at step 450 where an FCP_CMND or command frame is received at the virtualization switch 400. This is an unsolicited command to an HBA 402. This command will be using HSID, VDID and OXID as seen in FIG. 12. The VDID value was the DID value for this frame due to the operation of the management server. During initialization of the virtualization services, the management server will direct the virtualization agent to create a virtual disk. The management server will query the virtualization agent, which in turn will provide the IDs and other information of the various ports on the 1BAs 402 and the LUN information for the virtual disk being created. The management server will then provide one or more of those IDs as the virtual disk ID, along with the LUN information, to each of the hosts. The management server will also provide the virtual disk to physical disk swapping information to the virtualization agent to enable it to build its redirection tables. Therefore requests to a virtual disk may be directed to any of the HBA 402 ports, with the proper redirection to the physical disk occurring in each HBA 402.

In step 452 the fBA 402 provides this FCP_CMND frame to the RAM 406 and interrupts the CPU 414, indicating that the frame has been stored in the RAM 406. In step 454 the CPU 414 acknowledges that this is a request for a new exchange and as a result adds a redirector table entry to a redirection or virtualization table in the CPU memory 412 and in RAM 406 associated with the HBA 402 (or alternatively, additionally stored in the HBA 402). This table entry to both of the memories is loaded with the HSID, the PDID of the proper physical disk, the VDID, the originator or OXID exchange value and the VXID or virtual exchange value. Additionally, the CPU provides the VXID, PDID, and VDID values to the proper locations in the header and proper LUN and LBA values in the body of the FCP_CMND frame the RAM 406 and then indicates to the HBA 402 that the frame is available for transmission.

In step 456 the HBA 402 sends the redirected and translated FCP_CMND frame to the physical disk as indicated as appropriate by the CPU 414. In step 458 the HBA 402 receives an FCP_XFER_RDY frame from the physical disk to indicate that it is ready for the start of the data transfer portion of the sequence. The HBA 402 then locates the proper table entry in the RAM 406 (or in its internal table) by utilizing the VXID sequence value that will have been returned by the physical disk. Using this table entry and the values contained therein, the HBA 402 will translate the frame header values to those appropriate as shown in FIG. 12 for transmission of this frame back to the host. Additionally, the HBA 402 will note the RXID value from the physical disk and store it in the various table entries. In step 460 the HBA 402 receives a data frame, as indicated by the FCP_DATA frame. In step 462 the HBA 402 determines whether the frame is from the responder or the originator, i.e., from the physical disk or from the host. If the frame is from the originator, i.e., the host, control proceeds to step 464 where the HBA 402 locates the proper table entry using the VXID exchange ID contained in the RXID location in the header and translates the frame header information as shown in FIG. 12 for translation and forwarding to the physical disk. Control then proceeds to step 466 to determine if there are any more FCP_DATA frames in this sequence. If so, control returns to step 460. If not, control proceeds to step 468 where the HBA 402 receives an FCP_RSP frame from the physical disk, indicating completion of the sequence. In step 470, the HBA 402 then locates the table entry using the VXID value, DMAs the FCP_RSP or response frame to the RAM 406 and interrupts the CPU 414. In step 472, the CPU 414 processes the completed exchange by first translating the FCP_RSP frame header and sending this frame to the HBA 402 for transmission to the host. The CPU 414 next removes this particular exchange table entry from the memory 412 and the RAM 406, thus completing this exchange operation. Control then proceeds to step 474 where the HBA 402 sends the translated FCP_RSP frame to the host.

If this was a return of a frame from the responder, i.e. the disk drive, control proceeds from step 462 to step 476 to determine if the response frame is out of sequence. If not, which is conventional for Fibre Channel operations, the HBA 402 locates the table entry utilizing the VXID value in the OXID location in the header and translates the frame for host transmission. Control then proceeds to step 466 for receipt of additional data frames.

If the particular frame is out of sequence in step 476, control proceeds to step 480 where the HBA 402 locates the table entry based on the VXID value and prepares an error response. This error response is provided to the CPU 414. In step 482, the HBA 402 drops all subsequent frames relating to that particular exchange VXID as this is now an erroneous sequence exchange because of the out of sequence operation.

Therefore operation of the virtualization switch 400 is accomplished by having the switch 400 setup with various virtual disk IDs, so that the hosts send all virtual disk operations to the switch 400. Any frames not directed to a virtual disk would be routed normally by the other switches in the fabric. The switch 400 then translates the received frames, with setup and completion frames being handled by a CPU 414 but with the rest of the frames handled by the HBAs 402 to provide high speed operation. The redirected frames from the switch 400 are then forwarded to the proper physical disk. The physical disk replies to the switch 400, which redirects the frames to the proper host. Therefore, the switch 400 can be added to an existing fabric with disturbing operations.

Figure 15:
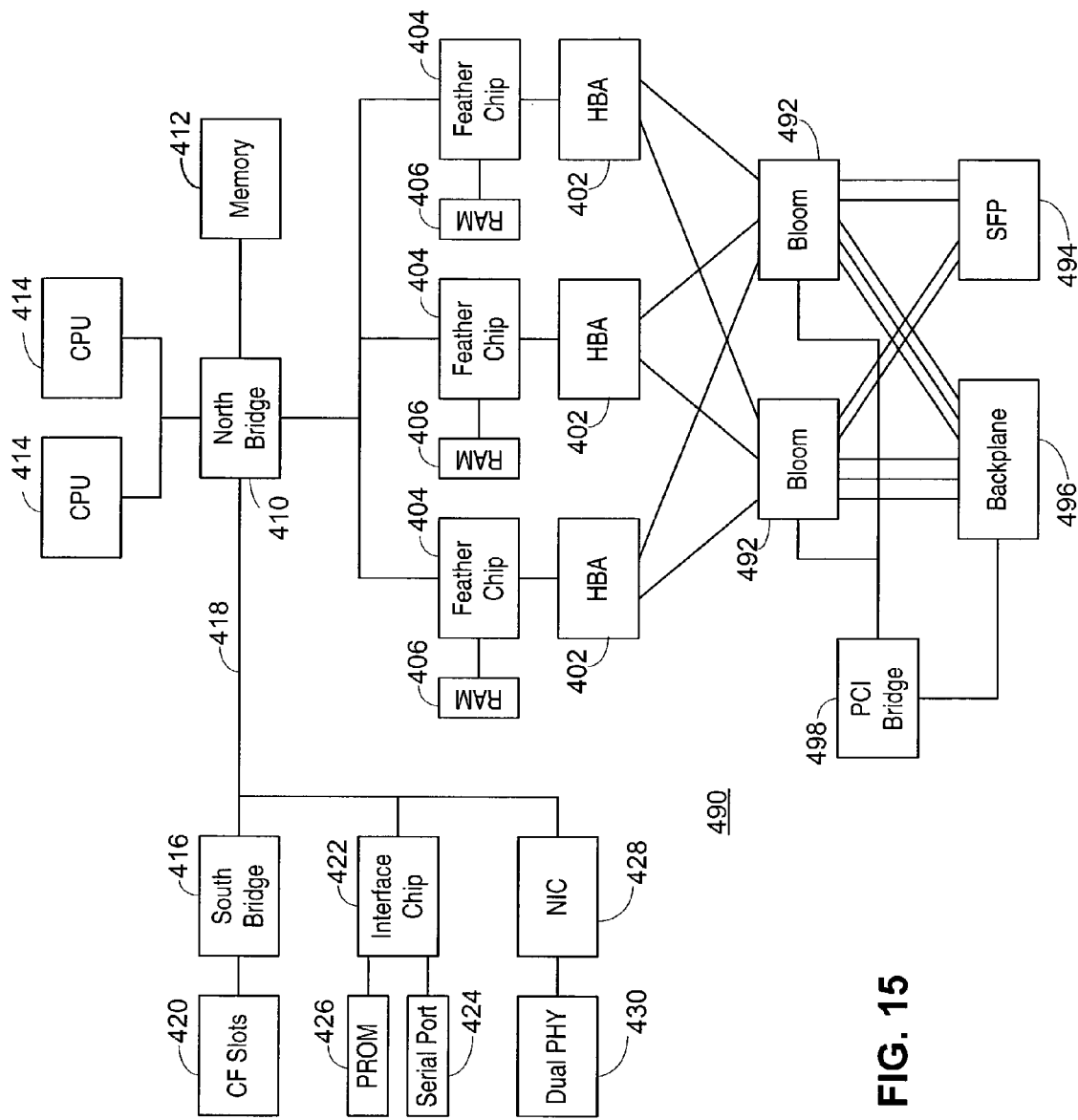
FIG. 15 is a block diagram of a virtualization switch according to FIG. 13 for installation in a director class Fibre Channel switch.

The switch 400 in FIG. 13 is a standalone switch for installation as a single physical unit. An alternative embodiment of the switch 400 is shown as the switch 490 in FIG. 15 which is designed for use as a pluggable blade in a larger switch, such as the SilkWorm 12000 by Brocade Communications Systems. In this case, like elements have received like numbers. In the switch 490 the HBAs 402 are connected to Bloom ASICs 492. Bloom chips are mini-switches, preferably eight port mini-switches in a single ASIC. They are full featured Fibre Channel switches. The Bloom ASICs 492 are connected to an SFP or media interface 494 for connection to the fabric, preferably with four ports directly connecting to the fabric. In addition, each Bloom ASIC 492 has three links connecting to a back plane connector 496 for interconnection inside the larger switch. Each Bloom ASIC 492 is also connected to a PCI bridge 498, which is also connected to the backplane connector 496 to allow operation by a central control processor in the larger switch. This provides a fully integrated virtualization switch 490 for use in a fabric containing a director switch. The switch 490 can be like the switch 400 by having the fabric connected to the SFPs 494 or can be connected to the fabric by use of the backplane connector 496 and internal links to ports within the larger switch.

Figure 16:
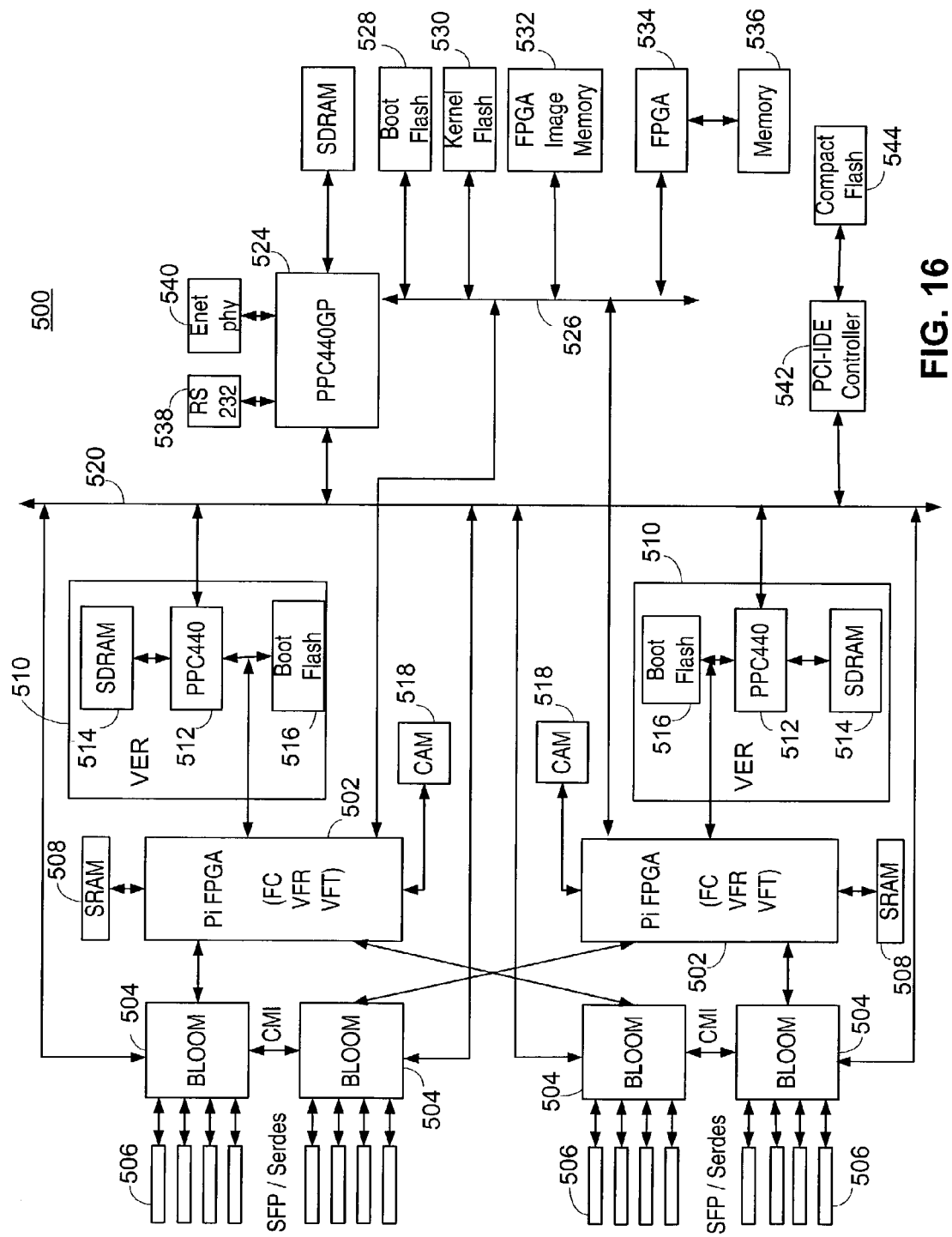
FIG. 16 is a block diagram of an alternate preferred embodiment of a virtualization switch.

Proceeding now to FIG. 16, a diagram of a virtualization switch 500 is illustrated. In the virtualization switch 500 a pair of FPGAs 502, referred to as the pi FPGAs, provide the primary hardware support for the virtualization translations. Four Bloom ASICs 504 are interconnected to form two Bloom ASIC pairs. A more detailed description of the Bloom ASIC is provided in U.S. patent application Ser. No. 10/124, 303, filed Apr. 17, 2002, entitled "Frame Filtering of Fibre channel Frames," which is hereby incorporated by reference. One of the Bloom ASICs 504 in each pair is connected to one of the pi FPGAs 502 so that each Bloom ASIC pair is connected to both pi FPGAs 502. Each of the Bloom ASICs 504 is connected to a series of four serializer/deserializer chips and SFP interface modules 506 so that each Bloom ASIC 504 provides four external ports for the virtualization switch 500, for a total of sixteen external ports in the illustrated embodiment. Also connected to each pi FPGA 502 is an SRAM module 508 to provide storage for the IO tables utilized in remapping and translation of the frames. Each of the pi FPGAs 502 is also connected to a VER or virtualized exchange redirector 510, also referred to as a virtualization engine. The VER 510 includes a CPU 512, SDRAM 514, and boot flash ROM 516. In this manner the VER 510 can provide high level support to the pi FPGA 502 in the same manner as the CPUs 414 in the virtualization switch 400. A content addressable memory (CAM) 518 is connected to each of the pi FPGAs 502. The CAM 518 contains the VER map table containing virtual disk extent information.

A PCI bus 520 provides a central bus backbone for the virtualization switch 500. Each of the Bloom ASICs 504 and the VERs 510 are connected to the PCI bus 520. A switch processor 524 is also connected to the PCI bus 520 to allow communication with the other PCI bus 520 connected devices and to provide overall control of the virtualization switch 500. A processor bus 526 is provided from the processor 524. Connected to this processor bus 526 are a boot flash ROM 528, to enable the processor 524 to start operation; a kernel flash ROM 530, which contains the primary operating system in the virtualization switch 500; an FPGA memory 532, which contains the images of the various FPGAs, such as pi FPGA 502; and an FPGA 534, which is a memory controller interface to memory 536 which is used by the processor 524.

Additionally connected to the processor 524 are an RS232 serial interface 538 and an Ethernet PHY interface 540. Additionally connected to the PCI bus 520 is a PCI IDE or integrated drive electronics controller 542 which is connected to CompactFlash memory 544 to provide additional bulk memory to the virtualization switch 500. Thus, as a very high level comparison between switches 400 and 500, the Bloom ASICs 504 and pi FPGAs 502 replace the HBAs 402 and the VERs 510 and processor 524 replace the CPUs 414.

Figure 17:
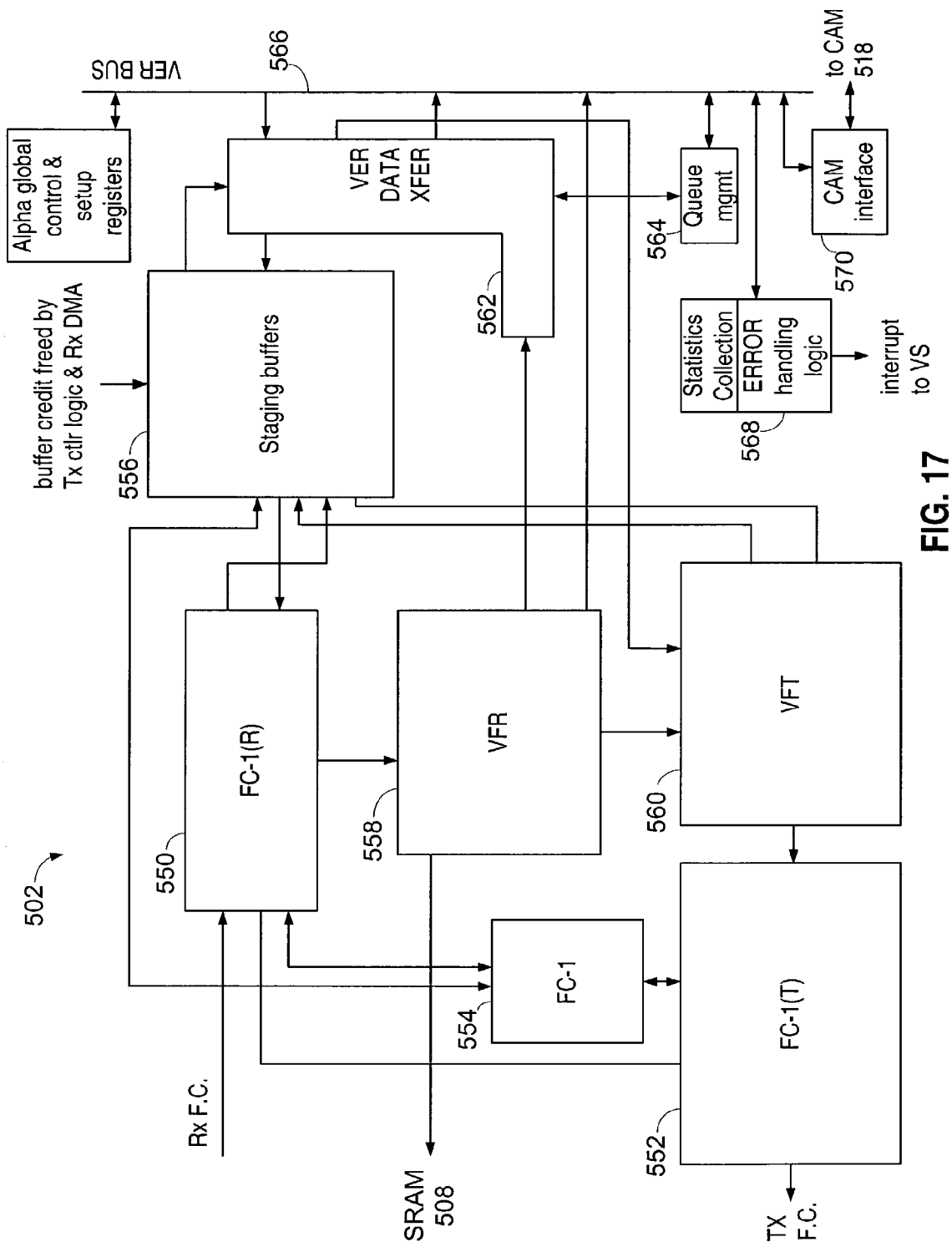
FIG. 17 is a block diagram of the pi FPGA of FIG. 18.

The pi FPGA 502 is illustrated in more detail in FIG. 17. The receive portions of the Fibre Channel links are provided to the FC-1(R) block 550. In the preferred embodiment there are eight FC-1(R) blocks 500, one for each Fibre Channel link. Only one is illustrated for simplicity. The FC-1(R) block 550 is a Fibre Channel receive block. Similarly, the transmit portions of the Fibre Channels links of the pi FPGA 502 are connected to an FC-1(T) block 552, which is the transmit portion of the pi FPGA 502. In the preferred embodiment there are also eight FC-1(T) blocks 552, one for each Fibre Channel link. Again only one is illustrated for simplicity. An FC-1 block 554 is interconnected between the FC-1(R) block 550 and the FC-1(T) block 552 to provide a state machine and to provide buffer to buffer credit logic. The FC-1(R) block 550 is connected to two different blocks, a staging buffer 556 and a VFR block 558. In the preferred embodiment there is one VFR block 558 connected to all of the FC-1(R) blocks 550. The staging buffer 556 contains temporary copies of received frames prior to their provision to the VER 510 or header translation and transmission from the pi FPGA 502. In the preferred embodiment there is only one staging buffer 556 shared by all blocks in the pi FPGA 502. The VFR block 558 performs the virtualization table lookup and routing to determine if the particular received frame has substitution or translation data contained in an IO table or whether this is the first occurrence of the particular frame sequence and so needs to be provided to the VER 510 for setup. The VFR block 558 is connected to a VFT block 560. The VFT block 560 is the virtualization translation block which receives data from the staging buffers when an IO table entry is present as indicated by the VFR block 558. In the preferred embodiment there is one VFT block 560 connected to all of the FC-1(T) blocks 552 and connected to the VFR block 558. Thus there are eight sets of FC-1(R) blocks 550, one VFR block 558, one VFT block 560 and eight FC-1(T) blocks 552. Preferably the eight FC-1(R) blocks 550 and FC-1(T) blocks 552 are organized as two port sets of four to allow simplified connection to two fabrics, as described below. The VFT block 560 does the actual source and destination ID and exchange ID substitutions in the frame, which is then provided to the FC-1(T) block 552 for transmission from the pi FPGA 502.

The VFR block 558 is also connected to a VER data transfer block 562, which is essentially a DMA engine to transfer data to and from the staging buffers 556 and the VER 510 over the VER bus 566. In the preferred embodiment there is also a single data transfer block 562. A queue management block 564 is provided and connected to the data transfer block 562 and to the VER bus 566. The queue management block 564 provides queue management for particular queues inside the data transfer block 562. The VER bus 566 provides an interface between the VER 510 and the pi FPGA 502. A statistics collection and error handling logic block 568 is connected to the VER bus 566. The statistics and error handling logic block 568 handles statistics generation for the pi FPGA 502, such as number of frames handled, and also interrupts the processor 524 upon certain error conditions. A CAM interface block 570 as connected to the VER bus 566 and to the CAM 518 to allow an interface between the pi FPGA 502, the VER 510 and the CAM 518.

Figure 18A:
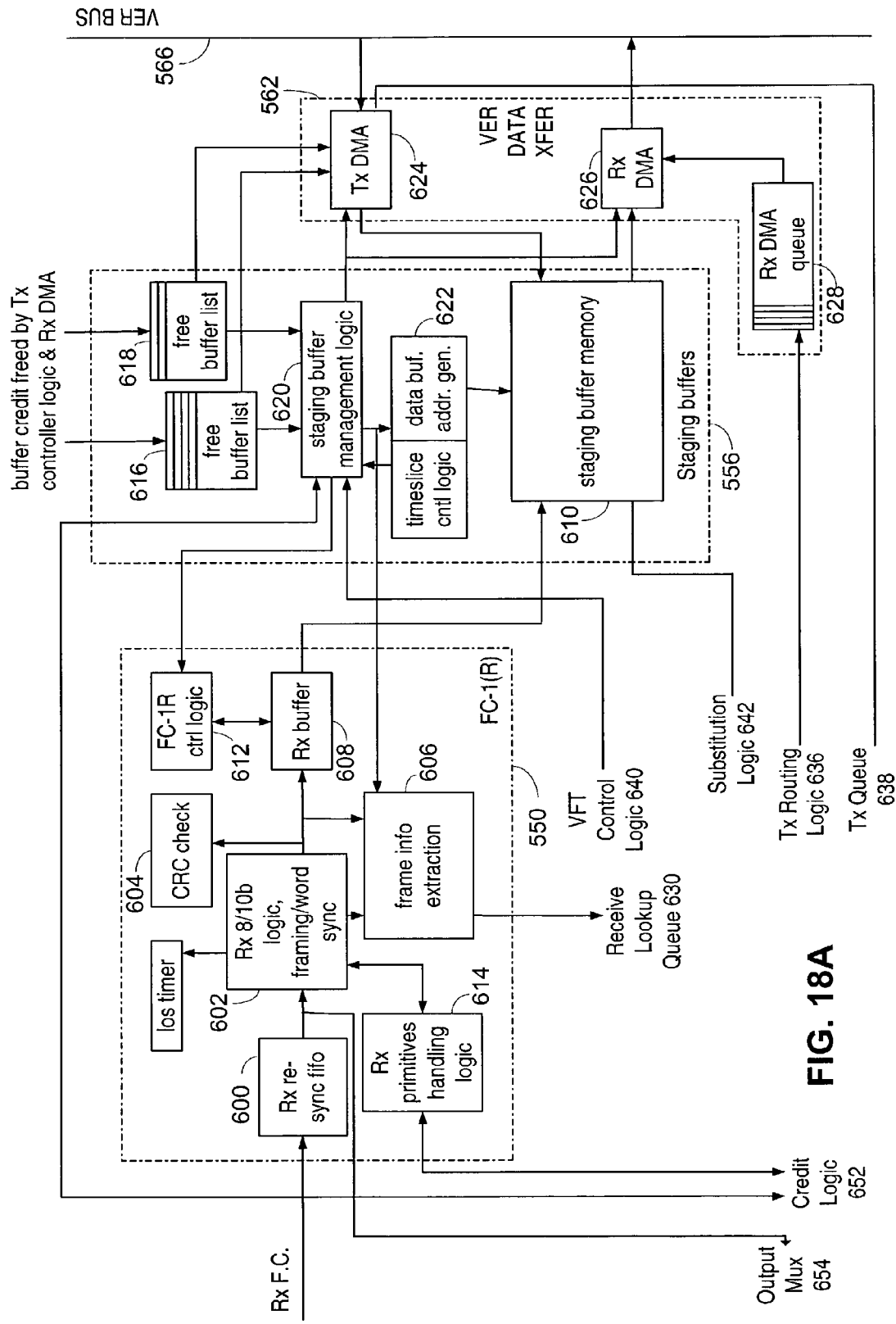
FIGS. 18A and 18B are more detailed block diagrams of the blocks of FIG. 17.
Figure 18B:
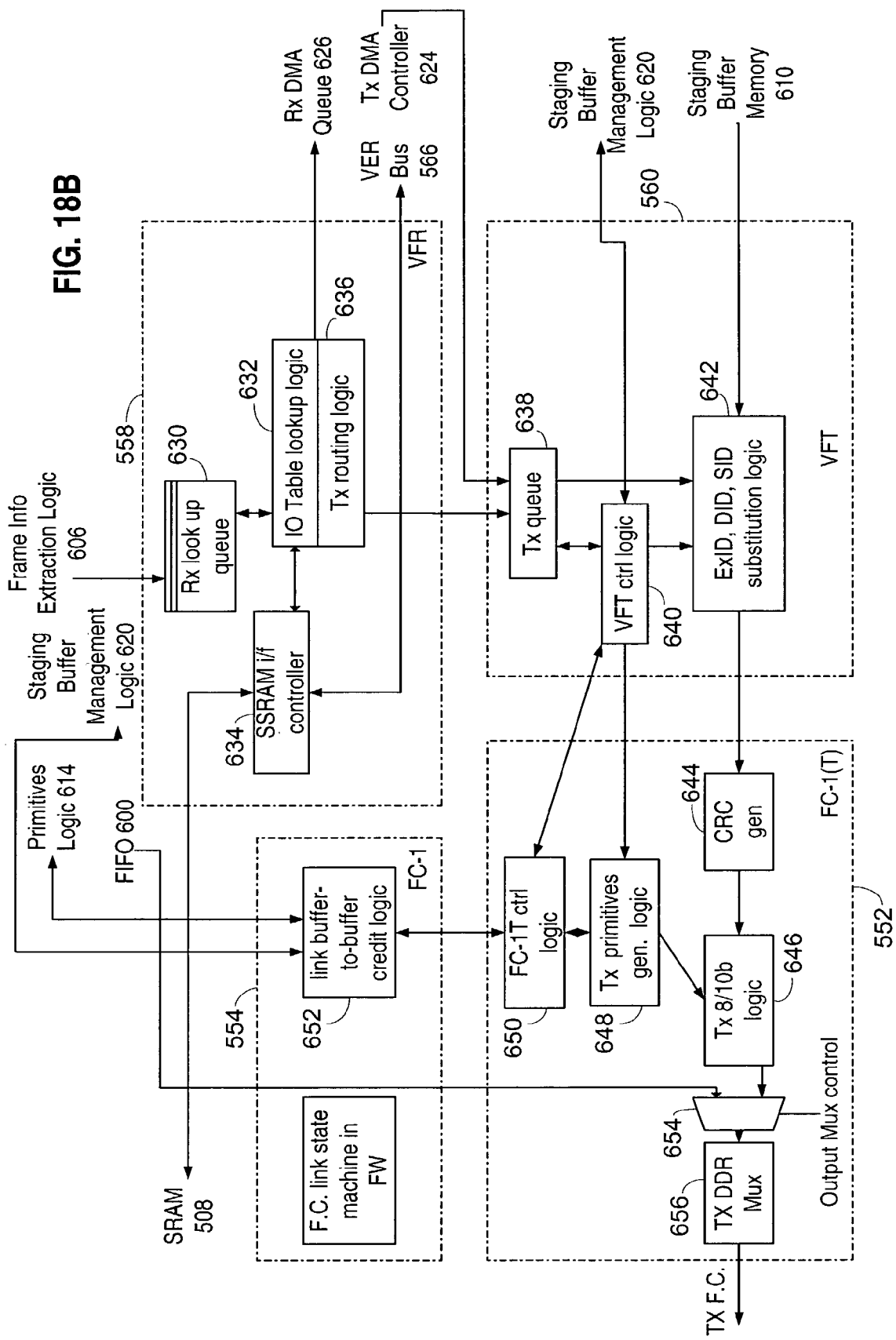

FIGS. 18A and 18B provide additional detailed information about the various blocks shown in FIG. 17.

The FC-1(R) block 550 receives the incoming Fibre Channel frame at a resync FIFO block 600 to perform clock domain transfer of the incoming frame. The data is provided from the FIFO block 600 to framing logic 602, which does the Fibre Channel ten bit to eight bit conversion and properly frames the incoming frame. The output of the framing logic 602 is provided to a CRC check module 604 to check for data frame errors; to a frame info formatting extraction block 606, which extracts particular information such as the header information needed by the VFR block 558 for the particular frame; and to a receive buffer 608 to temporarily buffer incoming frames. The receive buffer 608 provides its output to a staging buffer memory 610 in the staging buffer block 556. The receive buffer 608 is also connected to an FC-1(R) control logic block 612. In addition, a receive primitives handling logic block 614 is connected to the framing block 602 to capture and handle any Fibre Channel primitives.

The staging buffer 556 contains the previously mentioned staging buffer memory 610 which contains in the preferred embodiment at least 24 full length data frames. The staging buffer 556 contains a first free buffer list 616 and a second free buffer list 618. The lists 616 and 618 contain lists of buffers freed when a data frame is transmitted from the pi FPGA 502 or transferred by the receiver DMA process to the VER 510. Staging buffer management logic 620 is connected to the free buffer lists 616 and 618 and to a staging buffer memory address generation block 622. In addition, the staging buffer management block 620 is connected to the FC-1(R) control logic 612 to interact with the receive buffer information coming from the receive buffer 608 and provides an output to the FC-1(T) block 552 to control transmission of data from the staging buffer memory 610.

The staging buffer management logic 620 is also connected to a transmit (TX) DMA controller 624 and a receive (RX) DMA controller 626 in the data transfer block 562. The TX DMA and RX DMA controllers 624 and 626 are connected to the VER bus 556 and to the staging buffer memory 610 to allow data to be transferred between the staging buffer memory 610 and the VER SDRAM 514. A receive (RX) DMA queue 628 is additionally connected to the receive DMA controller 626.

The received (RX) DMA controller 626 preferably receives buffer descriptions of frames to be forwarded to the VER 510. A buffer descriptor preferably includes a staging buffer ID or memory location value, the received port number and a bit indicating if the frame is an FCP_CMND frame, which allows simplified VER processing. The RX DMA controller 626 receives a buffer descriptor from RX DMA queue 628 and transfers the frame from the staging buffer memory 610 to the SDRAM 514. The destination in the SDRAM 514 is determined in part by the FCP_CMND bit, as the SDRAM 514 is preferably partitioned in command frame queues and other queues, as will be described below. When the RX DMA controller 626 has completed the frame transfer, it provides an entry into a work queue for the VER 510.

The TX DMA controller 624 also includes a small internal descriptor queue to receive buffer descriptors from the VER 510. Preferably the buffer descriptor includes the buffer ID in SDRAM 514, the frame length and a port set bit. The TX DMA controller 624 transfers the frame from the SDRAM

514 to the staging buffer memory 610. When completed, the TX DMA controller 624 provides a TX buffer descriptor to the FC-1(T) block 560.

The staging buffer memory 610 preferably is organized into ten channels. The staging buffer memory 610 is also preferably dual-ported, so each channel can read and write at the same time. The staging buffer memory 610 is preferably accessed in a manner similar to that shown in U.S. Pat. No. 6,180,813, entitled "Fibre Channel Switching System and Method," which is hereby incorporated by reference. This allows each channel to have full bandwidth access to the staging buffer memory 610.

Proceeding now to FIG. 18B, the VFR block 558 includes a receive look up queue 630 which receives the frame information extracted by the extraction block 606. Preferably this information includes the staging buffer ID, the exchange context from bit 23 of the F_CTL field, an FCP_CONF_REQ or confirm requested bit from bit 4, word 2, byte 2 of an FCP_RSP payload, a SCSI status good bit used for FCP_RSP routing developed from bits 0 of word 2, byte 2, and bits 0-7 of word 2, byte 3 of an FCP_RSP payload, the R_CTL field value, the DID and SID field values, the TYPE field value and the OXID and RXID field values. This information allows the VFR block 558 to do the necessary table lookup and frame routing. Information is provided from the receive (RX) look up queue 630 to IO table lookup logic 632. The IO table lookup logic 632 is connected to the SRAM interface controller 634, which in turn is connected to the SRAM 508 which contains the IO lookup table. The IO lookup table is described in detail below. The frame information from the RX lookup queue 630 is received by the IO lookup table logic 632, which proceeds to interrogate the IO table to determine if an entry is present for the particular frame being received. This is preferably done by doing an address lookup based on the VXID value in the frame. If there is no VXID value in the table or in the frame, then this frame is forwarded to the VER 510 for proper handling, generally to develop a table entry in the table for automatic full speed handling. The outputs of the IO lookup table logic 632 are provided to the transmit routing logic 636. The output of the transmit (TX) routing logic either indicates that this is a frame to be properly routed and information is provided to the staging buffer management logic 620 and to a transmit queue 638 in the VFT block 560 or a frame that cannot be routed, in which case the transmit routing logic 636 provides the frame to the receive DMA queue 626 for routing to the VER 510. For example, all FCP_CMND frames are forwarded to the VER 510. FCP_XFER_RDY and FCP_DATA frames are forwarded to the TX queue 638, the VER 510 or both, based on values provided in the IO table, as described in more detail below. For FCP_RSP and FCP_CONF frames, the SCSI status bit and the FCP_CONF_REQ bits are evaluated and the good or bad response bit values in the IO table are used for routing to the TX queue 638, the VER 610 or both.

In addition, in certain cases the IO table lookup logic 632 modifies the IO table. On the first frame from a responder the RXID value is stored in the IO table and its presence is indicated. On a final FCP_RSP that is a good response, the IO table entry validity bit is cleared as the exchange has completed and the entry should no longer be used.

The transmit queue 638 also receives data from the transmit DMA controller 624 for frames being directly transferred from the VER 510. The information in the TX queue 638 is descriptor values indicating the staging buffer ID, and the new DID, SID, OXID, and RXID values. The transmit queue 638 is connected to VFT control logic 640 and to substitution logic 642. The VFT control logic 640 controls operation of the VFT block 560 by analyzing the information in the TX queue 638 and by interfacing with the staging buffer management logic 620 in the staging buffer block 556. The queue entries are provided from the TX queue 638 and from the staging buffer memory 610 to the substitution logic 642 where, if appropriate, the DID, SID and exchange ID values are properly translated as shown in FIG. 12.

In the preferred embodiment the VDID value includes an 8 bit domain ID value, an 8 bit base ID value and an 8 bit virtual disk enumeration value for each port set. The domain ID value is preferably the same as the Bloom ASIC 504 connected to the port set, while the base ID value is an unused port ID value from the Bloom ASIC 504. The virtual disk enumeration value identifies the particular virtual disk in use. Preferably the substitution logic only translates or changes the domain ID and base ID values when translating a VDID value to a PDID value, thus keeping the virtual disk value unchanged. With this ID value for the virtualization switch 500, it is understood that the routing tables in the connected Bloom ASICs 504 must be modified from normal routing table operation to allow routing to the ports of the pi FPGA 502 over the like identified parallel links connecting the Bloom ASIC 504 with the pi FPGA 502.

The translated frame, if appropriate, is provided from the substitution logic 642 to a CRC generator 644 in the FC-1(T) block 552. The output of the CRC generator 644 is provided to the transmit (TX) eight bit to ten bit encoding logic block 646 to be converted to proper Fibre Channel format. The eight bit to ten bit encoding logic also receives outputs from a TX primitives logic block 648 to create transmit primitives if appropriate. Generation of these primitives would be indicated either by the VFT control logic 640 or FC-1(T) control logic 650. The FC-1(T) control logic 650 is connected to buffer to buffer credit logic 652 in the FC-1 block 554. The buffer to buffer credit logic 652 is also connected to the receive primitives logic 614 and the staging buffer management logic 620. The output of the transmit eight bit to ten bit logic 632 and an output from the receive FIFO 600, which provides fast, untranslated fabric switching, are provided as the two inputs to a multiplexer 654. The output of the multiplexer 654 is provided to a transmit output block 656 for final provision to the transmit serializer/deserializers and media interfaces.

Figure 19:
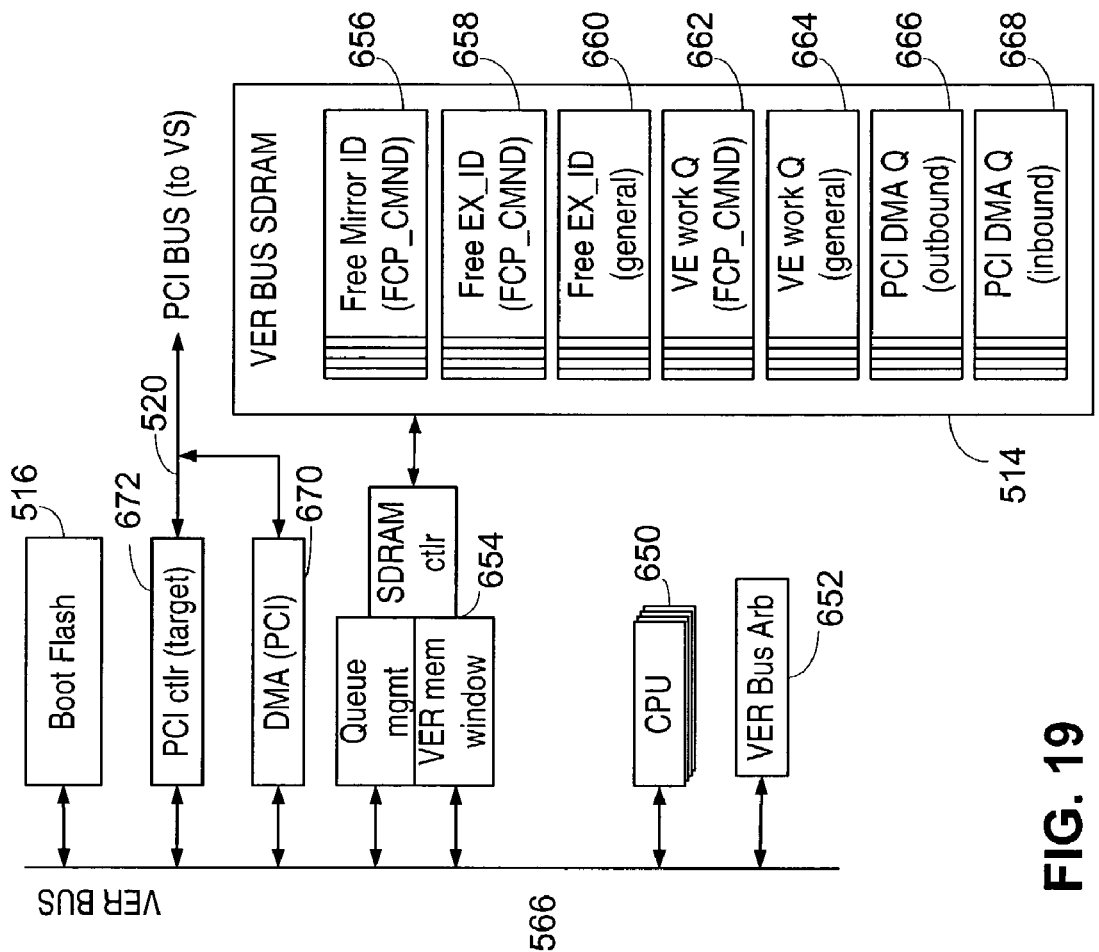
FIG. 19 is a detailed block diagram of additional portions of the switch of FIG. 16.

Turning now to FIG. 19, a more detailed description of the VER 510 is shown. Preferably the processor 512 of the VER 510 is a highly integrated processor such as the PowerPC 405 GP provided by IBM. Thus many of the blocks shown in FIG. 19 are contained on the actual processor block itself. The VER 510 includes a CPU 650, as indicated preferably the PowerPC CPU. The CPU 650 is connected to a VER bus 566. A bus arbiter 652 arbitrates access to the VER bus 566. An SDRAM interface 654 having blocks including queue management, memory window control and SDRAM controller is connected to the VER bus 556 and to the SDRAM 514.

As indicated in FIG. 19, preferably the SDRAM 514 is broken down into a number of logical working blocks utilized by the VER 510. These include Free Mirror IDs, which are utilized based on an FCP write command to a virtualization device designated as a mirroring device 656; a Free Exchange ID list 658 for use with the command frames that are received; a Free Exchange ID list 660 for general use; a work queue 662 for use with command frames; a work queue 664 for operation with other frames and PCI DMA queues 666 and 668 for inbound and outbound or receive and transmit DMA operations. A PCI DMA interface 670 is connected between the VER bus 566 and the PCI bus 520, which is connected to the processor 524. In addition a PCI controller target device 672 is also connected between the VER bus 566 and the PCI bus 520. The boot flash 516 as previously indicated is connected to the VER bus 566.

Figure 20:
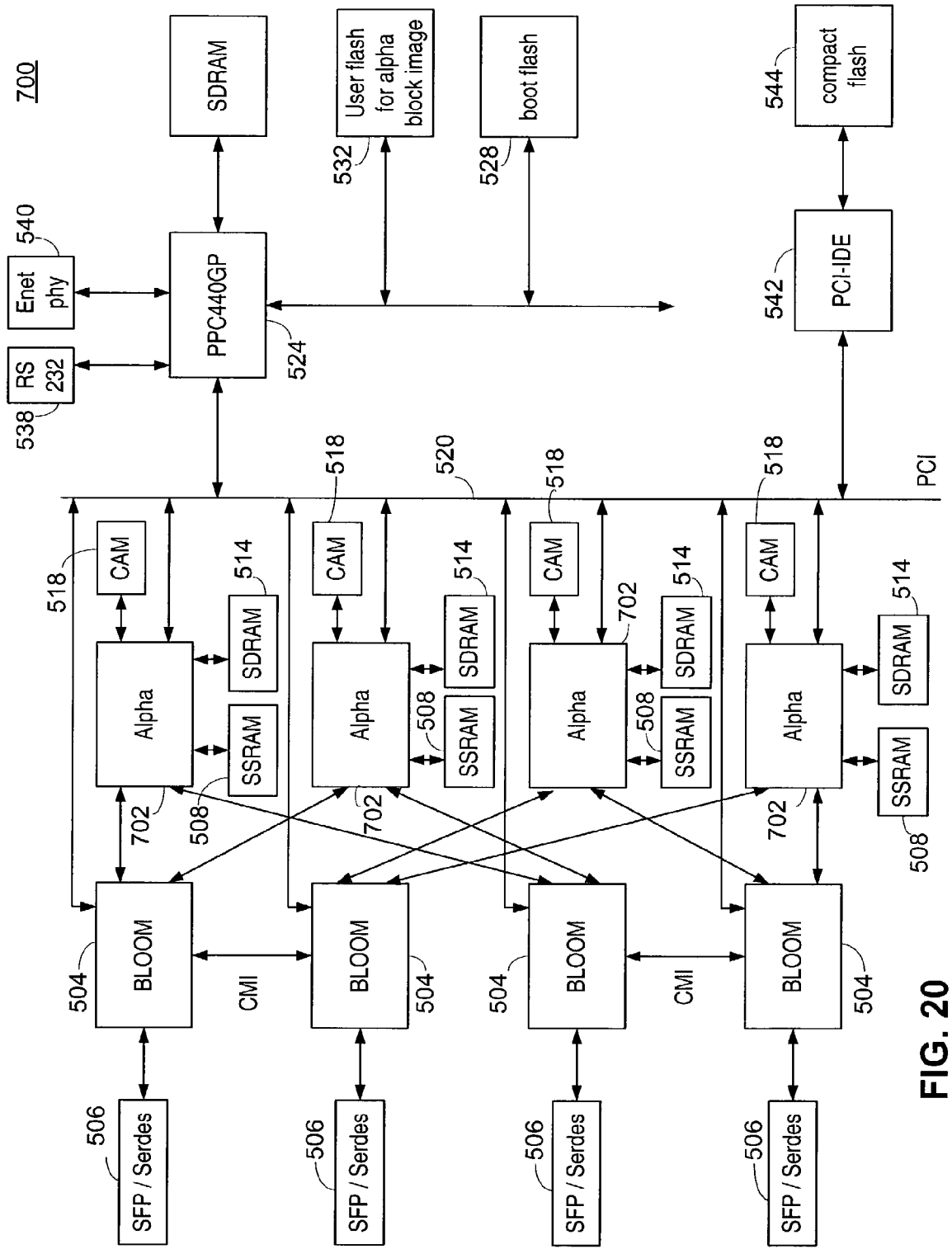
FIG. 20 is a block diagram of an alternate preferred embodiment of a virtualization switch.

FIG. 20 illustrates an alternative virtualization switch 700. Virtualization switch 700 is similar to the virtualization switch 500 of FIG. 16 and like elements have been provided with like numbers. The primary difference between the switches 700 and 500 is that the pi FPGA 502 and the VERs 510 have been replaced by alpha FPGAs 702. In addition, four alpha blocks 702 are utilized as opposed to two pi FPGA 502 and VER 510 units.

Figure 21:
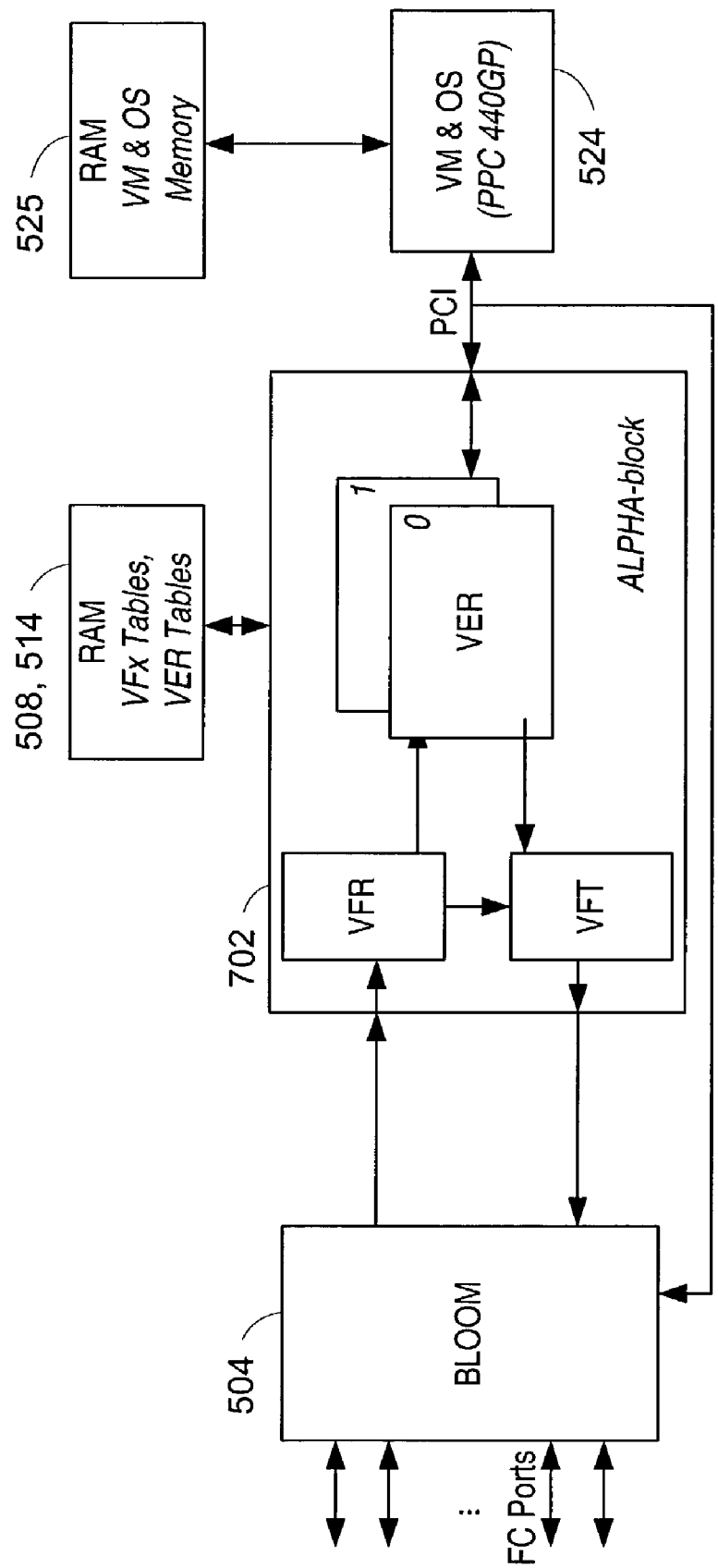
FIG. 21 is a block diagram illustrating the components of the alpha ASIC of FIG. 19.

The block diagram of the alpha FPGA 702 is shown in FIG. 21. As can been seen, the basic organization of the alpha FPGA 702 is similar to that of the pi FPGA 502 except that in addition to the pi FPGA functionality, the VER 510 has been incorporated into the alpha FPGA 702. Preferably multiple VERs 510 have been incorporated into the alpha FPGA 702 to provide additional performance or capabilities.

Figure 22:
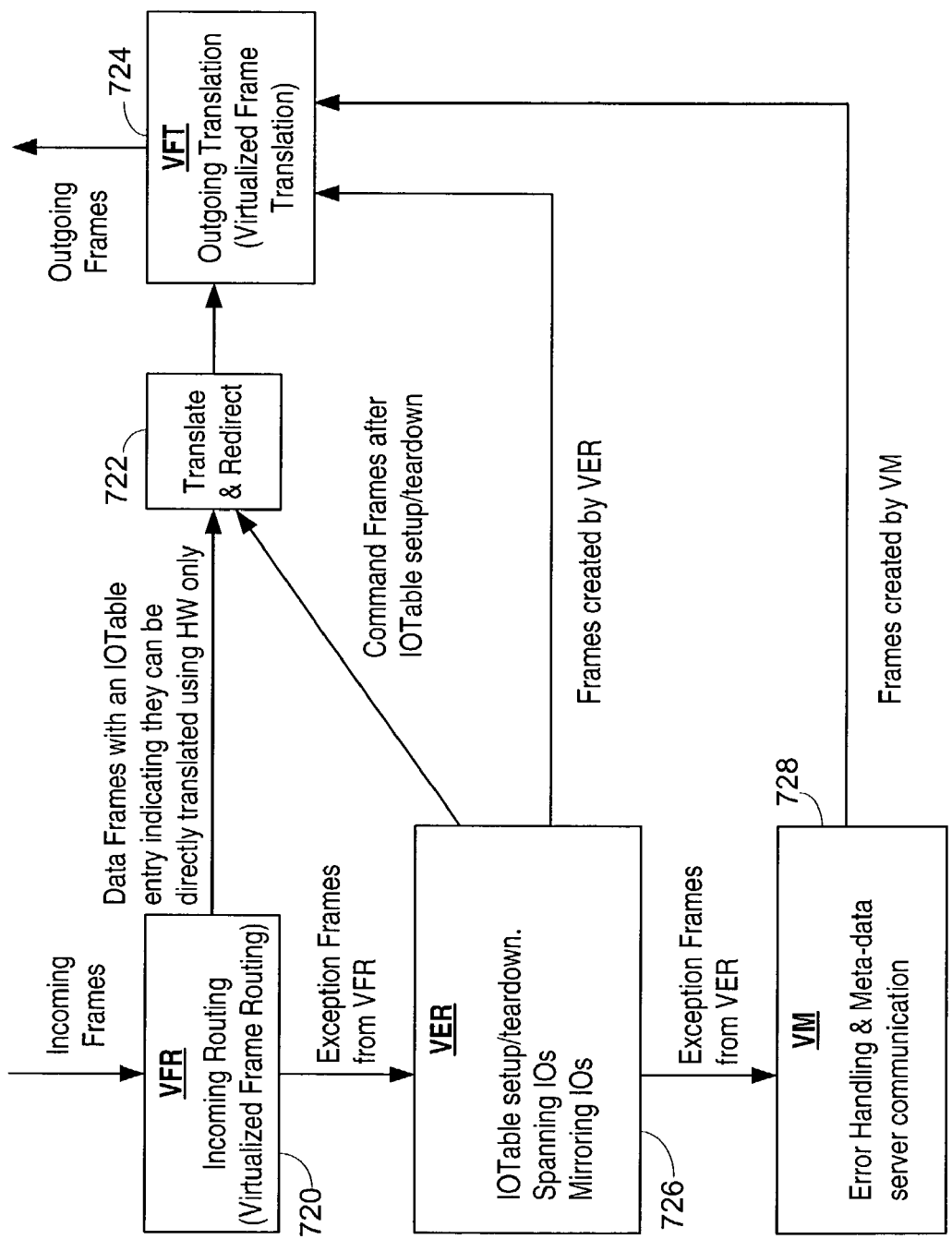
FIG. 22 is an operational flow diagram of the operation of the switches of FIGS. 16 and 20.

FIG. 22 illustrates the general operation of the switches 500 and 700. Incoming frames are received into the VFR blocks for incoming routing in step 720. If the data frames have a table entry indicating that they can be directly translated, control proceeds to step 722 for translation and redirection. Control then proceeds to step 724 where the VFT block transmits the translated or redirected frames. If the VFR block in step 720 indicates that these are exception frames, either Command Frames such as FCP_CMND or FCP_RSP or unknown frames that are not already present in the table, control proceeds to step 726 where the VER performs table setup and or teardown, depending upon whether it is an initial frame or a termination frame, or further processing or forwarding of the frame. If the virtual disk is actually spanning multiple physical drives and the end of one disk has been reached, then the VER in step 726 performs proper table entries and LUN and LBA changes to form an initial command frame for the next physical disk. Alternatively, if a mirroring operation is to be performed, this is also set up by the VER in step 726. After the table has been set up for the translation and redirection operation, the command frames that have been received by the VER are provided to step 722 where they are translated using the new table entries. If the frames have been created directly by the VER in step 726, such as the initial command for the second drive in the spanning case, these frames are provided directed to the VFT block in step 724. If the VER cannot handle the frame, as it is an error or an exception above its level of understanding, then the frame is transferred to the processor 524 for further handling in step 728. Either error handling is done or communications with the management server are developed for overall higher level communication and operation of the virtual switch 500, 700 in step 728. Frames created by the processor 524 are then provided to the VFT block in step 724 for outgoing routing.

Figure 23:
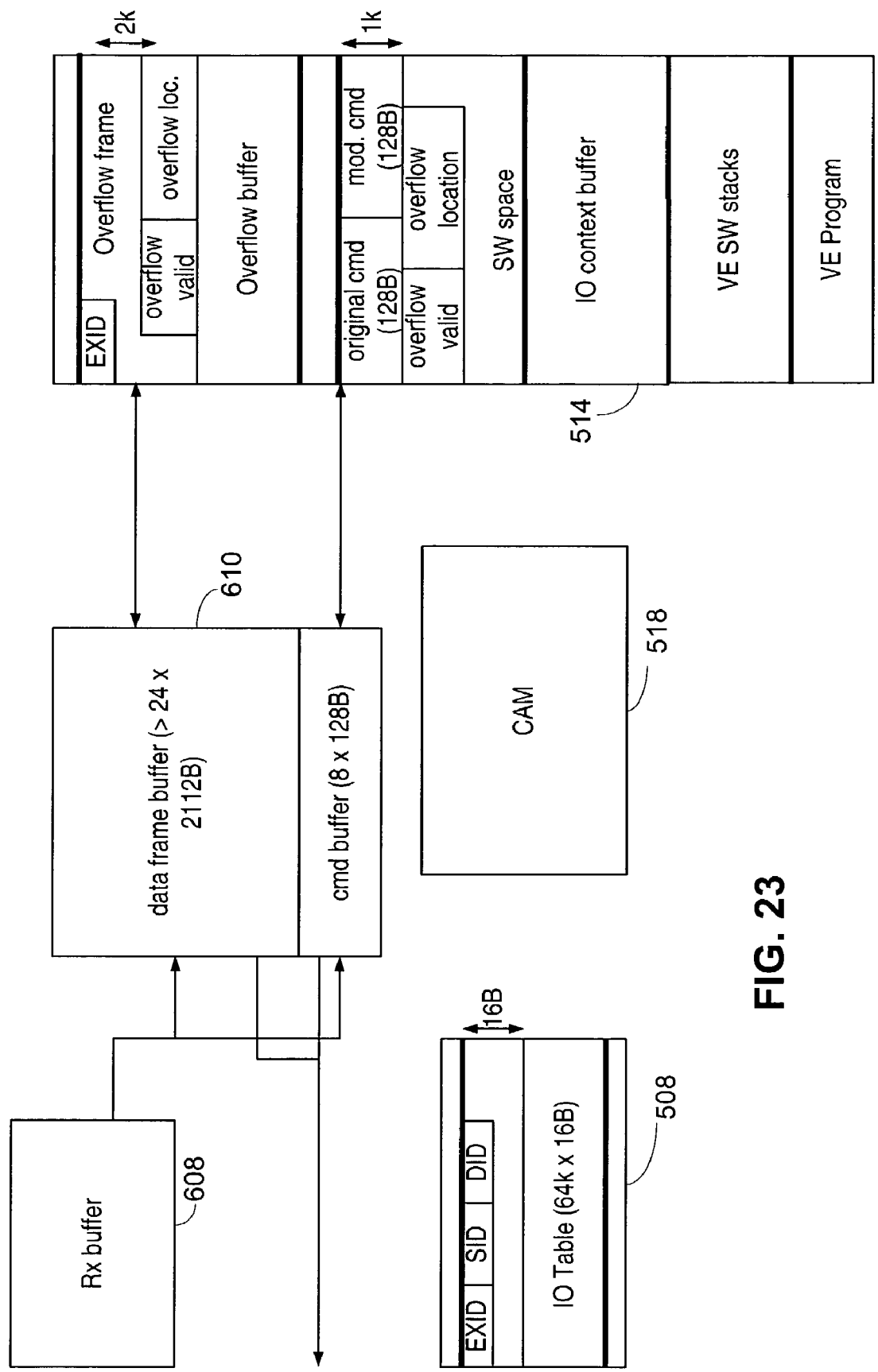
FIG. 23 is a diagram illustrating the relationships of the various memory elements in the virtualization elements of the switches of FIGS. 16 and 20.

FIG. 23 is an illustration of various relevant buffers and memory areas in the alpha FPGA 702 or the pi FPGA 502 and the VER 510. An approximate breakdown of logical areas inside the particular memories and buffers is illustrated. For example, the IO table in the SRAM 508 preferably has 64 k of 16 byte entries which include the exchange source IDs and destination IDs in the format as shown in Tables 1 and 2 below.

TABLE 1

IO Lookup Table Entry Format

| Bit Word | 31 | 30 | 29 | 28 27 26 | 25 | 24 | 23 | 22 | 21 | 20 | 19 | 18 |
|---|---|---|---|---|---|---|---|---|---|---|---|---|
| 0 | VALID | EN_CONF | DXID_VALID | RSVD | FAB. ROUTING | MLNK | | | HPID[23:0] | | | |
| 1 | | | | RSVD | | | | | DPID[23:0] | | | |
| 2 | | | | | HXID[15:0] | | | | | | | |
| 3 | | VEN[3:0] | | RSVD | CONF_RT[1:0] | | BRSP_RT[1:0] | | GRSP_RT[1:0] | | XRDY_RT[1:0] | |

| Bit Word | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 0 | | | | | | | | HPID[23:0] | | | | | | | | | | |
| 1 | | | | | | | | DPID[23:0] | | | | | | | | | | |
| 2 | HXID[15:0] | | | | | | | | | DXID[15:0] | | | | | | | | |
| 3 | DATA_RT[1:0] | | | | | | | | | CRC[15:0] | | | | | | | | |

TABLE 2

IO Lookup Table Entry Description

| | |
|---|---|
| VALID | Indicates that the entry is valid |
| EN_CONF | Enable Virtual FCP_CONF Frame - When set, indicates that the host supports FCP_CONF. If this bit is cleared and the VFX receives an FCP_RSP frame with the FCP_CONF_REQ bit set, the VFX treats the frame as having a bad response, i.e. routes it based on the BRSP_RT field of the IO entry. |
| DXID_VALID | DXID Valid - When this bit is set, indicates that the DXID field of the entry contains the disk exchange ID (RXID used by the PDISK). For a typical 1:1 IO, this field is initially to 0; it is set to 1 by the VFX when the RXID of first frame returned from the PDISK is captured into the DXID field of the entry. When this bit is cleared, the DXID field of the entry should contain the VXID of the exchange. |
| FAB. ROUTING | The Fabric Routing bit identifies which port set the frame needs to be sent to. A 0 means the frame needs to go out the same port set as it comes in. A 1 means the frame needs to go out the other port set. |

TABLE 2-continued

IO Lookup Table Entry Description

| | |
|---|---|
| MLNK | Mirror Link - For a mirrored write IO handled by the VFX, the value of this field is set to 1 to indicate the following IO entry is part of the mirror group. The last entry in the mirror group has this bit set to 0.<br>The VER sets up one IO table entry for each copy of a mirrored write IO. All the entries are contiguous, and VXID of the first (lowest address) entry is used for the virtual frames. The x_RT[1:0] bits for all frames other than FCP_DATA should be set to 01b in order to route those frames to the VER only.<br>For not mirror IO, this bit is set to 0.<br>The VFX uses the value of this field for writing FCP_DATA frames only; it ignores this field and assumes MLNK = 0 for all other frames. |
| DATA_RT[1:0] | Data Frame Routing and Translation - This field specifies the VFX action for an FCP_DATA frame received from the host (write IO) or PDISK (read IO), as follows:<br>00b Reserved<br>01b Normal route to VER<br>10b Translate and route to PDISK or host (modified route)<br>11b Replicate; send a translated copy to PDISK or host and a copy to VER. The copy to the VER is always sent after the translated copy is sent to the host or PDISK.<br>Note that for a mirrored write IO (MCNT > 0), this field should be set to 11b (replicate) in the last entry of the IO table and 10b (translate and route to PDISK) in all IO entries other than the last one if the 11b option is desired. When the VFX receives a write FCP_DATA frame, it will send one copy to each PDISK and then a copy to the VER. |
| XRDY_RT[1:0] | Transfer Ready Frame Routing and Translation - Same as DATA_RT but applies to FCP_XFER_RDY frames. |
| GRSP_RT[1:0] | Good Response Frame Routing and Translation - Same as DATA_RT but applies to 'Good' FCP_RSP frames. A Good FCP_RSP frame is one that meets the all of the following conditions:<br>FCP_RESID_UNDER, FCP_RESID_OVER, FCP_SNS_LEN_VALID, FCP_RSP_LEN_VALID bits are 0 (bits 3:0 in byte 10 of payload)<br>SCSI STATUS CODE = 0x00 (byte 11 of payload)<br>All RESERVED fields of the payload are zero |
| BRSP_RT[1:0] | Bad Response Frame Routing and Translation - Same as DATA_RT but applies to 'Bad' FCP_RSP frames. A Bad FCP_RSP frame is one that does not meet the requirements of a Good FCP_RSP as defined above. |
| CONF_RT[1:0] | Confirmation Frame Routing and Translation - Same as DATA_RT but applies to FCP_CONF frames. |
| HXID[15:0] | Host Exchange ID - This is the OXID of virtual frames. |
| DXID[15:0] | Disk Exchange ID - When the DXID_VALID bit is set, it indicates that this field contains the disk exchange ID (RXID of physical frames). When that bit is cleared, this field should contain the VXID of the exchange. See the DXID_VALID bit definition for more detail. |
| HPID[23:0] | Port_ID of Host |
| DPID[23:0] | Port_ID of PDISK |
| VEN[3:0] | VER Number - This field, along with other fields of the entry, is used to validate the entry for failure detection purposes. |
| CRC[15:0] | Cyclic Redundancy Check - This field protects the entire entry. It is used for end-to-end protection of the IO entry from the entry generator (typically the VER) to the entry consumers (typically the VFX). |

As shown, the VER memory 514 contains buffer space to hold a plurality of overflow frames in 2148 byte blocks, a plurality of command frames which are being analyzed and/or modified, context buffers that provide full information necessary for the particular virtualization operations, a series of blocks allocated for general use by each one of the VERs and the VER operating software.

Figure 24A:
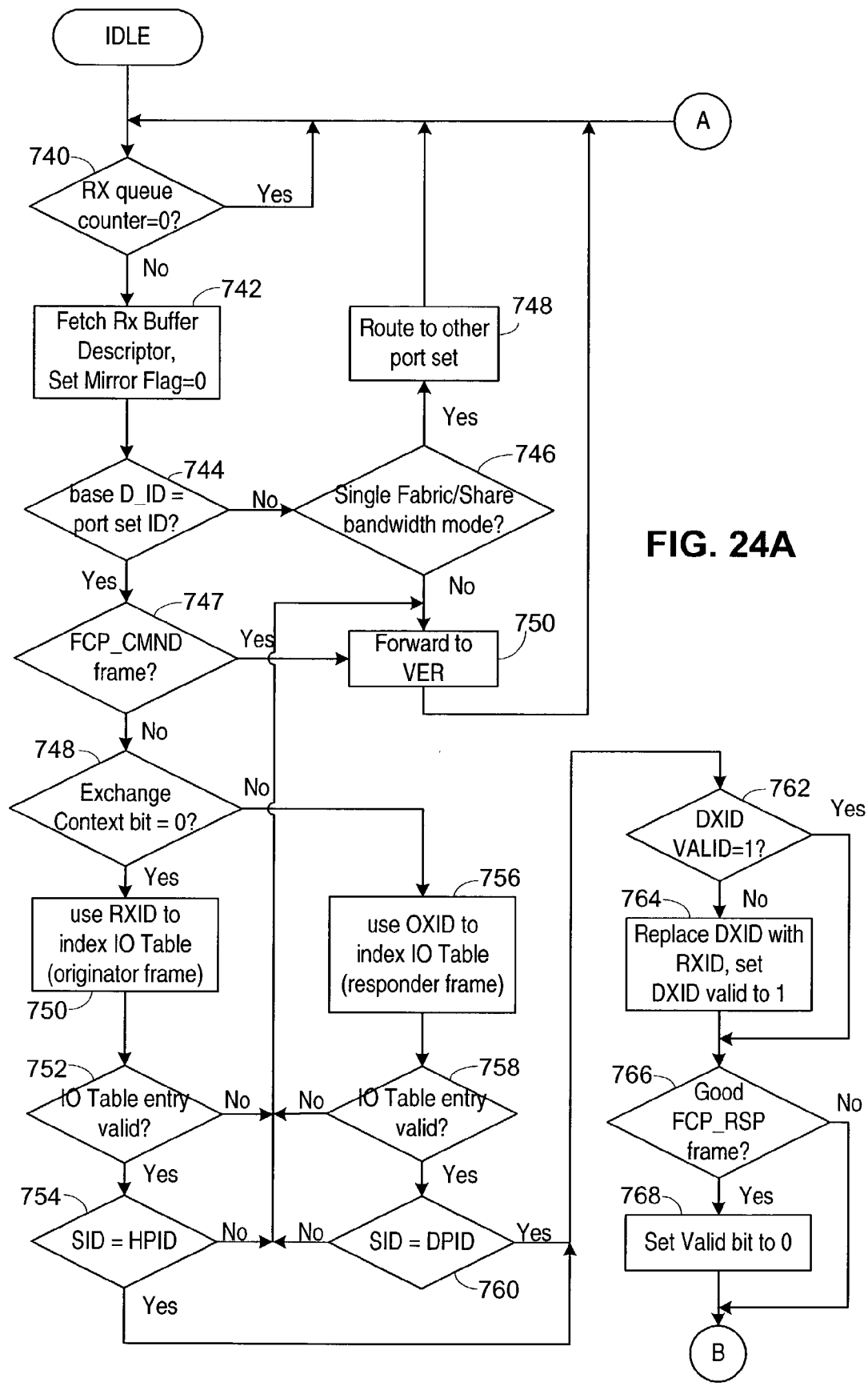
FIGS. 24A and 24B are flowchart illustrations of the operation of the VFR blocks of the pi FPGA and alpha ASIC of FIGS. 16 and 20.
Figure 24B:
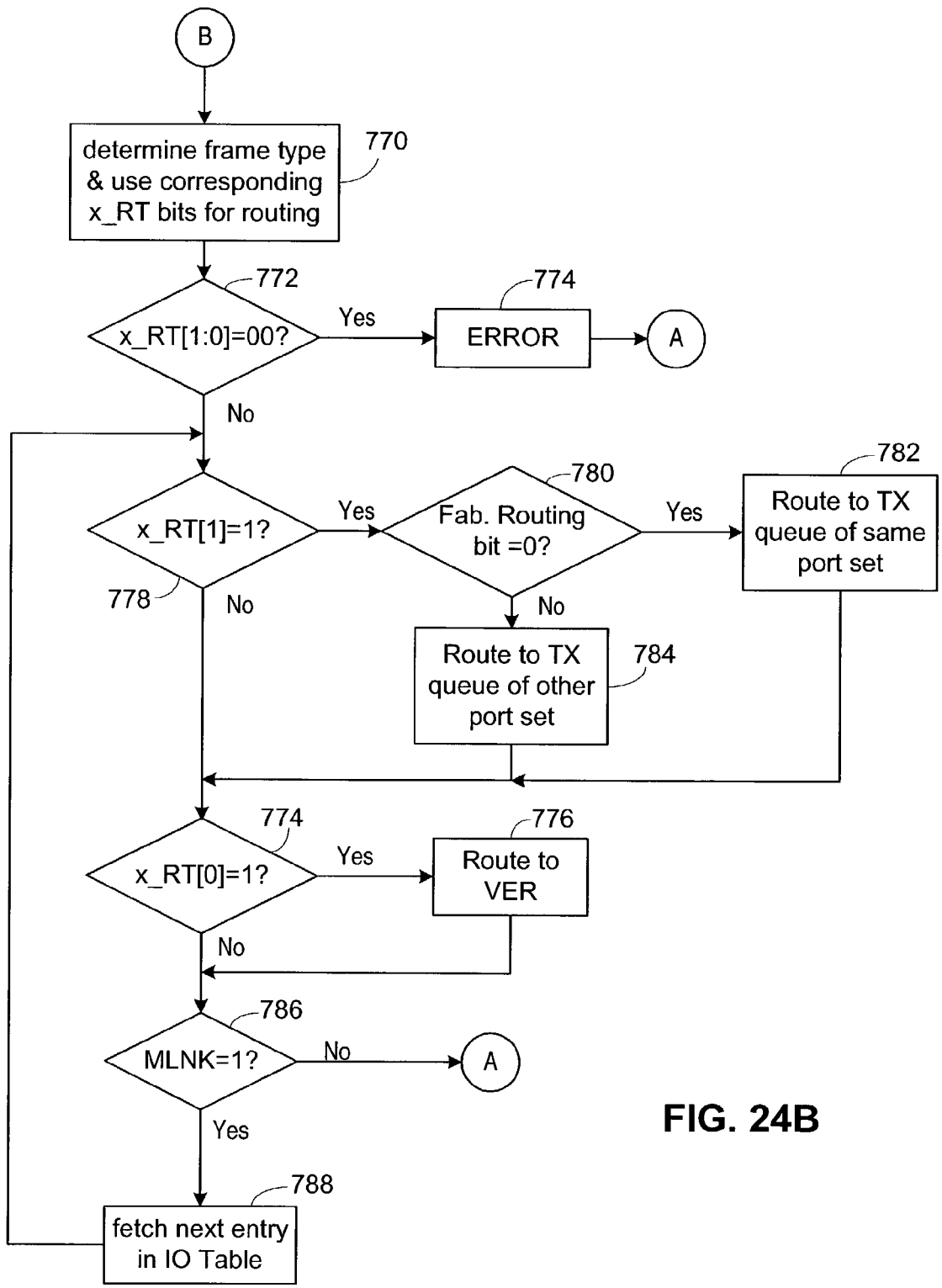

Internal operation of the VFR block routing functions of the pi FPGA 502 and the alpha FPGA 702 are shown in FIGS. 24A and 24B. Operation starts in step 740 where it is determined if an RX queue counter is zero, indicating that no frames are available for routing. If so, control proceeds to step 740 waiting for a frame to be received. If the RX queue counter is not zero, indicating that a frame is present, control proceeds to step 742, where the received buffer descriptor is obtained and a mirroring flag is set to zero. Control proceeds to step 744 to determine if the base destination ID in the frame is equal to the port set ID for the VX switch 500, 700.

If not the same base ID, control proceeds to step 746 to determine if the switch 500, 700 is in a single fabric shared bandwidth mode. In the preferred embodiments, the pi FPGAs 502 and Alpha FPGAs 702 in switches 500, 700 can operate in three modes: dual fabric, single fabric repeater or single fabric shared bandwidth. In dual fabric mode, only virtualization frames are routed to the switches 500, 700, with all frames being translated and redirected to the proper fabric.

Any non-virtualization frames will be routed by other switches in the fabric or by the Bloom ASIC 504 pairs. This dual fabric mode is one reason for the pi FPGA 502 and Alpha FPGAs 702 being connected to separate Bloom ASIC 504 pairs, as each Bloom ASIC 504 pair would be connected to a different fabric. In the dual fabric case, the switch 500, 700 will be present in each fabric, so the switch operating system must be modified to handle the dual fabric operation. In single fabric repeater mode, ports on the pi FPGA 502 or Alpha FPGA 702 are designated as either virtualization ports or non-virtualization ports. Virtualization ports operate as described above, while non-virtualization ports do not analyze any incoming frames but simply repeat them, for example by use of the fast path from RX FIFO 600 to output mux 654, in which case none of the virtualization logic is used. In one alternative the non-virtualized ports can route the frames from an RX FIFO 600 in one port set to an output mux 654 of a non-virtualized port in another port set. This allows the frame to be provided to the other Bloom ASIC 504 pair, so that the switches 500 and 700 can then act as normal 16 port switches for non-virtualized frames. This mode allows the switch 500, 700 to serve both normal switch functions and virtualization switch functions. The static allocation of ports as virtualized or non-virtualized may result in unused bandwidth, depending on frame types received. In single fabric, shared bandwidth mode all traffic is provided to the pi FPGA 502 or Alpha FPGA 702, whether virtualized or non-virtualized. The pi FPGA 502 or Alpha FPGA 702 analyzes each frame and performs translation on only those frames directed to a virtual disk. This mode utilizes the full bandwidth of the switch 500, 700 but results in increased latency and some potential blocking. Thus selection of single fabric repeater or single fabric shared mode depends on the makeup of the particular environment in which the switch 500, 700 is created. If in single fabric, shared bandwidth mode, control proceeds to step 748 where the frame is routed to the other set of ports in the virtualization switch 500, 700 as this is non-virtualized frame. This allows the frame to be provided to the other Bloom ASIC 504 pair, so that the switches 500 and 700 can then act as normal 16 port switches for non-virtualized frames. If not, control proceeds to 750 where the frame is forwarded to the VER 510 as this is an improperly received frame and the control returns to step 740.

If in step 744 it was determined that the frame was directed to the virtualization switch 500, 700, control proceeds to step 747 to determine if this particular frame is an FCP_CMND frame. If so, control proceeds to step 750 where the frame is forwarded to the VER 510 for IO table set up and other initialization matters. If it is not a command frame, control proceeds to step 748 to determine if the exchange context bit in the IO table is set. This is used to indicate whether the frame is from the originator or the responder. If the exchange context bit is zero, this is a frame from the originator and control proceeds to step 750 where the receive exchange ID value in the frame is used to index into the IO table, as this is the VXID value provided by the switch 500, 700. Control then proceeds to step 752 where it is determined if the entry into the IO table is valid. If so, control proceeds to step 754 to determine if the source ID in the frame is equal to the host physical ID in the table.

If the exchange context bit is not zero in step 748, control proceeds to step 756 to use the originator exchange ID to index into the IO table as this is a frame from the responder. In step 758 it is determined if the IO table entry is valid. If so, control proceeds to step 760 to determine if the source ID in the frame is equal to the physical disk ID value in the table. If the IO table entries are not valid in steps 752 and 758 or the IDs do not match in steps 754 and 760, control proceeds to step 750 where the frame is forwarded to the VER 510 for error handling. If however the IDs do match in step 754 and 760, control proceeds to step 762 to determine if the destination exchange ID valid bit in the IO table is equal to one. If not, control proceeds to step 764 where the DX_ID value is replaced with the responder exchange ID value as this is the initial response frame which provides the responder exchange ID value, the physical disk RXID value in the examples of FIG. 12, and the DX_ID valid bit is set to one. If it is valid in step 762 or after step 764, control proceeds to step 766 to determine if this is a good or valid FCP_RSP or response frame. If so, the table entry valid bit is set to zero in step 768 because this is the final frame in the sequence and the table entry can be removed.

After step 768 or if it is not a good FCP_RSP frame in step 766, control proceeds to step 770 to determine the particular frame type and the particular routing control bits from the IO table to be utilized. If in step 772 the appropriate routing control bits are both set to zero, control proceeds to step 774 as this is an error condition in the preferred embodiments and then control returns to step 740. If the bits are not both zero in step 772, control proceeds to step 778 to determine if the most significant of the two bits is set to one. If so, control proceeds to step 780 to determine if the fabric routing bit is set to zero. As mentioned above, in the preferred embodiment the virtualization switches 500 and 700 can be utilized to virtualize devices between independent and separate fabrics. If the bit is set to zero, control proceeds to step 782, where the particular frame is routed to the transmit queue of the particular port set in which it was received. If the bit is not set to zero, indicating that it is a virtualized device on the other fabric, control proceeds to step 784 where the frame is routed to the transmit queue in the other port set. After steps 782 or 784 or if the more significant of the two bits is not one in step 778, control proceeds to step 774 to determine if the least significant bit is set to one. If so, this is an indication that the frame should be routed to the VER 510 in step 776. If the bit is not set to one instep 774 or after routing to the VER 510 in step 776, control proceeds to step 786 to determine if the mirror control bit MLNK is set. This is an indication that write operations directed to this particular virtual disk should be mirrored onto duplicate physical disks. If the mirror control bit MLNK is cleared, control proceeds to step 740 where the next frame is analyzed. In step 786 it was determined that the mirror control bit MLNK is set to one, control proceeds to step 788 where the next entry in the IO table is retrieved. Thus contiguous table entries are used for physical disks in the mirror set. The final disk in the mirror set will have its mirror control bit MLNK cleared. Control then proceeds to step 778 to perform the next write operation, as only writes are mirrored.

Figure 24C:
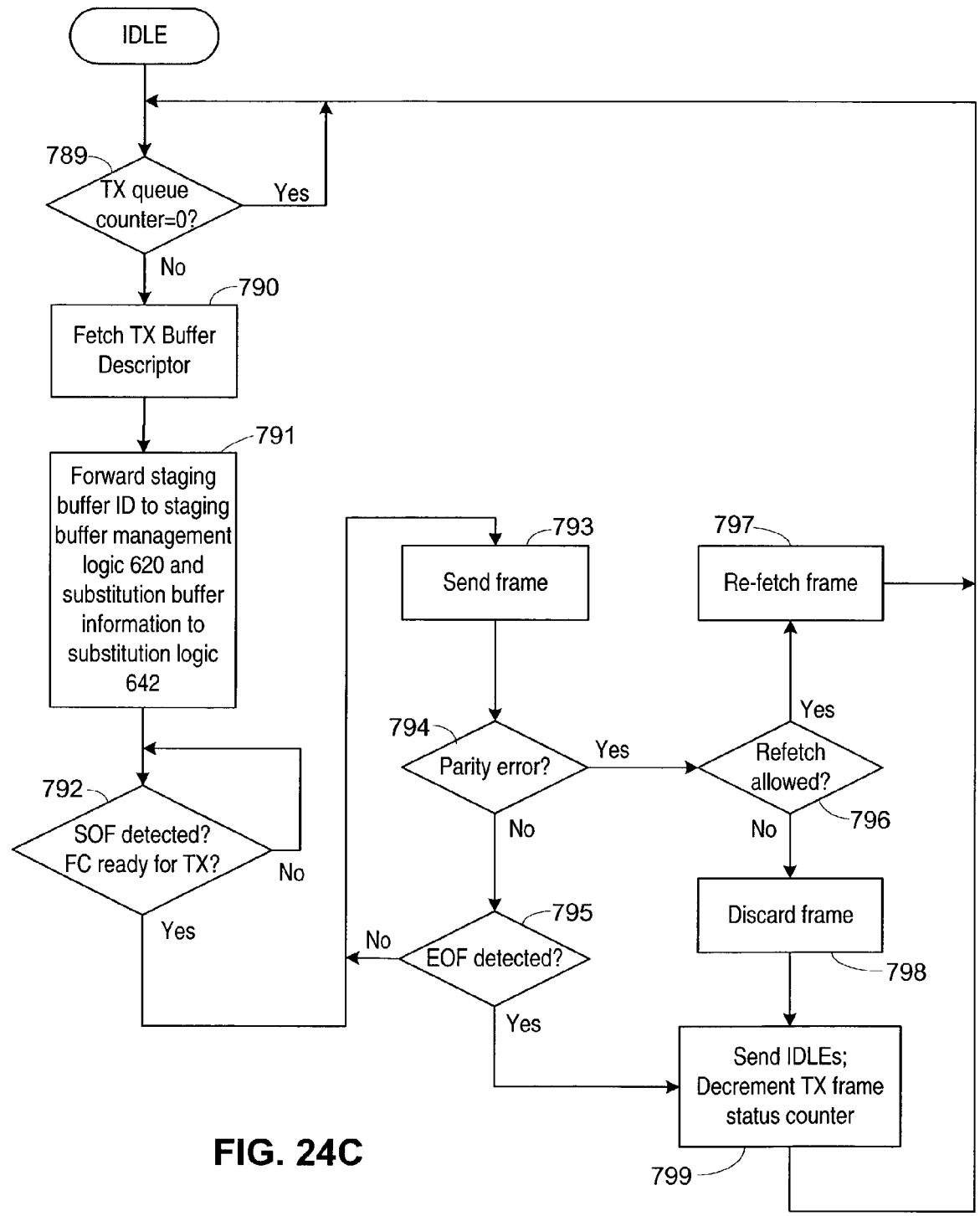
FIG. 24C is a flowchart illustration of the operation of the VFT blocks of the pi FPGA and the alpha ASIC of FIGS. 16 and 20.

FIG. 24c illustrates the general operation of the VFT block 560. Operation starts at step 789, where presence of any entries in the TX queue 638 is checked. If none are present, control loops at step 789. If an entry is present, control proceeds to step 790 where the TX buffer descriptor is obtained from the TX queue 638. In step 791, the staging buffer ID is provided to the staging buffer management logic 620 so that the frame can be retrieved and the translation or substitution information is provided to the substitution logic 642. In step 792 control waits for a start of frame (SOF) character to be received and for the Fibre Channel transmit link to be ready. When SOF is received and the link is ready, control proceeds to step 793 where the frame is sent. Step 794 determines if a parity error occurred. If none, control proceeds to step 795 to look for an end of frame (EOF) character. If none, control returns to step 793 and the frame is continued to be sent.

If the EOF was detected, the frame is completed and control proceeds to step 799 where IDLES are sent on the Fibre Channel link and the TX frame status counter in the staging buffer 556 is decremented control returns to step 739 for the next frame.

If a parity error occurred, control proceeds from step 794 to step 796 to determine if the frame can be refetched. If so, control proceeds to step 797 where the frame is refetched and then to step 789. If no refetch is allowed, control proceeds to step 798 where the frame is discarded and then to step 799.

Figure 25:
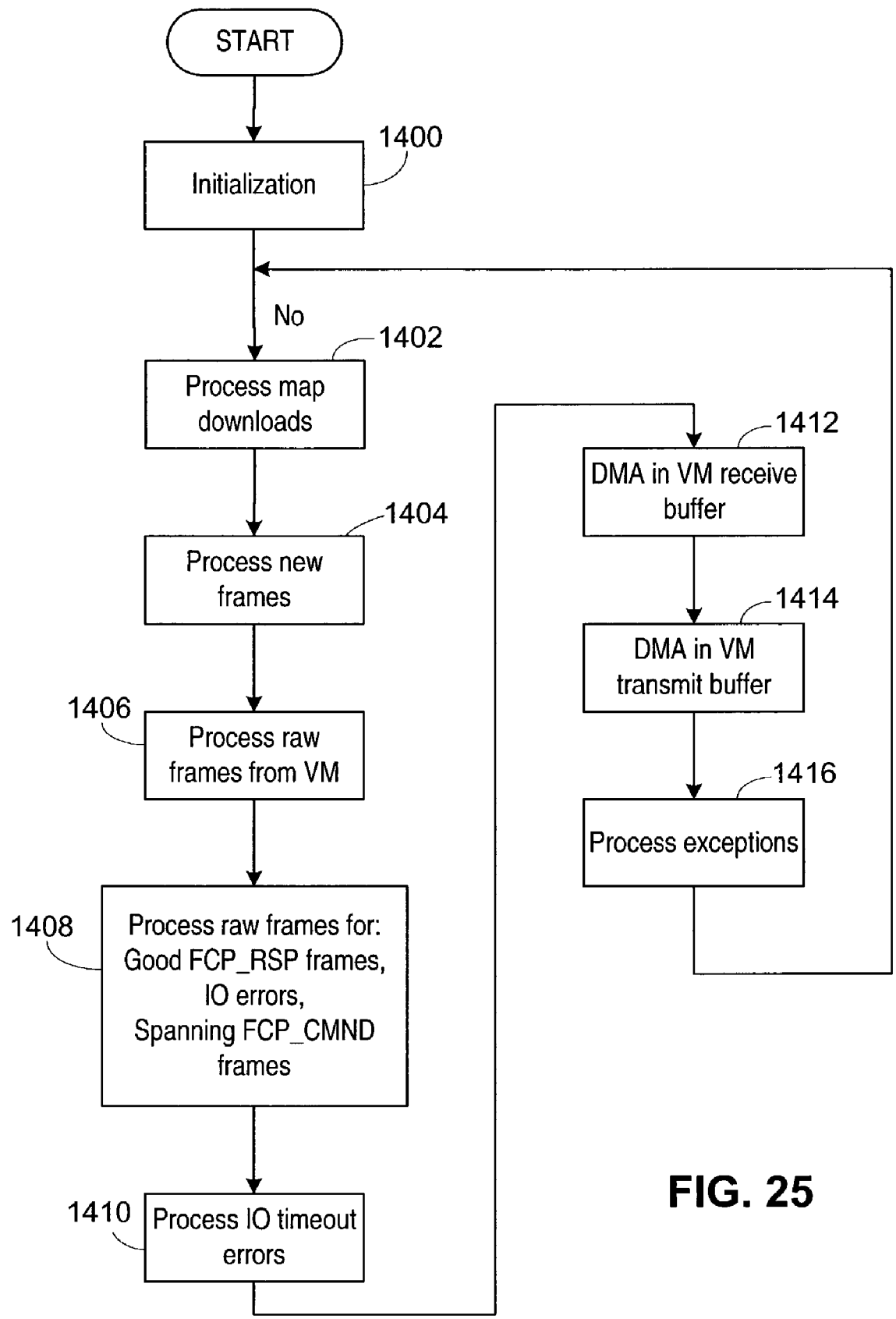
FIG. 25 is a basic flowchart of the operation of the VER of FIGS. 16 and 20.

FIG. 25 generally shows the operation of the VERs 510 of switches 500, 700. Control starts at step 1400, where the VER 510 is initialized. Control proceeds to step 1402 to process any virtualization maps entries which have been received from the virtualization manager (VM) in the switch 500, 700, generally the processor 524. The virtualization map is broken into two portions, a first level for virtual disk entries and a second level for the extent maps for each virtual disk. The first level contains entries which include the virtual disk ID, the virtual disk LUN, number of mirror copies, pointer to an access control list and others. The second level includes extent entries, where extents are portions of a virtual disk that are contiguous on a physical disk. Each extent entry includes the physical and virtual disk LBA offsets, the extent size, the physical disk table index, segment state and others. Preferably the virtualization map lookups occur using the CAM 518, so the engine 510 will load the proper information into the CAM 518 to allow quick retrieval of an index value in memory 514 where the table entry is located.

After processing any map entries, control proceeds to step 1404 where any new frames are processed, generally FCP_CMND frames. On FCP_CMND frames a new exchange is starting so several steps are required. First, the engine 510 must determine the virtual disk number from the VDID and LUN values. A segment number and the IO operation length are then obtained by reference to the SCSI CDB. If the operation spans several segments, then multiple entries will be necessary. With the VDID and LUN a first level lookup is performed. If it fails, the engine 510 informs the virtualization manager of the error and provides the frame to the virtualization manager. If the lookup is successful, the virtual disk parameters are obtained from the virtualization map. A second level lookup occurs next using the LBA, index and mirror count values. If this lookup fails, then handling is requested from the virtualization manager. If successful, the table entries are retrieved from the virtualization map.

With the retrieved information the PDID value is obtained, the physical offset is determined and a spanning or mirrored determination is made. This procedure must be repeated for each spanned or mirrored physical disk. Next the engine 510 sets up the IO table entry in its memory and in the SRAM 508. With the IO table entry stored, the engine 510 modifies the received FCP_CMND frame by doing SID, DID and OXID translation, modifying the LUN value as appropriate and modifying the LBA offset. The modified FCP_CMND frame is then provided to the TX DMA queue for transmission by the VFT block 560.

After the FCP_CMND frames have been processed, control proceeds to step 1406 where any raw frames from the virtualization manager are processed. Basically this just involves passing the raw frame to the TX DMA queue.

After step 1406 any raw frames from the VFR block 558 are processed in step 1408. These frames are usually FCP_RSP frames, spanning disk change frames or error frames.

If the frame is a good FCP_RSP frame, the IO table entry in the memory 514 and the SRAM 508 is removed or invalidated and availability of another entry is indicated. If the frame is a bad FCP_RSP frame, the engine 510 will pass the frame to the virtualization manager. If the frame is a spanning disk change frame, a proper FCP_CMND frame is developed for transmission to the next physical disk and the IO table entry is modified to indicate the new PDID. On any error frames, these are passed to the virtualization manager.

After the raw frames have been processed in step 1408, control proceeds to step 1410 where an IO timeout errors are processed. This situation would happen due to errors in the fabric or target device, with no response frames being received. When a timeout occurs because of this condition the engine 510 removes the relevant entry from the IO tables and frees an exchange entry. Next, in steps 1412 and 1414 the engine 510 controls the DMA controller 670 to transfer information to the virtualization manager or from the virtualization manager. On received information, the information is properly placed into the proper queue for further handling by the engine 510.

After DMA operations, any further exceptions are processed in steps 1416 and then control returns to step 1402 to start the loop again.

Figure 26:
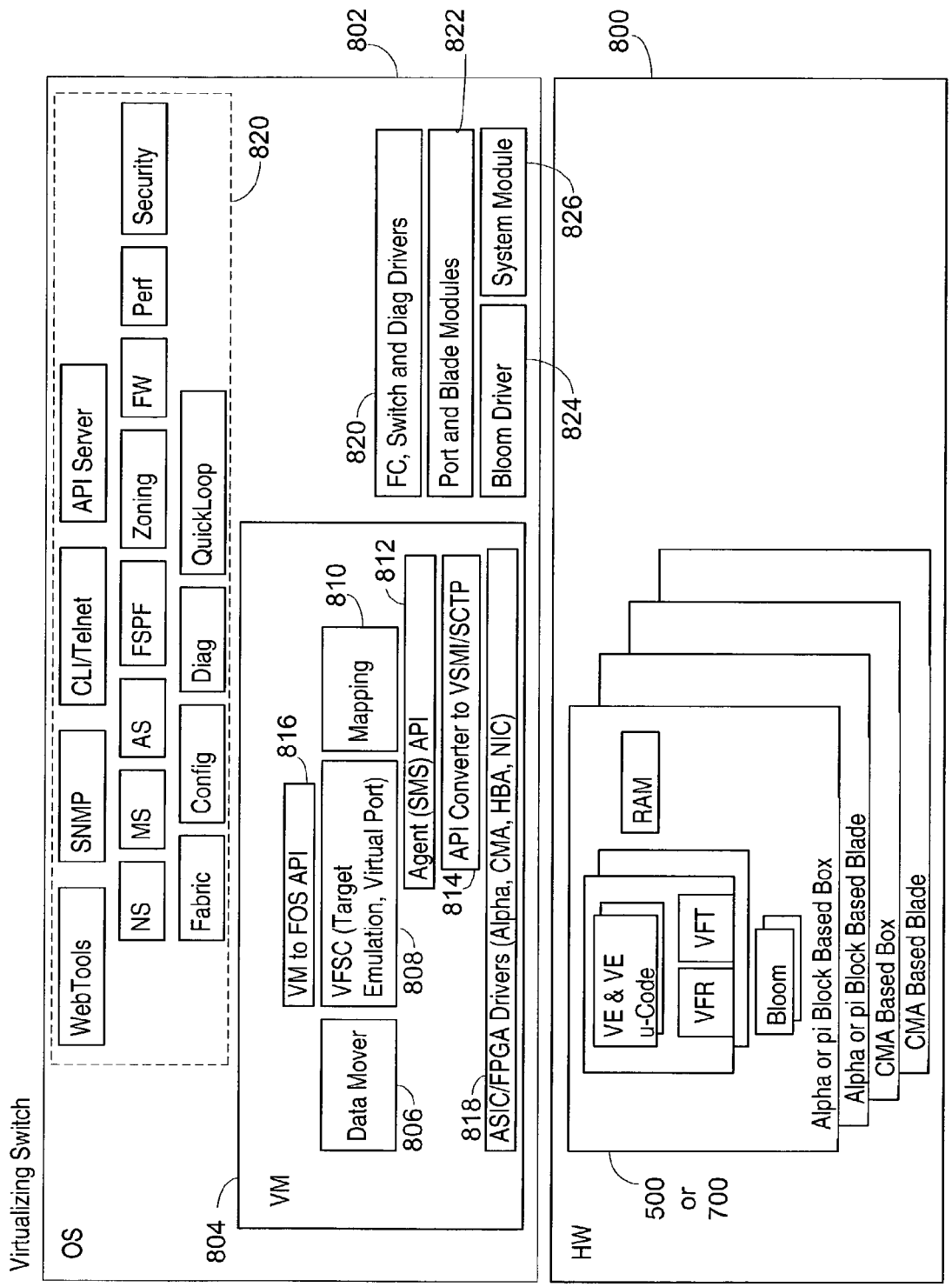
FIG. 26 is a block diagram indicating the various software and hardware elements in the virtualizing switch according to FIGS. 16 and 20.

Proceeding then to FIG. 26, a general block diagram of the virtualization switch 500 or 700 hardware and software is shown. Block 800 indicates the hardware as previously described. For example, the pi FPGA 502—based switch 500 or the alpha FPGA 702-based switch 700 is shown. As can be seen the virtualization switch 500, 700 could also be converted into a blade-based format for inclusion in the Silkworm 12000 similar to the embodiments previously shown in FIGS. 13 and 15. In addition, alternative embodiments based on designs to be described in FIG. 26 and following are shown. Block 802 is the basic software architecture of the virtualizing switch. Generally think of this as the switch operating system and all of the particular modules or drivers that are operating within that embodiment. This block 802 would be duplicated if the switch 500, 700 was operating in dual fabric mode, one instantiation of block 802 for each fabric. One particular block is the virtualization manager 804 which operates with the VERs 510 in the switch. The virtualization manager 804 also cooperates with the management server to handle virtualization management functions, including initialization similar to that described above with respect to switch 400. The virtualization manager 804 has various blocks including a data mover block 806, a target emulation and virtual port block 808, a mapping block 810, a virtualization agent API management block 812 and an API converter block 814 to interface with the proper management server format, an API block 816 to interface the virtualization manager 804 to the operating system 802 and driver modules 818 to operate with the ASICs and FPGA devices in the hardware. Other modules operating on the operating system 802 are Fibre Channel, switch and diagnostic drivers 820; port and blade modules 822, if appropriate; a driver 824 to work with the Bloom ASIC; and a system module 826. In addition, because this is a fully operational switch as well as a virtualization switch, the normal switch modules for switch management and switch operations are generally shown in the dotted line 820. This module will not be explained in more detail.

Figure 27:
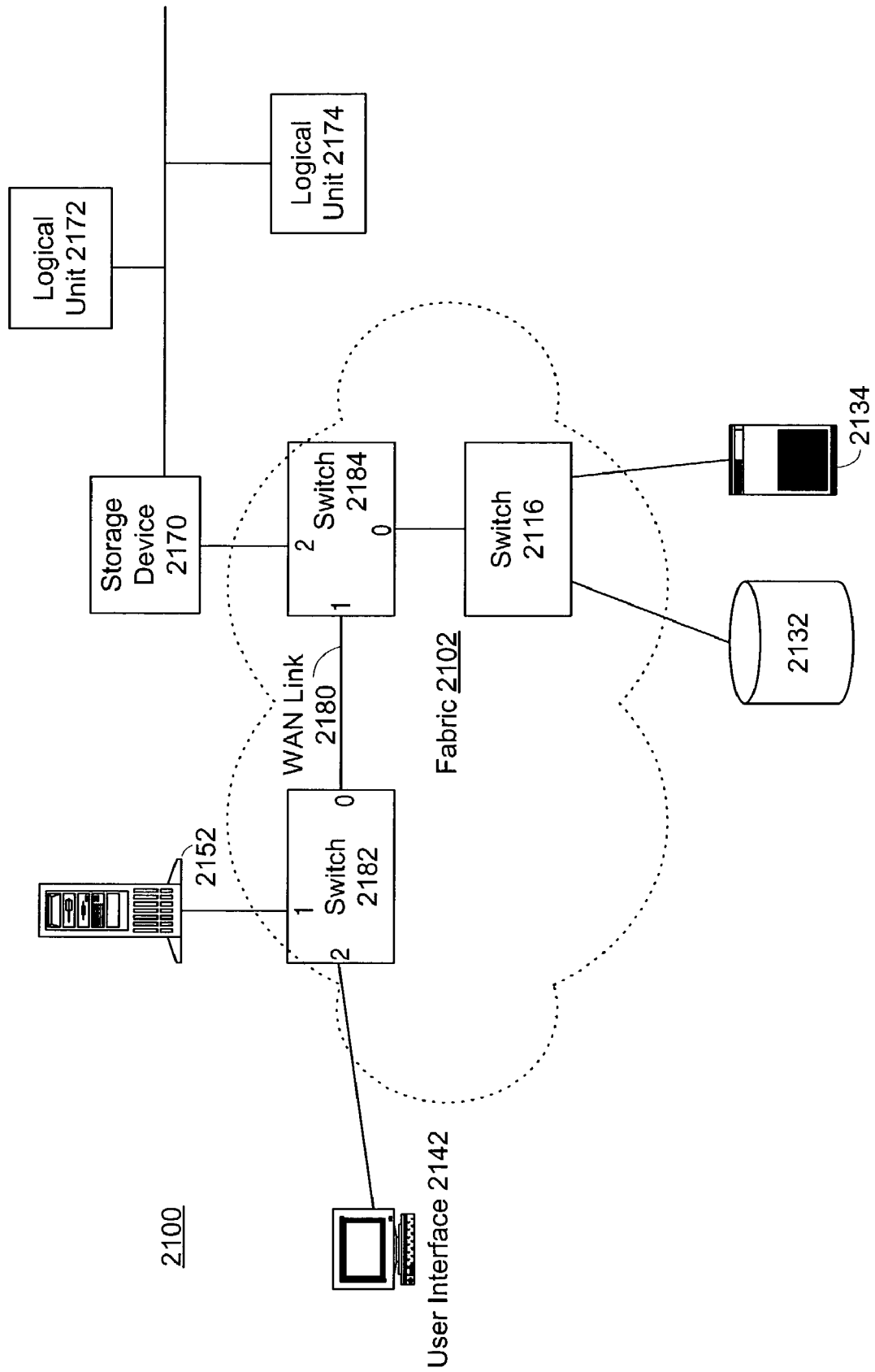
FIG. 27 is an alternate general view of a SAN.

FIG. 27 illustrates an alternate SAN 2100 with a fabric 2102. The remaining elements which are similar to those in SAN 100 are like numbered, except with the addition of 2000. The fabric 2102 includes three interconnected switches 2182, 2184 and 2116. Of particular relevance is the link 2180 between switches 2182 and 2184. In the illustrated embodiment the link 2180 is a wide area network (WAN) connection.

As such, its data rate may be slower than the local Fibre Channel links in the rest of the SAN 2100. In many cases the security of the WAN link 2180 may also be lower than the remaining links in the SAN 2100. Thus the link 2180 may introduce potential speed and security concerns. Other cases where speed and/or security concerns may also be developed and embodiments according to the present invention would apply equally. The switches 2182 and 2184 include the capability to address either the speed to security concerns or both. Specifically, the switches 2182 and 2184 include the capability to encrypt and/or compress the packets transmitted over the link 2180.

Figure 28:
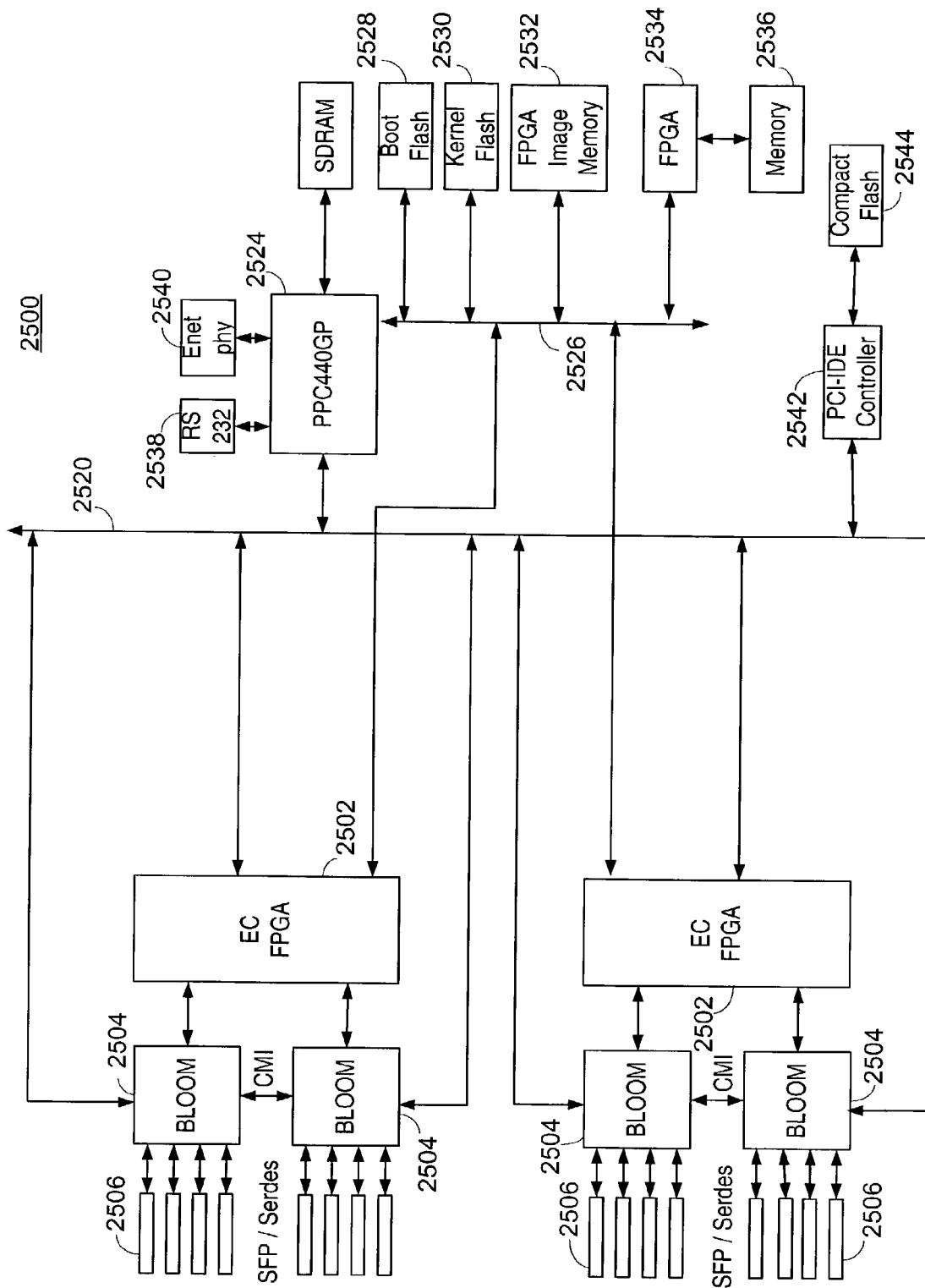
FIG. 28 is a block diagram of a first embodiment according to the present invention.

FIG. 28 illustrates an encryption/compression switch 2500 according to the present invention it is illustrated. In the encryption/compression switch 2500 a pair of FPGAs 2502, referred to as the encryption/compression (EC) FPGAs, provide the primary hardware support for the encryption and compression functions. Four Bloom ASICs 2504 are interconnected to form two Bloom ASIC pairs. Each Bloom ASIC 2504 is connected to an EC FPGA 2502. Each of the Bloom ASICs 2504 is connected to a series of four serializer/deserializer chips and SFP encryption/compression interface modules 2506 so that each Bloom ASIC 2504 provides four external ports for the switch 2500, for a total of sixteen external ports in the illustrated embodiment.

A PCI bus 2520 provides a central bus backbone for the encryption/compression switch 2500. Each of the Bloom ASICs 2504 and the EC FPGAs 2502 are connected to the PCI bus 2520. A switch processor 2524 is also connected to the PCI bus 2520 to allow communication with the other PCI bus 2520 connected devices and to provide overall control of the encryption/compression switch 2500. A processor bus 2526 is provided from the processor 2524. Connected to this processor bus 2526 are a boot flash ROM 2528, to enable the processor 2524 to start operation; a kernel flash ROM 2530, which contains the primary operating system in the encryption/compression switch 2500; an FPGA memory 2532, which contains the images of the various FPGAs, such as the EC FPGA 2502; and an FPGA 2534, which is a memory controller interface to memory 2536 which is used by the processor 2524. Additionally connected to the processor 2524 are an RS232 serial interface 2538 and an Ethernet PHY interface 2540. Additionally connected to the PCI bus 2520 is a PCI IDE or integrated drive electronics controller 2542 which is connected to CompactFlash memory 2544 to provide additional bulk memory to the encryption/compression switch 2500.

Figure 29:
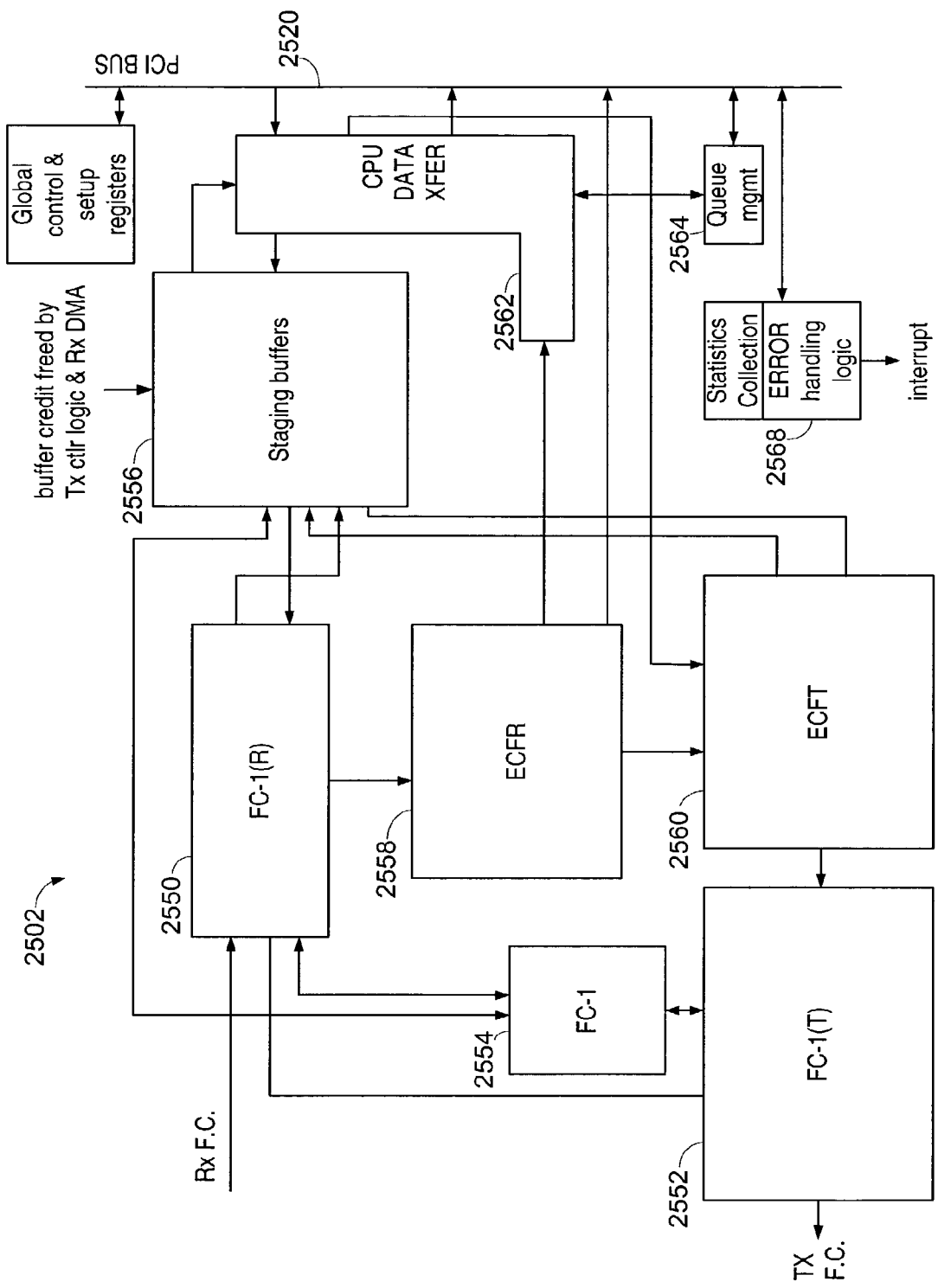
FIG. 29 is a block diagram of the EC FPGA of FIG. 28.

The EC FPGA 2502 is illustrated in more detail in FIG. 29. The receive portions of the Fibre Channel links are provided to the FC-1(R) block 2550. In the preferred embodiment there are eight FC-1(R) blocks 2500, one for each Fibre Channel link. Only one is illustrated for simplicity. The FC-1(R) block 2550 is a Fibre Channel receive block. Similarly, the transmit portions of the Fibre Channel links of the EC FPGA 2502 are connected to an FC-1(T) block 2552, which is the transmit portion of the EC FPGA 2502. In the preferred embodiment there are also eight FC-1(T) blocks 2552, one for each Fibre Channel link. Again, only one is illustrated for simplicity. An FC-1 block 2554 is interconnected between the FC-1(R) block 2550 and the FC-1(T) block 2552 to provide a state machine and to provide buffer to buffer credit logic. In general, the FC-1(R) block 2550 the FC-1(T) block 2552 and the FC-1 block 2554 are similar to the FC-1(R) block 550, the FC-1(T) block 552 and the FC-1 block 554, respectively.

The FC-1(R) block 2550 is connected to two different blocks, a staging buffer 2556 and a ECFR block 2558. In the preferred embodiment there is one ECFR block 2558 connected to all of the FC-1(R) block 2550. The staging buffer 2556 contains temporary copies of received frames. In the preferred embodiment there is only one staging buffer 2556 shared by all blocks in the EC FPGA 2502. The ECFR block 2558 performs a table lookup to determine the appropriate encryption or decryption keys. The table may be contained in the ECFR block 2558 or may be contained in an external CAM depending on table size and organization. The ECFR block 2558 is connected to a ECFT block 2560. The ECFT block 2560 is the encryption/compression block, which receives data from the staging buffers when an IO table entry is present as indicated by the ECFR block 2558. In the preferred embodiment there is one ECFT block 2560 connected to all of the FC-1(T) blocks 2552 and connected to the ECFR block 2558. Thus there are eight sets of the FC-(R) blocks 2550, one ECFR block 2558, one ECFT block 2560 and eight FC-1(T) blocks 2552. The ECFT block 2560 does the actual encryption and/or compression operations on the frame, which is then provided to the FC-1(T) block 2552 for transmission from the EC FPGA 2502.

The ECFR block 2558 is also connected to a processor data transfer block 2562, which is essentially a DMA engine to transfer data to and from the staging buffers 2556 and the processor 2524 over the PCI bus 2520. In the preferred embodiment there is also a single data transfer block 2562. A queue management block 2564 is provided and connected to the data transfer block 2562 and to the PCI bus 2520. The queue management block 2564 provides queue management for particular queues inside the data transfer block 2562. The PCI bus 2520 provides an interface between the processor 2524 and the EC FPGA 2502. A statistics collection and error handling logic block 2568 is connected to the PCI bus 2520. The statistics and error handling block 2568 handles statistics generation for the EC FPGA 2502, such as number of frames handled, and also interrupts the processor 2524 upon certain error conditions.

In operation, the Bloom ASICs 2504 are programmed to route any frames received from an external source which are to be transmitted on the port connected to the link which is to receive encrypted and/or compressed frames, such as link 2180, to the EC FPGA 2502. This can be done by having the routing tables for each device or fabric connected, nonencrypted/compressed link port set to forward frames with domain addresses indicating the frame will be transmitted over an encrypted/compressed link to the EC FPGA 2502 for encryption and/or compression. Other frames will be transmitted normally to other device or fabric connected ports. The routing tables for each port connected to the EC FPGA 2502 will have its routing table configured in a normal fashion, with the table set to send frames over the encrypted/compressed link where appropriate and to fabric connected ports in other cases. The routing tables for each port connected to an encrypted/compressed link will route frames directed to another encrypted/compressed link directly to that link, with all other frames routed to the EC FPGA 2502 so that the frames can be decrypted and/or compressed. This direct routing to a second encrypted/compressed link assumes the use of a common encryption or compression algorithm.

As an example, if a frame is received from a host with a destination which will use the encrypted/compressed link, the frame is routed to the EC FPGA 2502, encrypted and/or compressed and then routed from the EC FPGA 2502 to the encrypted/compressed link. When a return frame is received over the encrypted/compressed link, it is routed to the EC FPGA 2502, decrypted and/or uncompressed and then routed from the EC FPGA 2502 to the port attached to the host. If a frame is received from the same host and destined to a different storage unit so that the path will not use the encrypted/ compressed link, the frame is routed to port needed to reach the storage unit, without passing through the EC FPGA 2502. Thus all traffic which needs to be encrypted, compressed, decrypted or decompressed pass through the EC FPGA 2502 while other traffic is routed normally.

When the ECFR block 2558 receives a frame from an FC-1(R) block 2550, the ECFR block 2558 examines the frame to determine if this is a raw frame or an encrypted and/or compressed frame. This can be done by examining the destination address, preferably the domain bits and potentially the area bits, in the frame header. If the destination address indicates the encrypted/compressed link will be used, this is a raw frame that needs to be encrypted and/or compressed. If the destination address indicates that a normal link will used this is an encrypted and/or compressed frame which needs to be decrypted and/or uncompressed. This raw or encrypted/compressed status information is provided to the ECFT block 2560, along with information indicating the location of the frame in the staging buffers 2556. Additionally, the ECFR block 2558 will provide the appropriate encryption key from the key table to allow encryption or decryption of the frame by the ECFT block 2560. Any suitable encryption/decryption algorithm, such as DES, 3DES, PKA, etc. may be used, but preferably only one algorithm is used to simplify the ECFT block 2560, though multiple algorithms could be used if desired, with the algorithm selection also being indicated by the ECFR block 2558. Similarly, any suitable compression/decompression algorithm may be used but preferably only one is used to simplify the ECFT block 2560.

The ECFT block 2560 will receive the control information for a frame from the ECFR block 2558. The ECFT block 2560 will then request the frame from the staging buffers 2556, arrange for the frame to be routed through the appropriate encryption and/or compression or decryption and/or decompression logic. The encryption or decryption keys will be loaded at the proper time. The ECFT block 2560 will then perform the desired operations on the frame payload at wire speed.

The frame is then provided from the ECFT block 2560 to the FC-1(T) bock 2552, where the frame CRC is added and the frame is 8B/10B encoded for transmission.

Prior to routing any frames to the EC FPGAs 2502, both switches attached to the link must be configured. This can be done using any desirable communication between the two switches under the control of their processors. Once the desired link characteristics are determined, such as encryption activation and/or compression activation; any other necessary information, such as encryption keys, have been exchanged; the EC FPGAs 2502 have been programmed with these characteristics and information; and the Bloom ASICs 2504 have received updated routing tables, then the desired communication can begin over the link. Any frames received at an EC FPGA 2602 for a particular link will produce an error until the EC FPGA 2502 has been programmed with the information for that link.

Thus a link between two switches can obtain improved security, by encrypting the data on the link; improved performance, by compressing data on the link; or both.

The EC FPGA 2502 has been described as having both encryption and compression capabilities. The presence of both capabilities will generally result in the need for a larger FPGA. There may be many cases where the combination of encryption and compression is not needed. In that case a smaller FPGA can be used and only one function would be installed in the FPGA. However, because an FPGA is being used, the choice of functions, such as encryption or compression, need not be made at manufacturing time but can be made by the end user or system administrator. The FPGA image memory 2532 could contain images for both encryption and compression functions. The system administrator would set an initialization parameter to select to have either function loaded into the FPGA. Indeed, a different function could be loaded into each FPGA in a system if desired. This allows decreased manufacturing cost and reduced inventory requirements while at the same time increasing flexibility for the system administrator.

Figure 30:
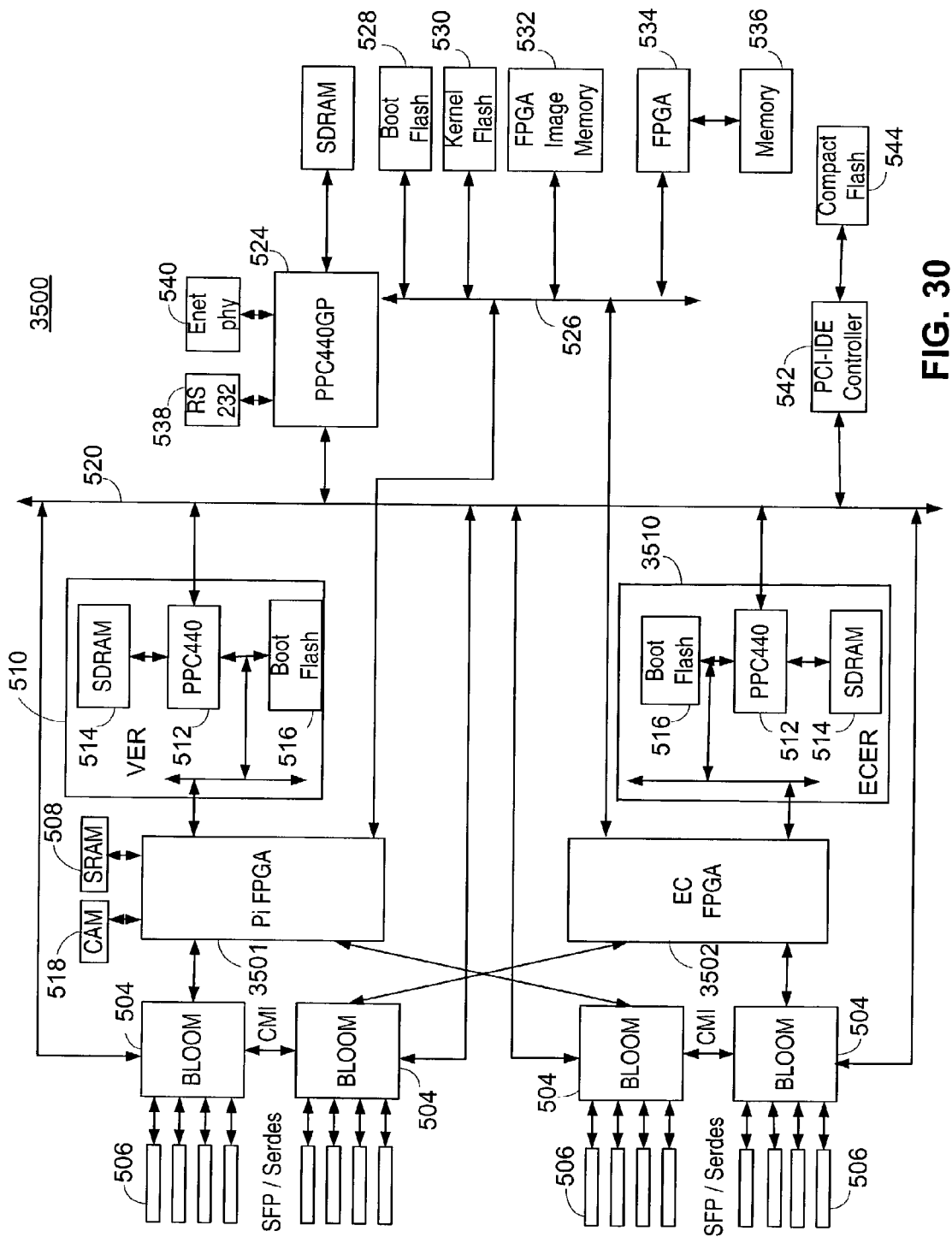
FIG. 30 is a block diagram of a second embodiment according to the present invention.

An alternative embodiment according to the present invention is illustrated in FIG. 30. A switch 3500 essentially combines the elements of the switch 500 and the switch 2500 to provide a virtualizing switch with encryption and compression capabilities. In the switch 3500 an EC FPGA 3502, similar to the EC FPGA 2502, is connected to two pairs of Bloom ASICs 504 and a pi FPGA 3501, which is similar to the pi FPGA 502, is connected to the same two pairs of Bloom ASICs 504. It is noted that an ECE or encryption/compression engine 3510 is shown. The ECE 3510 handles the necessary direct control functions for the EC FPGA 3502, reducing the encryption and/or compression overhead on the processor 524, so that the processor 524 need only handle higher level management operations for both virtualization and encryption/compression functions.

In the switch 3500 the virtualization components and the encryption/compression components effectively act independently but because of their connections and the internal routing, virtualization with one or two fabrics and encryption and/or compression over selected links can be combined. Frames directed to a virtualized device which then go to the physical device over an encrypted and/or compressed link are first handled by the pi FPGA 3501 and then by the EC FPGA 3502. Frames directed to a virtualized device and received over an encrypted and/or compressed link are first handled by the EC FPGA 3502 and then by the pi FPGA 3501. After virtualization operations by the pi FPGA 3501, should the frame directed to the physical device be directed to an encrypted and/or compressed link, the frame will then be handled by the EC FPGA 3502. Again, frames directed from one encrypted and/or compressed link to another and which are not to receive virtualization processing, are routed directly between the links.

To perform these operations, the Bloom ASICs 504 have their routing tables set according to the following rules. For external, non-encrypted and/or compressed link-attached ports, all frames directed to a virtual device are routed to the pi FPGA 3501, all frames directed to an encrypted and/or compressed link are routed to the EC FPGA 3502 and all other frames are routed normally. For ports connected to the encrypted and/or compressed links, all frames directed to another encrypted and/or compressed link are routed to that link and all other frames are routed to the EC FPGA 3502. For ports connected to the pi FPGA 3501, all frames directed to an encrypted and/or compressed link are routed to the EC FPGA 3502 and all other frames are routed normally. For ports connected to the EC FPGA 3502, all frames directed to a virtual device are routed to the pi FPGA 3501 and all other frames are routed normally. The pi FPGA 3501 will operate normally as described above. The EC FPGA 3502 will also operate normally as described above. Thus a pi FPGA 3501 will include the capability to be connected between two fabrics, but an EC FPGA 3502 will preferably not include this capability to simplify operation, though the tables in the EC FPGA 3502 would have to be separated for dual fabric operation to avoid potential multiple domain assignment issues.

Thus encrypted and/or compressed links can be utilized in conjunction with a virtualization device to provide both capabilities in a single switch, with either single or dual fabric operation being possible.

The switch 3500 can additionally have an alternative capability. In certain cases it may be desirable to store encrypted data on the particular storage unit. In the prior art designs this required encryption in either the host or the storage unit, limiting the choices available. The switch 3500 can be used to perform the encryption functions, allowing standard hosts and storage units to be used in the SAN. In this embodiment the management server would provide the necessary extent information and keys to the switch 3500. Preferably there would be a separate domain for a set of virtual devices for the encrypted disk areas, preferably a different domain than that provided for "normal" virtual devices as described above. Then the Bloom ASIC 504 routing would be set to route the frames directed to the encrypted disk area virtual devices to the EC FPGA 3502. The EC FPGA 3502 would parse the frames and check the destination addresses. If the check indicated a destination address over an encrypted and/or compressed link, operation would be as above. If the check indicated a destination address of an encrypted disk area virtual device, the EC FPGA 3502 would compare the source addresses. The source addresses are used to indicate two elements, namely if coming from an encrypted/compressed link and/or if from a storage unit. If they indicated a known storage unit and no encrypted/compressed link, then the EC FPGA 3502 would decrypt only the ultimate payload in the frame, not the entire Fibre Channel frame payload. This would allow the host to properly read the data by reading the SCSI-FCP header information, for example. If the source address comparison indicates no encrypted/compressed link and no storage unit, this indicates a frame addressed to the storage unit so that the EC FPGA 3502 would encrypt only the ultimate payload in the frame, not the entire Fibre Channel frame payload. This would allow the storage unit to properly read the data by reading the SCSI-FCP header information, for example. If the source address comparison indicated an encrypted/compressed link and a storage unit, the EC FPGA 3502 would first perform the link-related decryption/decompression and then perform the decryption of the ultimate payload as the frame is coming from the storage unit and has arrived over an encrypted/compressed link. If the source address comparison indicated an encrypted/compressed link but not a storage unit, the EC FPGA 3502 would first perform the link-related decryption/decompression and then would perform the ultimate payload encryption, as the frame arrived from a host over an encrypted/compressed link. If the destination address was unknown, this would indicate a frame coming from an encrypted and/or compressed link, so the EC FPGA 3502 would decrypt and/or decompress the frame. The Bloom ASIC 504 ports connected to the EC FPGA 3502 would be changed to route the frames directed to the encrypted disk area virtual devices to the pi FPGA 3501, where the virtualization operations would occur.

As illustrated by these descriptions of the preferred embodiments, systems according to the present invention provide improved operation of SANs by allowing encryption and/or compression to be done at full wire speed in switches in the fabric itself. The switches can also provide virtualization of storage units at full wire speed for established sequences, in conjunction with the encryption and/or compression. Further such units are very flexible and can be configured for multiple operations.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

The invention claimed is:

1. A device for use in a fabric with a host and a storage unit connected to the fabric, the device comprising:
   a port for coupling to the fabric;
   means coupled to said port for receiving a frame addressed to a storage unit, the frame including a header and a payload, the payload including a storage header and a storage payload;
   means coupled to said receiving means for performing encryption operations on said storage payload of said received frame and not on said storage header; and
   means coupled to said encryption operations means and said port for providing said encrypted frame to said port for transmission to the storage unit.

2. The device of claim 1, wherein there is a second fabric and the host resides in the fabric and a storage unit resides in the second fabric, the device further comprising:
   a second port for coupling to the second fabric; and
   means coupled to said encryption operations means and said second port for providing said encrypted frame to said second port for transmission to the storage unit.

3. A device for use in a fabric with a host and a storage unit connected to the fabric, the device comprising:
   a port for coupling to the fabric;
   receive logic coupled to said port to receive a frame addressed to a storage unit, the frame including a header and a payload, the payload including a storage header and a storage payload;
   encryption logic coupled to said receive logic to perform encryption operations on said storage payload of said received frame and not on said storage header; and
   transmit logic coupled to said encryption logic and said port to provide said encrypted frame to said port for transmission to the storage unit.

4. The device of claim 3, wherein there is a second fabric and the host resides in the fabric and a storage unit resides in the second fabric, the device further comprising:
   a second port for coupling to the second fabric; and
   second transmit logic coupled to said encryption logic and said second port to provide said encrypted frame to said second port for transmission to the storage unit.

5. A device for use in a fabric with a host and a storage unit connected to the fabric, the device comprising:
   a port for coupling to the fabric;
   means coupled to said port for receiving a frame addressed from a storage unit, the frame including a header and a payload, the payload including a storage header and a storage payload;
   means coupled to said receiving means for performing decryption operations on said storage payload of said received frame and not on said storage header; and
   means coupled to said decryption operations means and said port for providing said decrypted frame to said port for transmission to the host.

6. The device of claim 5, wherein there is a second fabric and the storage unit resides in the fabric and a host resides in the second fabric, the device further comprising:
   a second port for coupling to the second fabric; and
   means coupled to said decryption operations means and said second port for providing said decrypted frame to said second port for transmission to the host.

7. A device for use in a fabric with a host and a storage unit connected to the fabric, the device comprising:
- a port for coupling to the fabric;
- receive logic coupled to said port to receive a frame addressed from a storage unit, the frame including a header and a payload, the payload including a storage header and a storage payload;
- decryption logic coupled to said receive logic to perform decryption operations on said storage payload of said received frame and not on said storage header; and
- transmit logic coupled to said decryption logic and said port to provide said decrypted frame to said port for transmission to the host.

8. The device of claim 7, wherein there is a second fabric and the storage unit resides in the fabric and a host resides in the second fabric, the device further comprising:
- a second port for coupling to the second fabric; and
- second transmit logic coupled to said decryption logic and said second port to provide said decrypted frame to said second port for transmission to the host.

9. A device for use in a fabric with a host and a storage unit connected to the fabric, the device comprising:
- a port for coupling to the fabric;
- means coupled to said port for receiving a frame addressed to a storage unit or from a storage unit, the frame including a header and a payload, the payload including a storage header and a storage payload;
- means coupled to said receiving means for performing encryption operations on said storage payload of said received frame and not on said storage header for frames addressed to a storage unit and decryption operations on said storage payload of said received frame and not on said storage header for frames addressed from a storage unit; and
- means coupled to said encryption and decryption operations means and said port for providing said encrypted frame to said port for transmission to the storage unit and said decrypted frame to said port for transmission to a host.

10. The device of claim 9, wherein there is a second fabric and the host resides in the fabric and a storage unit resides in the second fabric, the device further comprising:
- a second port for coupling to the second fabric;
- means coupled to said second port and said encryption and decryption operations means for receiving a frame addressed from a storage unit; and
- means coupled to said encryption and decryption operations means and said second port for providing said encrypted frame to said second port for transmission to the storage unit.

11. A device for use in a fabric with a host and a storage unit connected to the fabric, the device comprising:
- a port for coupling to the fabric;
- receive logic coupled to said port to receive a frame addressed to a storage unit or from a storage unit, the frame including a header and a payload, the payload including a storage header and a storage payload;
- encryption and decryption logic coupled to said receive logic to perform encryption operations on said storage payload of frame information in said received frame and not on said storage header for frames addressed to a storage unit and decryption operations on said storage payload of frame information in said received frame and not on said storage header for frames addressed from a storage unit; and
- transmit logic coupled to said encryption and decryption logic and said port to provide said encrypted frame to said port for transmission to the physical storage unit and said decrypted frame to said port for transmission to the host.

12. The device of claim 11, wherein there is a second fabric and the host resides in the fabric and a storage unit resides in the second fabric, the device further comprising:
- a second port for coupling to the second fabric;
- second port receive logic coupled to said encryption and decryption logic and said second port to receive a frame addressed from a storage unit; and
- second transmit logic coupled to said encryption and decryption logic and said second port to provide said encrypted frame to said second port for transmission to the storage unit.

13. A fabric for connecting a host and a storage unit, the fabric comprising:
- a first device for coupling to the host and the storage unit, said first device including:
  - a port forming a connection in the fabric;
  - means coupled to said port for receiving a frame addressed to the storage unit, the frame including a header and a payload, the payload including a storage header and a storage payload;
  - means coupled to said receiving means for performing encryption operations on said storage payload of said received frame and not on said storage header; and
  - means coupled to said encryption operations means and said port for providing said encrypted frame to said port for transmission to the storage unit; and
- a second device for coupling to the host and the storage unit, said second device including:
  - a port forming a connection in the fabric;
  - means coupled to said port for receiving a frame addressed from the storage unit, the frame including a header and a payload, the payload including a storage header and a storage payload;
  - means coupled to said receiving means for performing decryption operations on said storage payload of said received frame and not on said storage header; and
  - means coupled to said decryption operations means and said port for providing said decrypted frame to said port for transmission to the host.

14. The fabric of claim 13, wherein there is a second fabric and the host resides in the fabric and a storage unit resides in the second fabric, said first device further including:
- a second port for coupling to the second fabric; and
- means coupled to said encryption operations means and said second port for providing said encrypted frame to said second port for transmission to the storage unit; and said second device further including:
- a second port for coupling to the second fabric; and
- means coupled to said second port and to said decryption operations means for receiving a frame addressed from the storage unit, the frame including a header and a payload, the payload including a storage header and a storage payload, and providing said received frame to said decryption operations means.

15. The fabric of claim 13, wherein there is a second fabric and the storage unit resides in the fabric and a host resides in the second fabric, said first device further including:
- a second port for coupling to the second fabric; and
- means coupled to said second port and said encryption operations means for receiving a frame addressed from the storage unit, the frame including a header and a payload, the payload including a storage header and a storage payload, and providing said received frame to said encryption operations means; and said second device further including:

a second port for coupling to the second fabric; and means coupled to said decryption operations means and said second port for providing said decrypted frame to said second port for transmission to the host.

16. A fabric for connecting a host and a storage unit, the fabric comprising:

a first device for coupling to the host and the storage unit, said first device including:

a port forming a connection in the fabric;

receive logic coupled to said port to receive a frame addressed to the storage unit, the frame including a header and a payload, the payload including a storage header and a storage payload;

encryption logic coupled to said receive logic to perform encryption operations on said storage payload of said received frame and not on said storage header; and transmit logic coupled to said encryption logic and said port to provide said encrypted frame to said port for transmission to the storage unit; and a second device for coupling to the host and the storage unit, said second device including:

a port forming a connection in the fabric;

receive logic coupled to said port to receive a frame addressed from the storage unit, the frame including a header and a payload, the payload including a storage header and a storage payload;

decryption logic coupled to said receive logic to perform decryption operations on said storage payload of said received frame and not on said storage header; and transmit logic coupled to said decryption logic and said port to provide said decrypted frame to said port for transmission to the host.

17. The fabric of claim 16, wherein there is a second fabric and the host resides in the fabric and a storage unit resides in the second fabric, said first device further including:

a second port for coupling to the second fabric; and second transmit logic coupled to said encryption logic and said second port to provide said encrypted frame to said second port for transmission to the storage unit; and said second device further including:

a second port for coupling to the second fabric; and receive logic coupled to said second port and to said decryption logic to receive a frame addressed from the storage unit, the frame including a header and a payload, the payload including a storage header and a storage payload, and provide said received frames to said decryption logic.

18. The fabric of claim 16, wherein there is a second fabric and the storage unit resides in the fabric and a host resides in the second fabric, the first device further including:

a second port for coupling to the second fabric; and receive logic coupled to said second port and to said encryption logic to receive a frame addressed to the storage unit, the frame including a header and a payload, the payload including a storage header and a storage payload, and provide said received frame to said encryption logic; and said second device further including:

a second port for coupling to the second fabric; and second transmit logic coupled to said decryption logic and said second port to provide said decrypted frame to said second port for transmission to the host.

19. A fabric for connecting a host and a storage unit, the fabric comprising:

first and second devices for coupling with the host and storage unit, each of the first and second devices including:

a port forming a connection in the fabric;

means coupled to said port for receiving a frame addressed to a storage unit or from a storage unit, the frame including a header and a payload, the payload including a storage header and a storage payload;

means coupled to said receiving means for performing encryption operations on said storage payload of said received frame and not on said storage header for frames addressed to a storage unit and decryption operations on said storage payload of said received frame and not on said storage header for frames addressed from a storage unit; and means coupled to said encryption and decryption operations means and said port for providing said encrypted frame to said port for transmission to the storage unit and said decrypted frame to said port for transmission to a host.

20. The fabric of claim 19, wherein there is a second fabric and the host resides in the fabric and a storage unit resides in the second fabric, one of the first or second devices further including:

a second port for coupling to the second fabric;

means coupled to said second port and said encryption and decryption operations means for receiving a frame addressed from a storage unit; and means coupled to said encryption and decryption operations means and said second port for providing said encrypted frame to said second port for transmission to the storage unit.

21. The fabric of claim 19, wherein there is a second fabric and the storage unit resides in the fabric and a host resides in the second fabric, one of the first or second devices further including:

a second port for coupling to the second fabric;

means coupled to said second port and said encryption and decryption operations means for receiving a frame addressed to a storage unit; and means coupled to said encryption and decryption operations means and said second port for providing said decrypted frame to said second port for transmission to the host.

22. A fabric for connecting a host and a storage unit, the fabric comprising:

first and second devices for coupling with the host and storage unit, each of the first and second devices including:

a port forming a connection in the fabric;

receive logic coupled to said port to receive a frame addressed to a storage unit or from a storage unit, the frame including a header and a payload, the payload including a storage header and a storage payload;

encryption and decryption logic coupled to said receiving means to perform encryption operations on said storage payload of said received frame and not on said storage header for frames addressed to a storage unit and decryption operations on said storage payload of said received frame and not on said storage header for frames addressed from a storage unit; and transmit logic coupled to said encryption and decryption operations means and said port to provide said encrypted frame to said port for transmission to the storage unit and said decrypted frame to said port for transmission to a host.

23. The fabric of claim 22, wherein there is a second fabric and the host resides in the fabric and a storage unit resides in the second fabric, one of the first or second devices further including:
a second port for coupling to the second fabric;
second port receive logic coupled to said second port and said encryption and decryption operations means to receive a frame addressed from a storage unit; and
second transmit logic coupled to said encryption and decryption operations means and said second port to provide said encrypted frame to said second port for transmission to the storage unit.

24. The fabric of claim 22, wherein there is a second fabric and the storage unit resides in the fabric and a host resides in the second fabric, one of the first or second devices further including:
a second port for coupling to the second fabric;
second port receive logic coupled to said second port and said encryption and decryption operations means to receive a frame addressed to a storage unit; and
second transmit logic coupled to said encryption and decryption operations means and said second port to provide said decrypted frame to said second port for transmission to the host.

25. A network comprising:
a host;
a storage unit; and
a fabric connecting said host and said storage unit, said fabric including:
a first device for coupling to said host and said storage unit, said first device including:
a port forming a connection in said fabric;
means coupled to said port for receiving a frame addressed to said storage unit, the frame including a header and a payload, the payload including a storage header and a storage payload;
means coupled to said receiving means for performing encryption operations on said storage payload of said received frame and not on said storage header; and
means coupled to said encryption operations means and said port for providing said encrypted frame to said port for transmission to said storage unit; and
a second device for coupling to said host and said storage unit, said second device including:
a port forming a connection in said fabric;
means coupled to said port for receiving a frame addressed from said storage unit, the frame including a header and a payload, the payload including a storage header and a storage payload;
means coupled to said receiving means for performing decryption operations on said storage payload of said received frame and not on said storage header; and
means coupled to said decryption operations means and said port for providing said decrypted frame to said port for transmission to said host.

26. The network of claim 25, further comprising:
a second fabric; and
a second storage unit connected to said second fabric,
said first device further including:
a second port for coupling to said second fabric; and
means coupled to said encryption operations means and said second port for providing said encrypted frame to said second port for transmission to said storage unit; and
said second device further including:
a second port for coupling to said second fabric; and
means coupled to said second port and to said decryption operations means for receiving a frame addressed from said second storage unit, the frame including a header and a payload, the payload including a storage header and a storage payload, and providing said received frame to said decryption operations means.

27. The network of claim 25, further comprising:
a second fabric; and
a second host connected to said second fabric,
said first device further including:
a second port for coupling to said second fabric; and
means coupled to said second port and said encryption operations means for receiving a frame addressed from said storage unit, the frame including a header and a payload, the payload including a storage header and a storage payload, and providing said received frame to said encryption operations means; and
said second device further including:
a second port for coupling to said second fabric; and
means coupled to said decryption operations means and said second port for providing said decrypted frame to said second port for transmission to said second host.

28. The network comprising:
a host;
a storage unit; and
a fabric connecting said host and said storage unit, said fabric including:
a first device for coupling to said host and said storage unit, said first device including:
a port forming a connection in said fabric;
receive logic coupled to said port to receive a frame addressed to said storage unit, the frame including a header and a payload, the payload including a storage header and a storage payload;
encryption logic coupled to said receive logic to perform encryption operations on said storage payload of said received frame and not on said storage header; and
transmit logic coupled to said encryption logic and said port to provide said encrypted frame to said port for transmission to said storage unit; and
a second device for coupling to said host and said storage unit, said second device including:
a port forming a connection in said fabric;
receive logic coupled to said port to receive a frame addressed from said storage unit, the frame including a header and a payload, the payload including a storage header and a storage payload;
decryption logic coupled to said receive logic to perform decryption operations on said storage payload of said received frame and not on said storage header; and
transmit logic coupled to said decryption logic and said port to provide said decrypted frame to said port for transmission to said host.

29. The network of claim 28, further comprising:
a second fabric; and
a second storage unit connected to said second fabric,
said first device further including:
a second port for coupling to said second fabric; and second transmit logic coupled to said encryption logic and said second port to provide said encrypted frame to said second port for transmission to said second storage unit; and said second device further including:
a second port for coupling to said second fabric; and
receive logic coupled to said second port and to said decryption logic to receive a frame addressed from said second storage unit, the frame including a header and a payload, the payload including a storage header and a storage payload, and provide said received frames to said decryption logic.

30. The network of claim 28, further comprising:
a second fabric; and
a second host connected to said second fabric,
said first device further including:
a second port for coupling to said second fabric; and
receive logic coupled to said second port and to said encryption logic to receive a frame addressed to said storage unit, the frame including a header and a payload, the payload including a storage header and a storage payload, and provide said received frame to said encryption logic; and
said second device further including:
a second port for coupling to said second fabric; and
second transmit logic coupled to said decryption logic and said second port to provide said decrypted frame to said second port for transmission to said second host.

31. A network comprising:
a host;
a storage unit; and
a fabric connecting said host and said storage unit, said fabric including:
first and second devices for coupling with said host and said storage unit, each of said first and second devices including:
a port forming a connection in said fabric;
means coupled to said port for receiving a frame addressed to a storage unit or from a storage unit, the frame including a header and a payload, the payload including a storage header and a storage payload;
means coupled to said receiving means for performing encryption operations on said storage payload of said received frame and not on said storage header for frames addressed to a storage unit and decryption operations on said storage payload of said received frame and not on said storage header for frames addressed from a storage unit; and
means coupled to said encryption and decryption operations means and said port for providing said encrypted frame to said port for transmission to said storage unit and said decrypted frame to said port for transmission to said host.

32. The network of claim 31, further comprising:
a second fabric; and
a second storage unit connected to said second fabric,
one of said first or second devices further including:
a second port for coupling to said second fabric;
means coupled to said second port and said encryption and decryption operations means for receiving a frame addressed from said second storage unit; and
means coupled to said encryption and decryption operations means and said second port for providing said encrypted frame to said second port for transmission to said second storage unit.

33. The network of claim 31, further comprising:
a second fabric; and
a second host connected to said second fabric,
one of said first or second devices further including:
a second port for coupling to said second fabric;
means coupled to said second port and said encryption and decryption operations means for receiving a frame addressed to a storage unit; and
means coupled to said encryption and decryption operations means and said second port for providing said decrypted frame to said second port for transmission to said second host.

34. A network comprising:
a host;
a storage unit; and
a fabric connecting said host and said storage unit, said fabric including:
first and second devices for coupling with said host and storage unit, each of said first and second devices including:
a port forming a connection in said fabric;
receive logic coupled to said port to receive a frame addressed to a storage unit or from a storage unit, the frame including a header and a payload, the payload including a storage header and a storage payload;
encryption and decryption logic coupled to said receiving means to perform encryption operations on said storage payload of said received frame and not on said storage header for frames addressed to a storage unit and decryption operations on said storage payload of said received frame and not on said storage header for frames addressed from a storage unit; and
transmit logic coupled to said encryption and decryption operations means and said port to provide said encrypted frame to said port for transmission to said storage unit and said decrypted frame to said port for transmission to said host.

35. The network of claim 34, further comprising:
a second fabric; and
a second storage unit connected to said second fabric,
one of said first or second devices further including:
a second port for coupling to said second fabric;
second port receive logic coupled to said second port and said encryption and decryption operations means to receive a frame addressed from said second storage unit; and
second transmit logic coupled to said encryption and decryption operations means and said second port to provide said encrypted frame to said second port for transmission to said second storage unit.

36. The network of claim 34, further comprising:
a second fabric; and
a second host connected to said second fabric,
one of said first or second devices further including:
a second port for coupling to said second fabric;
second port receive logic coupled to said second port and said encryption and decryption operations means to receive a frame addressed to a storage unit; and
second transmit logic coupled to said encryption and decryption operations means and said second port to provide said decrypted frame to said second port for transmission to said host.

37. A method of operating a device for use in a fabric with a host and a storage unit connected to the fabric, the method comprising:

receiving a frame addressed to a storage unit, the frame including a header and a payload, the payload including a storage header and a storage payload;

performing encryption operations on said storage payload of said received frame and not on said storage header; and providing said encrypted frame for transmission to the storage unit.

38. The method of claim 37, wherein there is a second fabric and the host resides in the fabric and a second storage unit resides in the second fabric, the method further comprising:

providing said encrypted frame for transmission to the second storage unit.

39. A method of operating a device for use in a fabric with a host and a storage unit connected to the fabric, the method comprising:

receiving a frame addressed from a storage unit, the frame including a header and a payload, the payload including a storage header and a storage payload;

performing decryption operations on said storage payload of said received frame and not on said storage header; and providing said decrypted frame for transmission to the host.

40. The method of claim 39, wherein there is a second fabric and the storage unit resides in the fabric and a second host resides in the second fabric, the method further comprising:

providing said decrypted frame for transmission to the second host.

41. A method of operating a device for use in a fabric with a host and a storage unit connected to the fabric, the method comprising:

receiving a frame addressed to a storage unit or from a storage unit, the frame including a header and a payload, the payload including a storage header and a storage payload;

performing encryption operations on said storage payload of said received frame and not on said storage header for frames addressed to a storage unit and decryption operations on said storage payload of said received frame and not on said storage header for frames addressed from a storage unit; and providing said encrypted frame for transmission to the storage unit and said decrypted frame for transmission to a host.

42. The method of claim 41 wherein there is a second fabric and the host resides in the fabric and a second storage unit resides in the second fabric, the method further comprising:

receiving a frame addressed from the said second storage unit; and providing said encrypted frame for transmission to the second storage unit.

* * * * *